(12) United States Patent
Tay

(10) Patent No.: US 9,964,209 B2
(45) Date of Patent: May 8, 2018

(54) MAXIMUM AXIAL POSITION CHANGING RPM METHODS

(71) Applicant: Armin Sebastian Tay, West Covina, CA (US)

(72) Inventor: Armin Sebastian Tay, West Covina, CA (US)

( * ) Notice: Subject to any disclaimer, the term of this patent is extended or adjusted under 35 U.S.C. 154(b) by 28 days.

(21) Appl. No.: 15/130,924

(22) Filed: Apr. 15, 2016

(65) Prior Publication Data

US 2016/0334014 A1 Nov. 17, 2016

Related U.S. Application Data

(63) Continuation-in-part of application No. 14/929,413, filed on Nov. 2, 2015, now abandoned, and a continuation-in-part of application No. 15/055,560, filed on Feb. 27, 2016, now abandoned.

(60) Provisional application No. 62/161,268, filed on May 14, 2015, provisional application No. 62/162,807, filed on May 17, 2015, provisional application No. 62/204,982, filed on Aug. 14, 2015, provisional application No. 62/208,973, filed on Aug. 24, 2015, provisional application No. 62/209,338, filed on Aug. 25, 2015.

(51) Int. Cl.
| | |
|---|---|
| *B60W 10/101* | (2012.01) |
| *F16H 61/662* | (2006.01) |
| *F16H 63/40* | (2006.01) |
| *F16H 9/08* | (2006.01) |
| *B60W 10/107* | (2012.01) |
| *F16H 61/16* | (2006.01) |
| *F16H 61/18* | (2006.01) |
| *B60W 10/06* | (2006.01) |

(52) U.S. Cl.
CPC ............ *F16H 61/662* (2013.01); *F16H 9/08* (2013.01); *F16H 61/66259* (2013.01); *F16H 63/40* (2013.01); *B60W 10/06* (2013.01); *B60W 10/101* (2013.01); *B60W 10/107* (2013.01); *B60W 2510/0638* (2013.01); *F16H 61/16* (2013.01); *F16H 61/18* (2013.01); *Y10T 477/623* (2015.01); *Y10T 477/6237* (2015.01); *Y10T 477/688* (2015.01)

(58) Field of Classification Search
CPC .. F16H 61/662; F16H 61/66259; F16H 63/40; F16H 61/16; F16H 61/18; Y10T 477/623; Y10T 477/6237; Y10T 477/688; B60W 10/06; B60W 10/101; B60W 10/107; B60W 2510/0638
USPC .......................................................... 701/62
See application file for complete search history.

(56) References Cited

U.S. PATENT DOCUMENTS

| | | | | |
|---|---|---|---|---|
| 4,698,764 | A * | 10/1987 | Inagaki | ................. B60W 10/06 477/46 |
| 6,656,070 | B2 | 12/2003 | Tay | |
| 7,713,153 | B2 | 5/2010 | Naude | |
| 7,722,490 | B2 | 5/2010 | Tay | |
| 8,628,439 | B2 | 1/2014 | Tay | |
| 9,725,090 | B2 * | 8/2017 | Komatsu | ............. B60W 30/143 |

(Continued)

*Primary Examiner* — Roger L Pang

(57) ABSTRACT

Methods that can be used to "limit the maximum shaft/spline rpm (speed) at which axial position changing of a variator mounted on it is performed to a "maximum axial position changing rpm value" for all variator mounted shafts/splines of a CVT, while still allowing a safe driving experience and also allowing the driver to use the full power of the engine when needed.

10 Claims, 15 Drawing Sheets

(56) References Cited

U.S. PATENT DOCUMENTS

| | | | |
|---|---|---|---|
| 2002/0033289 A1* | 3/2002 | Ono | B60K 31/04 |
| | | | 180/171 |
| 2009/0062995 A1* | 3/2009 | Unno | F16H 61/16 |
| | | | 701/51 |
| 2013/0023366 A1 | 1/2013 | Tay | |
| 2013/0130854 A1 | 5/2013 | Tay | |
| 2013/0310205 A1 | 11/2013 | Tay | |
| 2014/0094332 A1 | 4/2014 | Tay | |
| 2014/0141909 A1 | 5/2014 | Tay | |
| 2014/0213398 A1 | 7/2014 | Tay | |
| 2014/0235385 A1 | 8/2014 | Tay | |
| 2014/0235389 A1 | 8/2014 | Tay | |
| 2015/0126316 A1 | 5/2015 | Tay | |
| 2015/0135895 A1 | 5/2015 | Tay | |
| 2015/0233450 A1 | 8/2015 | Tay | |

\* cited by examiner

Tensioning Pulley that is pushed upwards by spring or other means

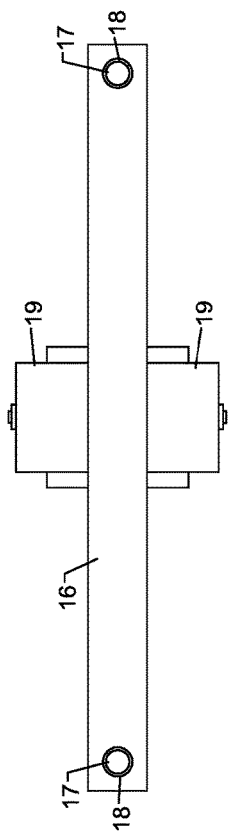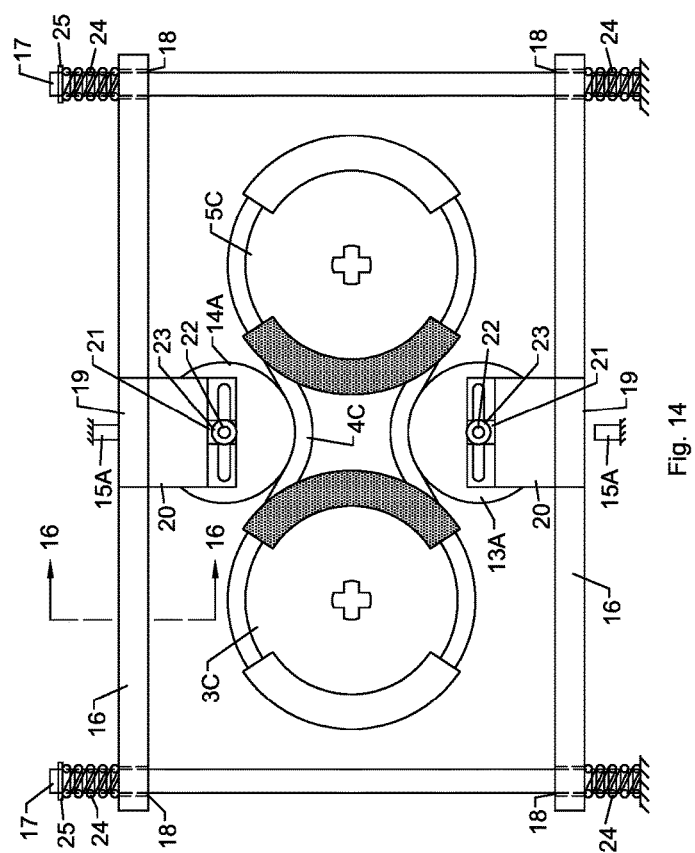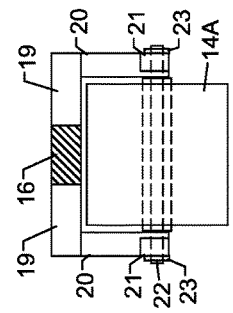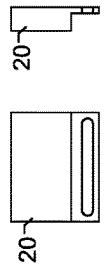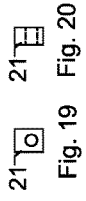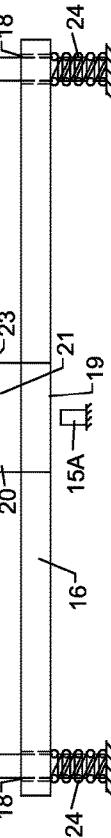

MAXIMUM AXIAL POSITION CHANGING RPM METHODS

CROSS-REFERENCE TO RELATED APPLICATIONS

This invention is a Continuation-in-part (CIP) of U.S. patent application Ser. No. 14/929,413, which was filed on 2 Nov. 2015 and a Continuation-in-part (CIP) of U.S. patent application Ser. No. 15/055,560, which was filed on 27 Feb. 2016; in addition, this invention is entitled to the benefits of:
  Provisional Patent Application (PPA) Ser. No. 62/161,268 filed on 14 May 2015
  Provisional Patent Application (PPA) Ser. No. 62/162,807 filed on 17 May 2015
  Provisional Patent Application (PPA) Ser. No. 62/204,982 filed on 14 Aug. 2015
  Provisional Patent Application (PPA) Ser. No. 62/208,973 filed on 24 Aug. 2015
  Provisional Patent Application (PPA) Ser. No. 62/209,338 filed on 25 Aug. 2015

The following previously filed patents and patent applications have no legal bearing on this application; they describe items mentioned in this application (i.e. cone with one torque transmitting member), but the subject matter claimed in this application is different.
  U.S. Pat. No. 6,656,070 B2, which was filed on 11 Jan. 2001
  U.S. Pat. No. 7,722,490 B2, which was filed on 29 Oct. 2007
  U.S. Pat. No. 8,628,439 B2, which was filed on 29 Oct. 2007
  U.S. patent application Ser. No. 13/629,613 (Pub. #20130023366), which was filed on 28 Sep. 2012
  U.S. patent application Ser. No. 13/730,958 (Pub. #20130130854), which was filed on 29 Dec. 2012
  U.S. patent application Ser. No. 13/889,049 (Pub. #20130310205), which was filed on 7 May 2013
  U.S. patent application Ser. No. 14/072,390 (Pub. #20140094332), which was filed on 5 Nov. 2013
  U.S. patent application Ser. No. 14/082,146 (Pub. #20140141909), which was filed on 17 Nov. 2013
  U.S. patent application Ser. No. 14/242,899 (Pub. #20140213398), which was filed on 2 Apr. 2014
  U.S. patent application Ser. No. 14/557,454 (Pub. #20150135895), which was filed on 2 Dec. 2014
  U.S. patent application Ser. No. 14/597,354 (Pub. #20150126316), which was filed on 15 Jan. 2015
  U.S. patent application Ser. No. 14/182,306 (Pub. #20140235385), which was filed on 18 Feb. 2014
  U.S. patent application Ser. No. 14/186,853 (Pub. #20140235389), which was filed on 21 Feb. 2014
  U.S. patent application Ser. No. 14/475,492 (Pub. #20150233450), which was filed on 2 Sep. 2014.

BACKGROUND

Field of Invention

This invention relates to torque/speed transmissions, specifically to methods that can be used to "limit the maximum shaft rpm (speed) at which axial position changing of a variator mounted on it is performed to a "maximum axial position changing rpm value" for all variator mounted shafts of a CVT, while still allowing a safe driving experience and also allowing the driver to use the full power of the engine when needed. Examples of variators are: a cone with one torque transmitting member, a cone with two oppositely mounted torque transmitting members, a cone with two opposite teeth, a push belt pulley, etc. The methods of this invention are referred to as the "Maximum Axial Position Changing RPM Method", the "Alternate Maximum Axial Position Changing RPM Method", and the "Alternate Maximum Axial Position Changing RPM Method 2" and are described in the "Maximum Axial Position Changing RPM Method" section of this disclosure.

Description of Prior Art

A CVT that has the potential to replace automatic and manual transmissions in vehicles is a CVT 4, which is described in U.S. patent application Ser. Nos. 13/629,613, 13/730,958, and 13/889,049.

A CVT 4, which is shown in FIGS. 1 to 4, has one cone with one torque transmitting member mounted on one shaft/spline that is coupled to another cone with one torque transmitting member mounted on another shaft/spline by a transmission belt.

A CVT 4 is promising design because it can allow for the construction of non-friction dependent CVT's without using ratcheting or reciprocating mechanisms. However, if a CVT 4 is transmitting a large torque, then the tension in the transmission belt of the CVT 4 is also large. And sliding a transmission belt under large tension from small diameter of its cone to a large diameter of its cone, as required for transmission ratio change, will also require a large force.

A CVT 6, which is described in U.S. patent application Ser. Nos. 14/182,306, 14/186,853, 14/475,492 and this disclosure, has two CVT 4's for which the transmission belt tension in one of the CVT 4's can be reduced. Reducing the transmission belt tension in the CVT 4 for which the axial position of a cone of a CVT 6 has to be changed can significantly: reduce the transmission ratio changing force needed, shock loads that occur during transmission ratio changing, and wear due to transmission ratio changing.

The axial position of a cone of a CVT 6 has to be changed within less than a full revolution of that cone. As such, the duration available for changing the axial position of a cone of a CVT 6 depends on the rotational speed (rpm) at which the cones of the CVT 6 are rotating. By limiting the "maximum rotating speed at which axial position changing of a cone is performed", the duration available for changing the axial position of a cone can be increased; and this will reduce the transmission ratio changing force needed and shock loads that occur during transmission ratio changing.

For example, when the "maximum rotating speed at which axial position changing of a cone is performed", rpm_max, is limited to a "maximum axial position changing rpm value" of 3000 rpm; then based on the calculations in the "Sample Calculations for Axial Position Changing" section below, the initial force needed to change the axial position of a cone, F_initial, is 40 lbs and the shock loads during axial position of a cone is h_dropping=0.38 cm.

When the "maximum rotating speed at which axial position changing of a cone is performed", rpm_max, is not limited to a "maximum axial position changing rpm value", then axial position changing of a cone can occur when the engine is operating at its maximum rpm. Most car engines have a maximum rpm of about 6000 rpm. From the calculations in the "Sample Calculations for Axial Position Changing" section below for rpm_max=6000 rpm, we get F_initial=162 lbs and h_dropping=1.5 cm.

From the sample calculations of the previous paragraph we can observe that by limiting the "maximum rotating speed at which axial position changing of a cone is performed" to 3000 rpm, the force needed to change the axial position of a cone can be limited to 40 lbs. Without limiting the "maximum rotating speed at which axial position changing of a cone is performed", the maximum rpm of the engine, which we assume is 6000 rpm, will determine the force needed to change the axial position of a cone, which for 6000 rpm is 162 lbs, or more than 4 times larger than that for 3000 rpm. In addition, at 6000 rpm, the shock loads due to axial position changing of a cone will also be about 4 times larger than that for 3000 rpm.

Without limiting the "maximum rotating speed at which axial position changing of a cone is performed", a CVT 6 can be unpractical for configurations where a cone rotates at high speed, such as 12000 rpm for example. A cone can rotate at 12000 rpm for a maximum engine rpm of 6000 rpm and a transmission ratio (output speed/input speed transmission ratio) of 2:1.

The idea of limiting the "maximum rotating speed at which axial position changing of a cone is performed" so as to increase the duration at which axial position changing of that cone has to be performed is not novel. But only limiting the "maximum rotating speed at which axial position changing of a cone is performed" without a control sequence/method, can allow for an unsafe driving experiences such as when the CVT is stuck in a low transmission ratio because the "maximum axial position changing rpm value" is exceeded; or can limit the power of an engine, such when the engine is only allowed to run up to 3000 rpm instead of 6000 rpm so as not to exceed the "maximum axial position changing rpm value".

The "Maximum Axial Position Changing RPM Method", the "Alternate Maximum Axial Position Changing RPM Method", and the "Alternate Maximum Axial Position Changing RPM Method 2" of this disclosure will disclose a control sequence/method that will limit the "maximum rotating speed at which axial position changing of a cone is performed" while also providing a safe driving experience and also allowing the driver to use the full power of the engine when needed.

Other Prior Arts

The following prior art that might also be relevant: U.S. Pat. No. 7,713,153; Issue Date: May 11, 2010; Patentee: Naude.

BRIEF SUMMARY OF THE INVENTION

Methods that can be used to "limit the maximum shaft rpm (speed) at which axial position changing of a variator mounted on it is performed to a "maximum axial position changing rpm value" for all variator mounted shafts of a CVT, while still allowing a safe driving experience and also allowing the driver to use the full power of the engine when needed.

BRIEF DESCRIPTION OF THE SEVERAL VIEWS OF THE DRAWING

FIG. 14 shows a front-view of a "Tensioning Pulleys Tensioning System".
FIG. 15 shows a partial top-view of a "Tensioning Pulleys Tensioning System".
FIG. 16 shows a partial sectional-view of a "Tensioning Pulleys Tensioning System".
FIG. 17 shows a front-view of a slider mounting plate 20.
FIG. 18 shows a side-view of a slider mounting plate 20.
FIG. 19 shows a front-view of a slider 21.
FIG. 20 shows a side-view of a slider 21.

DETAILED DESCRIPTION OF THE INVENTION

CVT 6

Configuration of a CVT 6

Figure 2:
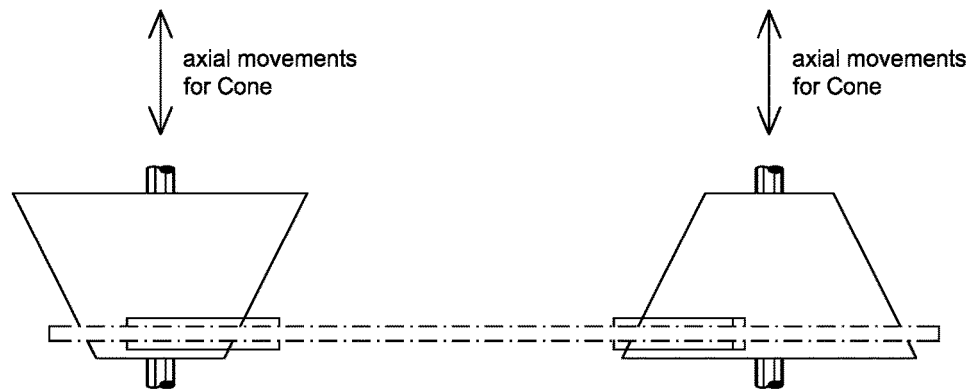
FIG. 2 shows a top-view of a CVT 4.
Figure 1:
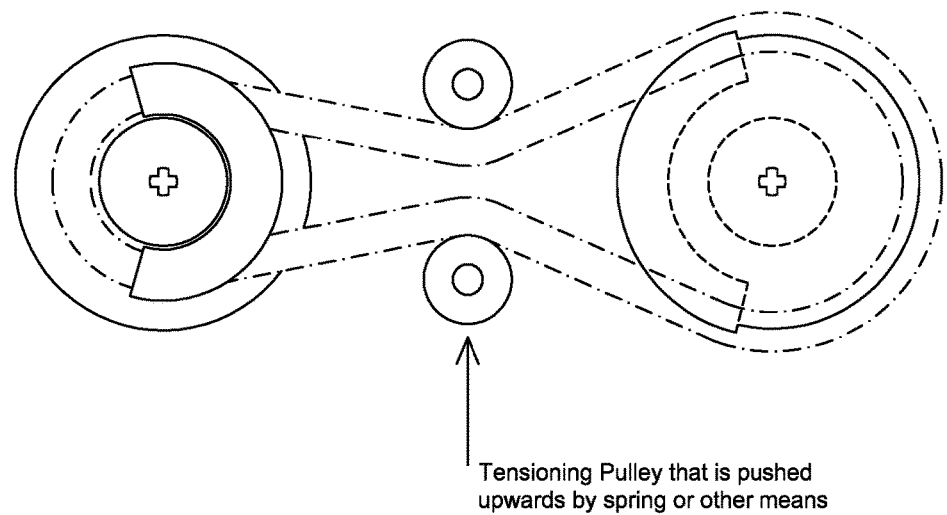
FIG. 1 shows a front-view of a CVT 4.
Figure 4:
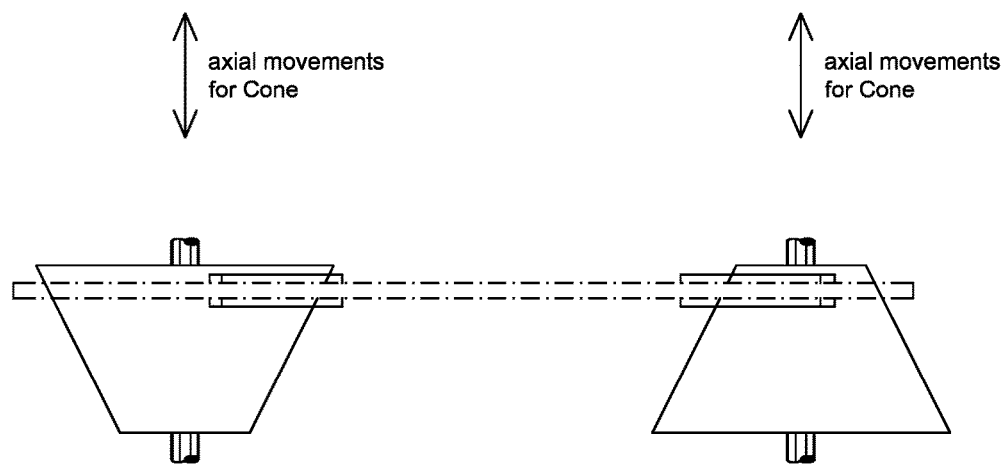
FIG. 4 shows another top-view of a CVT 4.
Figure 3:
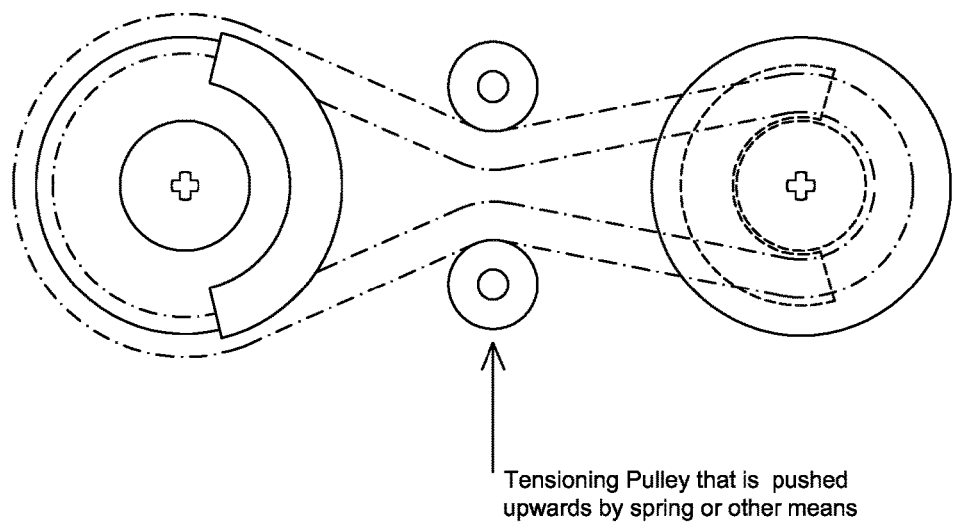
FIG. 3 shows another front-view of a CVT 4.
Figure 5:
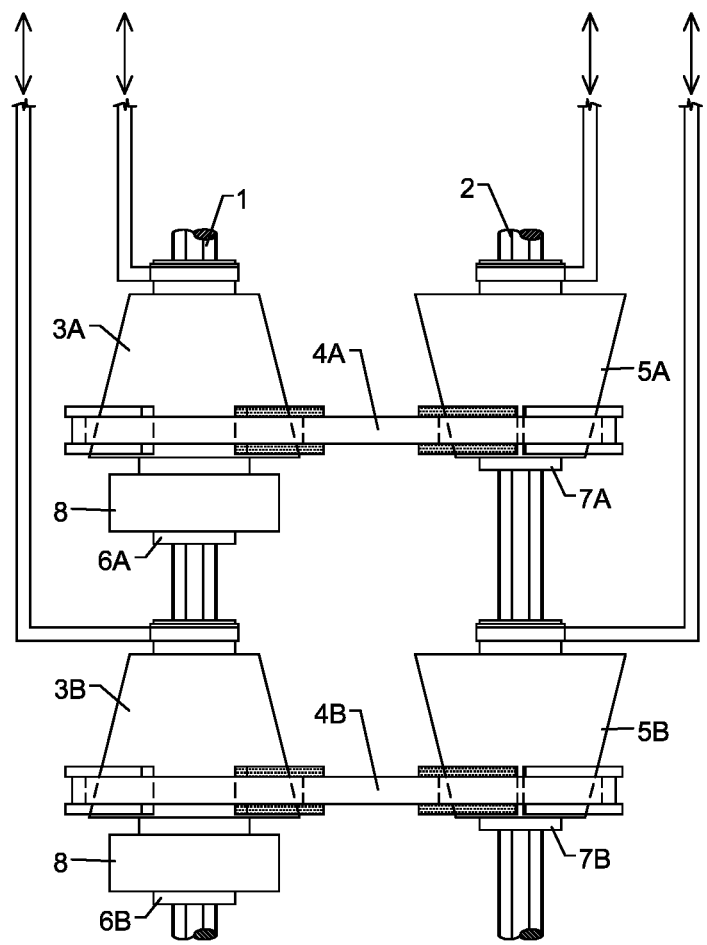
FIG. 5 shows a top-view of the preferred CVT 6.

Labeling for CVT 6 shown as a top-view in FIG. 5: Input Spline 1, Output Spline 2, Driving Cone 3A of CVT 4A, Transmission Belt 4A of CVT 4A, Driven Cone 5A of CVT 4A, Slider Sleeve 6A of Driving Cone 3A, Slider Sleeve 7A of Driven Cone 5A, Driving Cone 3B of CVT 4B, Transmission Belt 4B of CVT 4B, Driven Cone 5B of CVT 4B, Slider Sleeve 6B of Driving Cone 3B, Slider Sleeve 7B of Driven Cone 5B, Adjusters 8.

A CVT 6 comprises of two substantially identical CVT 4's. The basic configuration of a CVT 4 is described U.S. patent application Ser. No. 13/629,613. Here one CVT 4 is referred to as CVT 4A, and the other CVT 4 is referred to as CVT 4B. The driving cones (which each are a cone with one torque transmitting member and which preferably have the same dimensions) of CVT 4A and CVT 4B are mounted on a common spline through a slider sleeve each (which allow axial but not rotational movements relative to its spline) in manner so that the larger end of one cone is facing the smaller end of the other cone; and the driven cones (which each are also a cone with one torque transmitting member and which also preferably have the same dimensions) of CVT 4A and CVT 4B are also mounted on a common spline through a slider sleeve each (which allow axial but not rotational movements relative to its spline) in manner so that the larger end of one cone is facing the smaller end of the other cone. It is recommended that the axial positions of the driving cones can be changed independent of each other, and that the axial positions of the driven cones can also be changed independent of each other.

For each CVT 4 (CVT 4A and CVT 4B), one of its cones is mounted on its slider sleeve through the use of an adjuster (labeled as adjuster 8 in FIG. 5) that can: a) provide/allow rotational adjustment between its cone and the spline on which it is mounted when needed; and b) prevent any rotational movements between its cone and the spline on which it is mounted when needed. The adjuster that uses a gear that is driven by a worm gear, described in U.S. Pat. No. 7,722,490 B2 and U.S. patent application Ser. No. 11/978,456 can be used as the adjusters; and here a cone can be mounted on its spline through the use of an adjuster and a slider sleeve in a similar manner as a transmission pulley of a CVT 2 is mounted on its shaft/spline through the use of an adjuster and a slider sleeve (see U.S. Pat. No. 7,722,490 B2).

If a cone is mounted through an adjuster, the rotational position sensor that is used to determine the rotational position of that cone needs to be mounted on that cone or a portion that rotates with that cone. The rotational position sensor of a cone is needed to determine/estimate the rotational position of the torque transmitting member of said cone, which is needed to know when to change the axial position of a cone (see U.S. patent application Ser. No. 13/889,049).

If desired, a CVT 6 can also comprise of two substantially identical CVT 4's for which the cones are mounted on shafts instead of splines. For this configuration, the transmission diameter of a cone is changed by changing the axial position of its torque transmitting member and its non-torque transmitting member (if used) while holding still the axial position of said cone; instead of changing the axial position of said cone while holding still the axial position of its torque transmitting member and its non-torque transmitting member (if used) as is the case for a CVT 6 for which the cones are mounted on splines. For both a shaft mounted and spline mounted configuration of a CVT 4, the axial position of a cone relative to its torque transmitting member of the cone on the driven shaft/spline and the cone on the driving shaft/spline can be changed independent of each other.

Reducing Tension in a Transmission Belt of a CVT 6

A CVT 6 can be operated so that the tension in the transmission belt of one CVT 4 can be reduced when desired through the use of the adjusters 8. Here for the CVT 4 for which the tension in the transmission belt is to be reduced, the adjuster 8 for that CVT 4 allows its cone to rotate relative to its shaft/spline so as to provide a releasing torque, while the adjuster 8 of the other CVT 4 is locked/braked (or provides a slower rotating releasing torque) so that full torque transfer between its cone and its shaft/spline occurs. If the shaft/spline on which an adjuster is mounted is the input shaft/spline, than the direction of rotation of its cone for a releasing torque is the direction opposite from the rotation of the input shaft/spline. And if the shaft/spline on which an adjuster is mounted is the output shaft/spline, than the direction of rotation of its cone for a releasing torque is the direction of rotation of the output shaft/spline.

The duration that a releasing torque is provided/allowed by an adjuster before axial position changing of its cone is started can be based on a "set time duration". The ideal "set time duration" can be obtained through experimentation. For example, let's say we select the "set time duration" to be 1 second; here if this duration is sufficient for the adjuster to sufficiently reduce the tension in the transmission belt for all operating conditions/situations, than 1 second can be used as the "set time duration" for that adjuster, or if desired further experiments can be performed in order to obtain a smaller "set time duration"; and if 1 second does not allow the adjuster to sufficiently reduce the tension in the transmission belt for all driving conditions, than additional experiment(s) with larger than 1 second "set time duration(s)" need to be performed until a "set time duration" that allows the adjuster to sufficiently reduce the tension in the transmission belt for all driving conditions is obtained.

When the "set time duration" has expired, axial position changing of said cone can be started. After the "set time duration" has expired, the adjuster 8 stops providing/allowing a releasing torque and is stopped/locked or used for other purposes. Here proper coordination can be performed by a controlling computer that controls the axial position changing of said cone, and the adjuster 8 that provides/allows the releasing torque. Instead of a "set time duration", torque sensor(s) can also be used to determine when the tension in a transmission belt is sufficiently reduced so that axial position changing of a cone can be started.

When providing/allowing a releasing torque, an adjuster 8 that uses a motor can eventually stall or slip. Here it is recommended that the torque of the adjuster 8 motor is limited so that it will be enough to release the tension in the pulling side of the transmission belt of its cone, but not large enough to significantly increase the tension in the slack side of the transmission belt.

For an adjuster that uses a motor that rotates a worm gear that is coupled to a gear, letting an adjuster slip can be accomplished by placing a slipping clutch between the output shaft/spline of the adjuster and the worm gear. This way the locking ability of the worm gear-gear drive is not compromised. See U.S. Pat. No. 7,722,490 B2 for more details regarding this.

If no slippage between a cone and its transmission belt is allowed, then changing the axial position of a cone relative to its transmission belt can rotate a cone. This type of rotation is referred to as "Transmission ratio change rotation" in U.S. Pat. No. 7,722,490 B2. "Transmission ratio change rotation" has to be "allowed" or "compensated for" during axial position change of a cone relative to its transmission belt, otherwise large tension in the transmission belt can develop.

Furthermore, for a worm gear-gear drive of an adjuster 8, it is recommended that the difference between the worm locking force and worm rotating force is not much greater than the difference required to ensure reliable locking when needed. This way the torque required to unlock the worm gear-gear drive can be kept as small as practical.

If desired other type of adjusters can be used for the adjusters 8, such as an adjuster that uses a worm gear-gear drive that uses a worm gear brake so that its worm gear-gear drive can be made locking or non-locking. Or an adjuster that uses a main gear that is identical to the gear of a worm gear-gear drive that is than coupled directly or through other spur gears to a braking gear (which has more speed but less torque than said main gear) that can be braked as needed. Many other design for an adjuster 8 are also possible.

Compensating/Allowing for "Transmission Ratio Change Rotation" in a CVT 6

For a CVT 6 the cones are prevented from freely rotating to compensate for "Transmission ratio change rotation", since two cones that cannot freely rotate relative to each other are mounted on a common shaft/spline and the transmission ratio (axial position of a cone relative to its transmission belt) of the cones on said common spline are changed independent of each other. As such the adjuster(s) 8 also need to be used to compensate/allow for "Transmission ratio change rotation".

For a cone mounted on an adjuster 8, in order to compensate/allow for "Transmission ratio change rotation" of said cone, said cone mounted on an adjuster 8 "needs to be rotated" or "needs to be allowed to rotate" by its adjuster 8 in the direction of the "Transmission ratio change rotation" of said cone during axial position change of said cone relative to its transmission belt, so that said cone can rotate relative to its spline in the direction of its "Transmission ratio change rotation". For an adjuster 8 that uses a motor, it is recommended that here said adjuster 8 rotates its said cone faster than required; the excess speed of said adjuster 8 will only cause said adjuster 8 to stall or slip.

For a non-adjuster mounted cone, in order to compensate/allow for "Transmission ratio change rotation" of said non-adjuster mounted cone, the adjuster mounted cone to which said non-adjuster mounted cone is coupled and which is mounted on an adjuster 8, "needs to be rotated" or "needs to be allowed to rotate" by adjuster 8 in the direction opposite of the direction of rotation of the "Transmission ratio change rotation" of said non-adjuster mounted cone during axial position change of said non-adjuster mounted cone relative to its transmission belt. This is performed so as to provide or remove slack as needed in the tense side and slack side of the transmission belt of said non-adjuster mounted cone so as to compensate for "Transmission ratio change rotation". For an adjuster 8 that uses a motor, it is recommended that here said adjuster 8 rotates its said cone faster than required; the excess speed of said adjuster 8 will only cause said adjuster 8 to stall or slip.

The explanations of the previous two paragraphs should be correct. In order to be entirely sure this is the case, or in order to determine the correct direction(s) of rotation if this is not the case, experimentation can be performed. There are only two possible directions of rotation, so the experiments will be very simple.

When an adjuster 8 is used to compensate/allow for of "Transmission ratio change rotation", it is recommended that the adjuster 8 starts to provide/allow rotational adjustment slightly before rotational adjustment to compensate/allow for of "Transmission ratio change rotation" is required. Since it is better to have the adjuster 8 unlocked to compensate/allow for of "Transmission ratio change rotation" earlier, than later (where uncompensated "Transmission ratio change rotation" can cause large stresses in the transmission belt and prevent a cone from moving axially).

The direction of "Transmission ratio change rotation" of a cone can depend on the configuration of the CVT 4's of the CVT 6, the axial movement of said cone ("increasing transmission diameter change of said cone" or "decreasing transmission diameter change of said cone"), and the rotational position of said cone. Here the direction of "Transmission ratio change rotation" of a cone for all possible cases can be easily determined through experimentation (there are only two possible directions for all cases).

An experiment to determine the direction of "Transmission ratio change rotation" of the cone(s) of a CVT 6 can be made by using a Test CVT. A Test CVT can be a CVT 6 for which the cones are mounted so that they can each be set to either "freely rotate relative to the shaft/spline on which they are mounted" or "locked relative to the shaft/spline on which they are mounted". Here "Transmission ratio change rotation" of a cone for a given axial movement and a given rotational position can be easily be observed by first allowing said cone to "freely rotate relative to the shaft/spline on which it is mounted" while keeping all other cones "locked relative to the shaft/spline on which they are mounted", and then changing the axial position of said cone and observing the rotation due to it. By using this procedure repeatedly, the "Transmission ratio change rotation" for all axial movements and all rotational positions of a cone can be determined for all cones.

In some instances, the direction of rotation of "Transmission ratio change rotation" of a cone depends on the rotational position of said cone relative to its transmission belt. If so, this depends on where the neutral point (referred to as Point N) is positioned relative to the Point M of its cone. Point N is the contact point between a cone and its transmission belt that doesn't substantially rotate/move due to changes in the transmission diameter of said cone. Point M of a cone is the point were no rotational sliding between said cone and its torque transmitting member occur due to axial position change of said torque transmitting member relative to said cone. See U.S. Pat. No. 7,722,490 B2 for detailed explanation regarding this.

Here experimentation using the Test CVT of the previous paragraph can be used to determine the direction of rotation of "Transmission ratio change rotation" of a cone for the different relative rotational positions of said cone, such as "Point N positioned behind Point M", and Point N positioned ahead of Point M".

If the direction of rotation of "Transmission ratio change rotation" of a cone depends on the rotational position of said cone relative to its transmission belt and only one adjuster 8 is used to compensate for "Transmission ratio change rotation", then the duration at which the axial position of a cone can be changed needs to be shorten so that it is not longer than the longest duration at which the direction of rotation of "Transmission ratio change rotation" of said cone is in one direction.

If two adjusters 8 are used to compensate for "Transmission ratio change rotation" of a cone, the axial position of said cone can be changed during an interval where changes in the direction of rotation of "Transmission ratio change rotation" of said cone occur.

One method to allow axial position change of a cone during an interval where changes in the direction of rotation of "Transmission ratio change rotation" of said cone occur, is by using motorized adjusters 8 and having both adjusters 8 of the cones that are mounted on the same spline/shaft rotate in the same direction (preferably faster than required) during axial position change of one of said cones or a cone to which said cones are coupled. This allows/compensates for clockwise and counter-clockwise "Transmission ratio change rotation" of the cone which axial position is changed, since here one adjusters 8 allows/compensates for "Transmission ratio change rotation" in one direction and the other adjusters 8 allows/compensates for "Transmission ratio change rotation" in the other direction. The torque of the adjusters 8 should be limited so that they can only allow "Transmission ratio change rotation" in the direction they are rotating. In order to ensure that the tension in the transmission belt of the cone which axial position is changed remains low, the adjuster 8 of the cone used for torque transmission should rotate the opposite direction of a releasing torque (a releasing torque is a torque that releases the tension in its transmission belt). This method is referred to as the "Active adjusters on the same shaft method".

Another method to allow axial position change of a cone during an interval where changes in the direction of rotation of "Transmission ratio change rotation" of said cone occur, is by using a configuration of a CVT 6 where all cones are mounted on an adjuster (see FIG. 8), and for the CVT 4 for which the axial position of a cone is changed, having the adjusters 8 of the cone on the input shaft/spline and the adjuster 8 of the cone on the output shaft/spline rotate in the same direction during axial position change of said cone. Here one adjusters 8 allows/compensates for "Transmission ratio change rotation" in one direction and the other adjusters 8 allows/compensates for "Transmission ratio change rotation" in the other direction. The torque of the adjusters 8 should be limited so that they only allow "Transmission ratio change rotation" in the direction they are rotating. For this method the direction of rotation of the adjusters 8 (besides rotating in opposite directions) should be in the direction such that at least one cone of the CVT 4 for which the axial position of a cone is changed is rotated in the direction "the cone needs to rotate" or "the cone will need to rotate after its axial position is changed" due to having cones of different diameters mounted on the same shaft/spline; here the adjusters 8 can simply stall or slip when their rotation are not needed. This method is referred to as the "Active adjusters on the same CVT method".

It can be possible that the end of a torque transmitting member of a cone that has just disengaged its transmission belt, re-engages with its transmission belt because of "Transmission ratio change rotation". In order to avoid this, for situations where applicable, axial position changing of a cone should be started after a cone has rotated sufficiently past from "the position where the end of its torque transmitting member has disengaged its transmission belt" in a manner such that re-engagement of said end with said transmission belt due to "Transmission ratio change rotation" will not occur.

For the "Active adjusters on the same shaft method", under certain situations (such as low speed and high torque situations), the tension in the transmission belt for which the tension was reduced and for which the axial position of its cone(s) is changed, can significantly increase due to "Transmission ratio change rotation". Unless it can be ensure that this is not happening under all operating conditions of the CVT 6, the "Active adjusters on the same CVT method" is preferred over the "Active adjusters on the same shaft method", since otherwise there is no advantage in reducing the tension in a transmission belt. Unlike the "Active adjusters on the same shaft method", for the "Active adjusters on the same CVT method" no rotation of the input shaft/spline or output shaft/spline in order to compensate for "Transmission ratio change rotation" is required, since the compensating rotations of the adjusters 8 relative to their shafts/splines are sufficient. When rotation of the input shaft/spline or output shaft/spline in order to compensate for "Transmission ratio change rotation" is required, large resistance to rotation of the input shaft/spline or the output shaft/spline can significantly increase the tension in the transmission belt which tension was reduced.

The required and torque and speed of an adjuster 8 can easily be obtained through trial-and-error and experimentation. "Transmission ratio change rotation" can be attributed to: a) "belt curvature change rotation", which is rotation due to longitudinal movements of the slack side and/or tense side of a transmission belt relative to its cone in order to provide/remove slack due to changes in the transmission diameter of its cone; and b) "member curvature change rotation", which is rotation due to changes in the curvature of the torque transmitting member of the cone which axial position is changed.

If the axial position of a cone is changed so that the transmission circumference of its cone increases or decreases by an arc length of one full tooth for all axial position changing steps, then the maximum "belt curvature change rotation" for all axial position changing steps is one full tooth and the maximum "member curvature change rotation" for all axial position changing steps is also one full tooth. As such the maximum "Transmission ratio change rotation", which is due to "belt curvature change rotation" and "member curvature change rotation" is two teeth.

The angular distance of two teeth depends on the total amount of teeth width of the transmission circumference. If the transmission circumference of a cone is 20 teeth, then the angular distance of two teeth is $2/20$ times 360 deg. This angular distance has to be covered during the axial position changing interval of said cone. From this theory, a ball park estimate for the required rotational speed and angular acceleration of the adjusters 8 for the most demanding operating condition (which should occur when the axial position changing interval duration of a cone is shortest and the transmission circumference of a cone is smallest) of the CVT 6 can be obtained. This ball park estimate and trial-and-error experimentation can then be used to obtain the actual minimum required rotational speed and angular acceleration of the adjusters 8 that allows for axial position change of all cones without interruption due to "Transmission ratio change rotation" for all operating conditions of the CVT 6.

Figure 6:
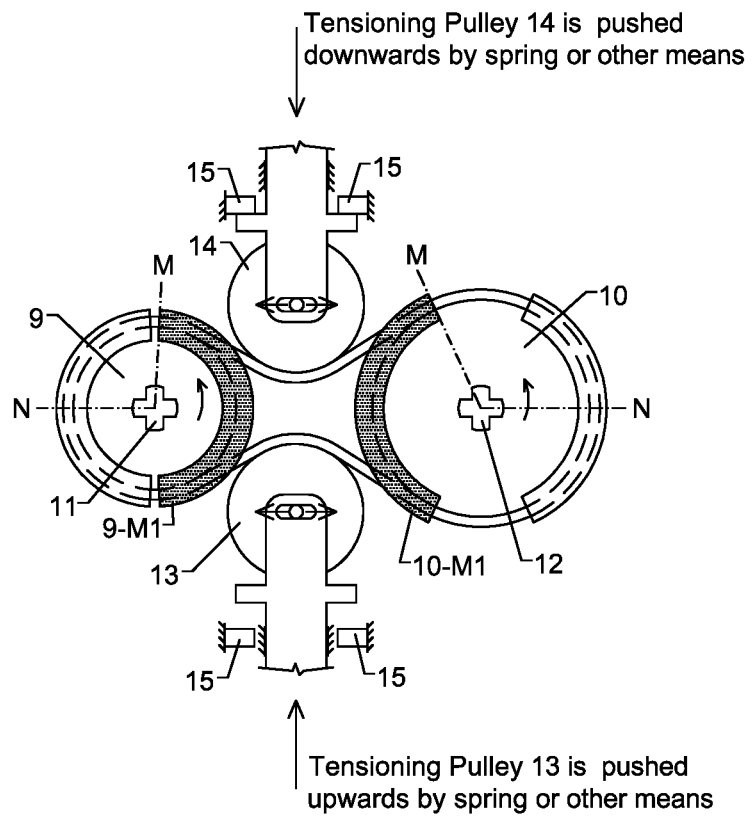
FIG. 6 shows front-view of the preferred CVT 6.

"Transmission ratio change rotation" due to "belt curvature change rotation" in the slack side portion of the transmission belt can also be compensated by having the tensioning pulley/support pulley on the slack side of the transmission belt provide and remove slack in the slack side of the transmission belt as needed in order to compensate for "Transmission ratio change rotation" due to "belt curvature change rotation" in the slack side of the transmission belt. A tensioning pulley/support pulley on the slack side of the transmission belt is shown in FIG. 6 where it is labeled as Tensioning Pulley 13.

If a tensioning pulley/support pulley on the slack side of the transmission belt is used to compensate for "Transmission ratio change rotation" due to "belt curvature change rotation" in the slack side of the transmission belt (by providing an removing slack in the slack side as necessary), then the adjusters 8 of a CVT 4 do not need to provide and remove slack in the slack side of the transmission belt to compensate for "Transmission ratio change rotation" due to "belt curvature change rotation" in the slack side of the transmission belt; so that both adjusters 8 of the CVT 4 can be rotated in the directions that increase slack in the tense side of the transmission belt if allowed by "Transmission ratio change rotation due to "member curvature change rotation" or if "Transmission ratio change rotation due to "member curvature change rotation" is compensated/allowed using other means. Here slack that needs to be removed from the tense side of the transmission belt can be compensated by the rotation of the driven cone, which rotates the slack from the tense side to the slack side.

A tensioning pulley/support pulley on the tense side of the transmission belt that provides and removes slack in the tense side of the transmission belt as needed in order to compensate for "Transmission ratio change rotation" "due to "belt curvature change rotation" in the tense side of the transmission belt can also be used. The term tensioning pulley/support pulley is used to specify that the pulley is used for "tensioning its transmission belt" and for "supporting the shape of its transmission belt in manner as to ensure that a portion of a torque transmitting member of its cone is always engaged with its transmission belt".

Unlike the slack side tensioning pulley/support pulley which needs to provide and remove slack during all operating conditions, the tense side tensioning pulley/support pulley can be designed so that it only provides and removes slack when the tension in its transmission belt has been reduced. As such, here a maximum contraction stop, which engages with the tense side tensioning pulley/support pulley and stops the movement of the tense side tensioning pulley/support pulley when the tension in the transmission belt is not reduced, can be used. Here once the tension in the transmission belt has been reduced, the tense side tensioning pulley/support pulley is pushed away from its maximum contraction stop by its tensioning force, which can be provided by spring(s), weight(s), etcetera; and this should give the tense side tensioning pulley/support pulley a "contracting and extending movements range" that can be used to provide and remove slack when required. Here the contracting movements range allow the tense side tensioning pulley/support pulley to move away from its transmission belt, and the extending movements range allow the tense side tensioning pulley/support pulley to move towards from its transmission belt.

Figure 7:
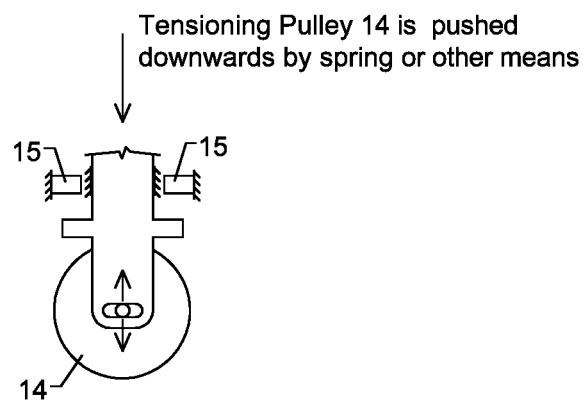
FIG. 7 shows front-view of a tensioning pulley 14 that is not engaged with its maximum contraction stop 15.

A front-view of a CVT 4 that uses slack side tensioning pulley/support pulley and a tense side tensioning pulley/support pulley is shown in FIG. 6. In FIG. 6, the slack side tensioning pulley/support pulley is labeled tensioning pulley 13, and the tense side tensioning pulley/support pulley is labeled tensioning pulley 14. Tensioning pulley 14 is also shown in FIG. 7. In FIG. 6, tensioning pulley 14 is engaged with its maximum contraction stop 15 since the tension in its transmission belt has not been reduced. In FIG. 7, tensioning pulley 14 is not engaged with its maximum contraction stop 15 since the tension in its transmission belt has been reduced.

Also shown in FIG. 7 are the up and down directions of the contracting and extending movements of tensioning pulley 14; tensioning pulley 13 can have the same directions. If desired other directions of the contracting and extending movements of the tensioning pulleys can be used, such as diagonally for example, since the directions of the contracting and extending movements of the tensioning pulleys can be any directions that can remove and provide transmission belt slack.

It is also recommended that the slack side tensioning pulley/support pulley (labeled as tensioning pulley 13 in FIG. 6 also has a maximum contraction stop 15. Here the maximum contraction stop can be used to prevent excessive contracting movement of the slack side tensioning pulley/support pulley due to increase in tension in the slack side of its transmission belt, which can be due to a releasing torque provide by its adjuster(s) 8 or due to rotations of its cone(s) due to having to compensate for having cones of different diameters mounted on the same shaft/spline.

If both a slack side tensioning pulley/support pulley and a tense side tensioning pulley/support pulley are used, then the contracting and extending movements of the pulleys can "compensate for Transmission ratio change rotation" and can "compensate for having cones of different diameters mounted on the same shaft/spline during axial position changing of a cone"; in addition to "accommodating for the transmission diameter change of a cone". If the transmission belts of a CVT 6 are removed, then "changing the axial position of a cone of a shaft/spline while not changing the axial position of the other cone of that shaft/spline" or "having cones with different transmission diameters mounted on a common shaft/spline" is not a problem. This is because "changing the axial position of a cone of a shaft/spline while not changing the axial position of the other cone of that shaft/spline" or "having cones with different transmission diameters mounted on a common shaft/spline" is only a problem if the transmission belts of a CVT 6 are not removed and either or both the tense sides or slack sides of the transmission belts are of a fixed length, since you cannot have two different CVT's constrained to a common input shaft/spline and output shaft/spline. Besides removing the transmission belts, having the slack side tensioning pulley/support pulley and the tense side tensioning pulley/support pulley provide and remove slack as needed also removes the constrains imposed by the transmission belts.

If both a slack side tensioning pulley/support pulley and a tense side tensioning pulley/support pulley are used, the tensioning forces of the pulleys should be balanced such that when the tension in the transmission belt has been reduced, both pulleys are positioned so that they have a sufficient "contracting and extending movement range" to provide and remove slack as needed to "compensate for Transmission ratio change rotation", to "accommodate for the transmission diameter change of a cone", "to compensate for having cones of different diameters mounted on the same shaft/spline during axial position changing of a cone", and by compensating for any other rotations/needs that might occur during axial position changing of their cone.

Here it is preferred that the tensioning forces of the pulleys are provided by springs, since here slightly unbalanced tensioning forces of the pulleys can be balanced/equaled by slight movements of the pulleys. The required "contracting and extending movement ranges" of the pulleys can be obtained through "trial and error" experimentation; as a conservative estimate that can be refined through "trial and error" experimentation, a movement range that allows for 3 teeth rotation of a cone in both directions can be used. Also here the axial position of a cone should only be changed after the slack side tensioning pulley/support pulley and the tense side tensioning pulley/support pulley have reached their balanced positions.

For the preferred CVT 6, the axial positions of the cones of a CVT 6 are changed in manner such that when there are "cones with different transmission diameters mounted on a same shaft/spline", the next axial position change of a cone is always such that the transmission diameters of said "cones with different transmission diameters mounted on a same shaft/spline" are equal. Therefore, since during regular operations (non-"transmission ratio changing" operations) of a preferred CVT 6 the transmission diameters of all cones mounted on the same shaft/spline are equal, there should be only one shaft/spline at a time for which there are "cones with different transmission diameters mounted on a same shaft/spline".

During axial position changing of a cone of the preferred CVT 6, when there are no "cones with different transmission diameters mounted on the same shaft/spline", before or immediately after the axial position of a cone (referred to as the moved cone) is/has been changed, one adjuster 8 of a cone (referred to as the rotated cone) needs to "rotate preferably faster than required" or "have its worm gear-gear drive unlocked" in the direction "the rotated cone will need to rotate in order to "compensate for having cones with different transmission diameters mounted on a same shaft/spline" after the axial position of the moved cone is changed".

Here if a motorized adjuster 8 is used, then the adjuster 8 can be used to rotate its cone before the axial position of a cone is changed; since this type of adjusters 8 only allows rotation in one direction and here the adjuster 8 can simply stall, slip, or stop when its rotation is "not" or "not yet" needed. If a non-motorized adjuster 8 is used and the rotated cone is not a cone of the "CVT 4 which transmission belt tension has been reduced", then it is recommended that the adjuster 8 is only unlocked immediately after the axial position of a cone has been changed, so that it does not rotate in the direction that reduces the tension in its transmission belt.

Also here the rotated cone is only "rotated" or "allowed to rotate" in the direction that increases the tension in the tense side of its transmission belt; the selection of whether the rotated cone is a cone that is coupled to the transmission belt which tension was reduced, or a cone that is coupled to the transmission belt which tension was not reduced should depend only on this. Since here if the rotated cone is a cone of the "CVT 4 which transmission belt tension has been reduced", then after the axial position of the moved cone, the tension in the transmission belt of the "CVT 4 with which the CVT 4 of the rotated cone is alternately used to transfer torque" can be reduced by using one of its adjuster 8 to rotate one of its cone in the direction needed to "compensate for having cones with different transmission diameters mounted on the same shaft" (which is also the direction of rotation for a releasing torque for the "CVT 4 with which the CVT 4 of the rotated cone is alternately used to transfer torque"), so that said rotated cone can be slowed-down and eventually locked by its adjuster 8. This prevents having adjusters 8 of both CVT 4's become unlocked, which is undesirable since relocking an adjuster 8 under load can require a large torque. And since here if the rotated cone is a cone of the "CVT 4 which transmission belt tension is not reduced", then after the axial position of the moved cone, the transmission belt tension in said "CVT 4 which transmission belt tension is not reduced" becomes reduced; this is because its adjuster 8 is rotating in the direction that increases the tension in its transmission belt in order to prevent an increase in transmission belt tension in the other CVT 4 and the torque of an adjuster 8 should not be large enough such that it can increase the transmission belt tension in its CVT 4. Also here the moved cone and the rotated cone can be or cannot be the same cone, depending on the situation.

According to the previous paragraph, during axial position changing of a cone of the preferred CVT 6, when there are no "cones with different transmission diameters mounted on the same shaft/spline", before or immediately after axial position changing of a cone and until relived by an adjuster 8 of the other CVT 4 or until its rotation is not needed anymore due to a subsequent "axial position changing of a cone" that equalize the transmission diameters of all cones mounted on the same shaft, the direction that an adjuster 8 "rotates" or "allows to rotate" its cone in order to "compensate for having cones with different transmission diameters mounted on a same shaft/spline after the axial position of the moved cone is changed" is in the direction that increases the tension in the tense side of its transmission belt. Here for two cones mounted on a common input shaft/spline, the smaller cone needs to be "rotated" or "allowed to rotate" by its adjuster 8 in the direction said common input shaft/spline is rotating; or a cone that is mounted on an output shaft/spline and that is coupled to said smaller cone, needs to be "rotated" or "allowed to rotate" in the opposite direction said output shaft/spline is rotating (here the transmission diameters of the cones mounted said output shaft/spline should be identical). And here for two cones mounted on a common output shaft/spline, the larger cone needs to be "rotated" or "allowed to rotate" by its adjuster 8 in the opposite direction said common output shaft/spline is rotating; or a cone that is mounted on an input shaft/spline and that is coupled to said larger cone, needs to be "rotated" or "allowed to rotate" in the direction said input shaft/spline is rotating (here the transmission diameters of the cones mounted said input shaft/spline should be identical).

During axial position changing of a cone of the preferred CVT 6, when there are "cones with different transmission diameters mounted on the same shaft/spline", before and during axial position changing of a cone, the cone that is used to "compensate for having cones with different transmission diameters mounted on a same shaft/spline" should be rotated by its adjuster 8 in the direction required (see previous two paragraphs and the paragraph below). Here after the axial position changing of a cone, the transmission diameters of all cones mounted on a same shaft/spline should be equal so that there is no need to have an adjuster 8 "compensate for having cones with different transmission diameters mounted on a same shaft/spline"; so that the active/unlocked adjuster 8 can simply be stopped/braked/"locked when possible".

Regarding the previous paragraph, during axial position changing of a cone of the preferred CVT 6, when there are "cones with different transmission diameters mounted on the same shaft/spline" due to a first axial position changing of a cone (see previous 4 paragraphs), then either: a) in order to the release tension in the transmission belt of the "CVT 4 for which the axial position of a cone is to be changed" and to "compensate for having cones with different transmission diameters mounted on a same shaft/spline", a larger cone of said CVT 4 that is mounted on the input shaft/spline should be rotated in the opposite direction said input shaft/spline is rotating by its adjuster 8; or smaller cone of said CVT 4 that is mounted on the output shaft/spline should be rotated in the direction said output shaft/spline is rotating by its adjuster 8. Or b) in order to maintain the released tension in the transmission belt of the "CVT 4 for which the axial position of a cone is to be changed" and to "compensate for having cones with different transmission diameters mounted on a same shaft/spline", a smaller cone of said CVT 4 that is mounted on the input shaft/spline should be rotated in the direction said input shaft/spline is rotating; or larger cone of said CVT 4 that is mounted on the output shaft/spline should be rotated in the opposite direction said output shaft/spline is rotating.

During axial position changing of a cone, in order to prevent an increase in tension in the transmission belt for which the tension was reduced (which should be the transmission belt of the cone which axial position is to be changed) due to changes in the transmission diameter of the cone which axial position is changed (which occurs when the transmission diameter for a cone mounted on the input shaft/spline is increased, or when the transmission diameter for a cone mounted on the output shaft/spline is decreased), the contracting and extending movements of the slack side tensioning pulley/support pulley and the tense side tensioning pulley/support pulley should be able to "compensate for having cones with different transmission diameters mounted on a same shaft/spline" during axial position changing of a cone. Here it is not required that only the contracting and extending movements of the tensioning pulleys are used to "compensate for having cones with different transmission diameters mounted on a same shaft/spline" during axial position changing of a cone; however, here it is required that the ability of the contracting and extending movements of the tensioning pulleys to "compensate for having cones with different transmission diameters mounted on a same shaft/spline" has not been exhausted during axial position changing of a cone. When the axial positions of a cone is changed such that its circumference is increased or decreased by one tooth during an axial position changing interval; then during one full rotation of the cone, the maximum amount of rotation needed to compensate for having cones with different transmission diameters mounted on a same shaft/spline is "one tooth" or "slightly more than one tooth", so this should be feasible.

The tension in the transmission belt of a "CVT 4 for which the transmission belt tension was reduced" can be increased by rotating a cone of the other CVT 4 in the direction that reduces its transmission belt tension, and if necessary slowing-down and eventually locking all cones of said "CVT 4 for which the transmission belt tension was reduced". Since increasing the tension in the transmission belt of one CVT 4 reduces the tension in the transmission belt of the other CVT 4. For example, for an input shaft/spline on which a smaller cone (smaller transmission diameter cone) and larger cone (larger transmission diameter cone) are mounted; when said smaller cone is currently rotated by its adjuster 8 in the direction said input shaft/spline is rotating in order "compensate for having cones with different transmission diameters mounted on a same shaft/spline", then "the tension of the transmission belt of said larger cone can be reduced and the tension of the transmission belt of said smaller cone can be increased" by rotating said larger cone in the opposite direction said input shaft/spline is rotating in order "compensate for having cones with different transmission diameters mounted on a same shaft/spline" and slowing-down and eventually locking the adjuster 8 of said smaller cone.

Changing the axial position of a cone can also increase the tension in the transmission belt for which the tension is reduced when no adjuster 8 of the CVT for which the transmission belt tension is reduced is active or unlocked. Examples of this is when the transmission diameter of a cone mounted on the input shaft/spline is increased and the slack that can be provided by its tense side tensioning pulley/support pulley has been exhausted; and when the transmission diameter of a cone mounted on the output shaft/spline is decreased and slack that can be provided by its tense side tensioning pulley/support pulley has been exhausted. It is recommended that this only occurs after the axial position of a cone has been changed, since otherwise there might be little benefit in reducing the tension in a transmission belt in order to reduce the force needed to change the axial position of a cone.

By using a slack side tensioning pulley/support pulley and a tense side tensioning pulley/support pulley to allow/compensate for "Transmission ratio change rotation", the need to accurately determine the direction(s) of "Transmission ratio change rotation" becomes unnecessary.

Preferred Transmission Ratio Changing Procedure for a CVT 6

In this section, the "preferred transmission ratio changing procedure for a CVT 6" that can be used to reduce the torque requirements of the adjusters (adjusters 8) of a preferred CVT 6 is described. Using the "preferred transmission ratio changing procedure for a CVT 6", the torque requirements of the adjuster motors can be reduced to a level where the adjuster motors only need sufficient torque to unlock their worm gear-gear drives (the worm gear-gear drives of their adjusters) when needed and sufficient torque (braking torque if necessary) to relock their worm gear-gear drives when they are "slowing-down and about to change their direction of rotation". Here during relocking, the adjuster motors are assisted by the "static locking friction" of their worm gear-gear drives, and during unlocking the adjuster motors need to overcome the "static locking friction" of their worm gear-gear drives.

An adjuster is mounted on a shaft/spline and is used to controllably lock and unlock a cone mounted on it. When an adjuster is locked, it does not allow relative rotation between its cone and the shaft/spline on which it is mounted; and when an adjuster is unlocked, it allows relative rotation between its cone and the shaft/spline on which it is mounted.

An example of an adjuster is an adjuster that comprises of a housing that can be mounted on a shaft/spline in a manner so that it is fixed for rotation relative to said shaft/spline. Attached to said housing are a worm gear, an adjuster motor that can rotate said worm gear directly or through means for coupling (coupling gears, etc.), and a gear that engages with said worm gear. When said worm gear is rotating, said gear rotates relative to said housing. Attached to said gear is an output shat that is used to attach the cone of the adjuster, in a manner so that the rotation of said gear can be used to rotate said cone relative to its shaft/spline. Also, an adjuster motor should also be able to rotate at a sufficient speed to keep its worm gear-gear drive unlocked. See the "Adjusters for a CVT 6" section for additional details for an adjuster.

An unlocked adjuster should allow rotation at the speed required even when the "speed its adjuster motor rotates its adjuster output shaft/spline" is less than the "speed applied on its adjuster output shaft/spline (such as due to transmission ratio change rotation, having cones of with different diameters mounted on the same shaft/spline, etc.)". Based on worm gear theory, here the worm gear-gear drive should be selected such that: a) the static friction of the worm gear-gear drive is large enough to have the worm gear-gear drive be self-locking; and b) the dynamic (rotating) friction of the worm gear-gear drive is not be large enough to have the worm gear-gear drive be self-locking. Or when the adjuster motor of an adjuster is always ON when an adjuster is unlocked, the worm gear-gear drive can also be selected such that: a) the static friction of the worm gear-gear drive is large enough to have the worm gear-gear drive be self-locking; and b) the dynamic friction of the worm gear-gear drive at "the rotating speed of the worm gear as can be provided by the adjuster motor" is not be large enough to have the worm gear-gear drive be self-locking (here the dynamic friction of the worm gear-gear drive at a rotating speed of the worm gear that is slower than "the rotating speed of the worm gear as can be provided by the adjuster motor" can still be self-locking; but at speeds "equal to and higher" than "the rotating speed of the worm gear as can be provided by the adjuster motor", the worm gear-gear drive should not be self-locking).

What static coefficient of friction of the worm gear-gear drive allows for reliable locking of an adjuster can easily be determined through simple experimentation.

Once an adjuster is released when it needs to be released, the adjuster motor should be operated so that it will not add resistance that will stop the released adjuster from being released, as can occur in situations where the cone of an adjuster needs to rotate at a higher speed than the speed that can be supplied by its adjuster motor (released means being able to rotate at any speed required). As such it is recommended that here the adjuster motor is operated so as to provide as little rotating resistance as possible when its speed is slower than the speed of its cone. If a brushed electric motor is used as the adjuster motor, it might be desirable to leave it ON, since the switching of the poles are controlled by the rotation of the rotor. And if a brushless electric motor is used as the adjuster motor, it might be desirable to turn it off, since the switching of the poles are controlled by an electric motor controller and not the rotation of the rotor. Experimentation or somebody skilled in the art should be able to determine how to operate an electric motor with as little rotating resistance as possible.

If it is desirable, a rotation sensor or a rotational speed sensor that measures the rotation or rotational speed of the worm gear can be used to turn an electric motor off "once an adjuster is released" or "once an adjuster is released and once the worm gear has reached a pre-set rpm speed".

The adjuster motor of an adjuster should be selected so that it can be rotated at the necessary speed required (without overheating or other damages). If a shaft/spline of a cone rotates at 3000 rpm, and the transmission diameter of one cone is equal to 30 teeth and the transmission diameter of other cone is equal to 31 teeth, then the speed one cone has to be rotated relative to the other is, V_cone=[(31−30)/30] *3000=100 rpm. If the worm gear-gear drive has a 25:1 gear ratio, then the adjuster motor has to be able to be rotated at, V_adjuster motor=100 rpm*25/1=2500 rpm. Simple experimentation can be used if this is incorrect.

When an unlocked adjuster is slowed down in order to be eventually stopped/locked (see below for details), its adjuster motor should be stopped, made to rotate in the opposite direction of the direction it is currently rotating, or made to apply a braking torque until the adjuster is locked.

When an adjuster is unlocked but "the speed its adjuster motor rotates its adjuster output shaft" is less than "the speed applied on its adjuster output shaft/spline", then an increase in tension in the slack side or tense side of the transmission belt of its CVT 4 can occur; this is due to the pulling tension required to rotate the unlocked adjuster output shaft. If this causes problems, the tension of the tensioning pulleys/ support pulleys of its CVT 4 can be increased; or the speed of its adjuster motor can be increased so that the "speed its adjuster motor rotates its adjuster output shaft" is equal to or more than the "speed applied on its adjuster output shaft". Or, if desired an external motor (which avoids the speed reduction gearing of the worm gear-gear drive of the adjuster) can be used to rotate the cone of an adjuster as required.

Alternately an adjuster can also be designed so that the "kinetic locking friction force" of its worm gear-gear drive is never less than the rotational force applied to its adjuster output shaft. Since here the adjuster will not allow free rotation at any speed required, its adjuster motor needs to be able rotate its adjuster output shaft at the speed required or faster for all operating conditions of its CVT.

Instead of using an adjuster motor to controllably lock and unlock an adjuster, a brake can be used. Here when an adjuster needs to be locked, the brake applies braking friction (directly or through means for coupling such as gears, etc.) to the shaft of the worm gear of the worm gear-gear drive; and when an adjuster needs to be unlocked, the brake does not apply braking friction to the shaft of the worm gear of the worm gear-gear drive. If desired, a brake can also be used in conjunction with an adjuster motor to controllably lock and unlock an adjuster.

If a brake is used by itself, then the brake needs to be able to provide sufficient braking that prevents a worm gear-gear drive from becoming unlocked for all regular operating conditions of its CVT. Here the worm gear-gear drive itself should not be self-locking, since it needs to be unlocked when the brake is released.

A brake can comprise of a braking disk that is coupled directly or through means for coupling to the shaft of the worm gear of the worm gear-gear drive, and a braking shoe that is pushed towards the braking disk by a spring and that can be controllably pulled away from the braking disk by a solenoid.

When a brake is used with an adjuster motor; then the "locking (frictional) force of the worm gear-gear drive when the worm gear is stationary" can be equal, smaller, or larger than the "unlocking (rotating) force of the worm gear-gear drive when the worm gear is stationary". Here the brake and the adjuster motor should be selected so that they can lock and unlock their adjuster as needed for all regular operating conditions of their CVT.

Instead of using an adjuster motor or brake to controllably lock and unlock an adjuster, an indexing mechanism that can be controllably locked and unlocked can be used instead. The indexing mechanism can comprise of an index wheel with cavities, which is coupled directly or through means for coupling to the shaft of the worm gear of the worm gear-gear drive, and a locking mechanism for controllably locking and unlocking the index wheel. Said locking mechanism can comprise of a lock that can be inserted into a cavity of the index wheel, wherein said lock is pushed towards said index wheel by a spring and wherein said lock can be controllably pulled out of an index wheel cavity by a solenoid. Here the worm gear-gear drive of the adjuster should not be self-locking, since it needs to be unlocked when the indexing mechanism is unlocked.

If desired an indexing mechanism by itself, without a worm gear-gear drive can be used to controllably lock and unlock an adjuster. But for this design, the force needed to unlock an adjuster are most likely larger; and the shock-loads during relocking of an adjuster are also most likely larger. The indexing mechanism used here can comprise of an index wheel with cavities that is coupled directly or through means for coupling to the output shaft of its adjuster, which is the shaft that is fixed for rotation relative to the cone of said adjuster; and a locking mechanism for controllably locking and unlocking the index wheel, which is fixed for rotation relative to the spline/shaft of the cone of said adjuster. Said locking mechanism can comprise of a lock that can be inserted into a cavity of the index wheel, wherein said lock is pushed towards said index wheel by a spring and wherein said lock can be controllably pulled out of an index wheel cavity by a solenoid.

The function of an adjuster of a cone is to either "lock the rotational position of said cone relative to its spline/shaft" or "unlock said cone for rotation in the direction it is being pulled by its transmission belt relative to its spline/shaft". As such, the process of using an adjuster that uses an adjuster motor, a brake, or an indexing mechanism are basically identical. But, while an adjuster that uses an adjuster motor can lock itself once the speed of its worm gear has reduced to a speed where the friction of the worm gear-gear drive has sufficiently increased, an adjuster that uses a brake or an indexing mechanism has to be controllably locked. An adjuster should only be controllably locked once "the rotation it allows" is not needed anymore.

Figure 9:
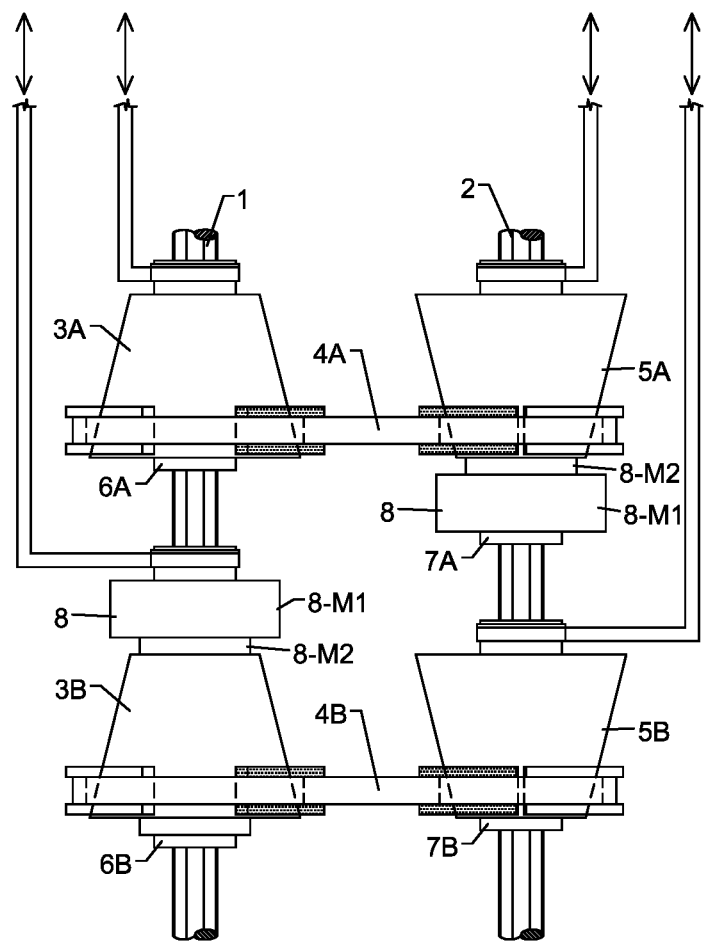
FIG. 9 shows a top-view of a preferred CVT 6 for which the adjusters 8 are each mounted on a different shaft/spline.

A preferred CVT 6 (a CVT 6 is a CVT that uses two substantially identical CVT 4's, see FIGS. 5 and 9 for examples) is a CVT 6 that uses one adjuster for each CVT 4 (it doesn't matter on which shaft/spline of their CVT 4 the adjusters are mounted); and a CVT 6 for which each CVT 4 has both a slack side tensioning pulley/support pulley and a tense side tensioning pulley/support pulley (see FIG. 6). The slack side tensioning pulleys/support pulleys and the tense side tensioning pulleys/support pulleys have sufficient (preferably slightly more, to prevent exhaustion of their ability to provide and remove slack during axial position changing of a cone of their CVT) "contracting and extending movement ranges" to provide and remove slack (slack throughout this disclosure refers to transmission belt slack) needed to allow for axial position changing of a cone of their CVT for all operating conditions of their CVT even when no adjuster is active, by "compensating for Transmission ratio change rotation, by "accommodating for the transmission diameter change of a cone", by "compensating for having cones of different transmission diameters mounted on the same shaft/spline", and by compensating for any other rotations/needs that might occur during axial position changing of their cone.

Unlike a slack side tensioning pulley/support pulley (labeled as 13 in FIG. 6), which needs to be able to provide and remove slack during all operating conditions of its CVT when needed, a tense side tensioning pulley/support pulley (labeled as 14 in FIG. 6) can be designed such that it can only provide and remove slack when the tension in its transmission belt has been reduced. As such, here a maximum contraction stop (labeled as 15 in FIG. 6), which engages with the tense side tensioning pulley/support pulley (labeled as 14 in FIG. 6) and stops the movement of the tense side tensioning pulley/support pulley when the tension in the transmission belt is not reduced, can be used. Here once the tension in the transmission belt has been reduced, the tense side tensioning pulley/support pulley should be pushed away from its maximum contraction stop by its tensioning force (as shown as in FIG. 7); and this should give the tense side tensioning pulley/support pulley a "contracting and extending movements range" that can be used to provide and remove slack when required.

It is recommended that both the slack side tensioning pulley/support pulley and the tense side tensioning pulley/support pulley have each a "maximum contraction stop". The "maximum contraction stops" should be used to limit the movements of the tensioning pulleys/support pulleys to a range that allows for proper operation.

It is recommended that the tensioning forces of the tensioning pulleys/support pulleys are provided by compression springs, which tensioning forces increase as they are compressed more. Since here slightly unbalanced tensioning forces of the tensioning pulleys/support pulleys can be balanced/equaled by slight movements of the tensioning pulleys/support pulleys. For example, after the tension in their transmission belt has been reduced, when the spring of the tense side tensioning pulley/support pulley is more compressed than the spring of the slack side tensioning pulley/support pulley, then the larger tensioning force of the spring of the tense side tensioning pulley/support pulley can reduce the compression in the spring of the tense side tensioning pulley/support pulley and increase the compression in the spring of the slack side tensioning pulley/support pulley until the tensioning pulleys/support pulleys have reached their equilibrium position. Using tensioning springs or other tensioners for which their transmission belt tensioning force increase as their "available contraction distance" is reduced can also be used. The "available contraction distance" of a tensioning pulley/support pulley is the distance a tensioning pulley/support pulley can be moved towards its "maximum contraction stop" (see FIG. 6), and it determines the amount of slack that can be provided by that tensioning pulley/support pulley when needed.

In general (there can be exceptions for steps d) and e) of the "preferred transmission ratio changing procedure for a CVT 6" shown below if desired), the stiffness of the tensioners of the tensioning pulleys/support pulleys, the ranges of the tensioning pulleys/support pulleys, and the parameters (torque, speed, unlocked frictional resistance, etc.) of the adjusters should be selected so that when the tension in their transmission belt has been reduced, the tense side tensioning pulley/support pulley and the slack side tensioning pulley/support pulley each have a sufficient "contracting and extending movement range" to provide and remove slack as needed to allow for axial position changing of a cone for all operating conditions of their CVT without excessively stretching a transmission belt, by "compensating for Transmission ratio change rotation", by "accommodating for the transmission diameter change of a cone", by "compensating for having cones of different transmission diameters mounted on the same shaft/spline", and by compensating for any other rotations/needs that might occur during axial position changing of their cone. This will ensure that the tension in the "transmission belt which tension has been reduced" will remain reduced during axial position changing of its cone(s). Since the transmission diameter of a cone is preferably only changed 1 tooth at a time, this should be feasible. Here when the tension in their transmission belt has been reduced, the tense side tensioning pulley/support pulley and the slack side tensioning pulley/support pulley should each have a said sufficient "contracting and extending movement range" when their adjuster is unlocked, regardless of whether the adjuster is stalling, rotating and applying a torque on said transmission belt (in whatever direction required), or simply unlocked; and when their adjuster is not unlocked Here simple trial and error experimentation and/or engineering can be used.

In order to move vertically as required, the tensioning pulleys/support pulleys can each be mounted on a spring loaded vertical slider. A spring loaded vertical slider can comprise of a vertical slider that allows for sufficient vertical movements as required, and a spring that provides sufficient tensioning forces as required. If the tensioning pulleys/support pulleys are also to be allowed to move horizontally, the spring loaded vertical sliders can each be mounted on a horizontal sliders; or the spring loaded vertical sliders can each have slotted holes into which the shafts of tensioning pulleys/support pulleys are inserted and fastened using bolts or locking rings, as partially shown in FIG. 6.

An example of a system that allows the tensioning pulleys/support pulleys to move vertically as required is shown and described in the "Detailed Design for Tensioning Pulleys Tensioning System". Besides springs, the tensioning forces for the tensioning pulleys/support pulleys can also be provided by elastomers, pneumatics/hydraulics (such as through linear actuators for example), etc.

It is recommended that the tensioning forces of the tensioning pulleys/support pulleys are not be large enough so that they significantly increase the force required to change the axial position of the cones of their CVT.

The "preferred transmission ratio changing procedure for a CVT 6" is described in the paragraphs below.

a) Initial Setup/Non-Transmission Ratio Changing Operation Configuration

Before a transmission ratio changing procedure is started, the transmission diameters of all cones mounted on a same shaft/spline (such as the input shaft/spline and output shaft/spline) are equal; and the adjuster of at least one CVT 4 is locked. This should be the configuration of the CVT 6 during non-transmission ratio changing operation.

b) Reducing Transmission Belt Tension

Next, if not already so, the tension in the transmission belt of "the CVT 4 for which the axial position of a cone is to be changed" is reduced. Here the adjuster for "the CVT 4 for which the axial position of a cone is to be changed" is unlocked if not already so, while the adjuster of the other CVT 4 remains stopped/locked/braked so that full torque transfer between its cone and its shaft/spline occurs.

Here if an adjuster that uses an adjuster motor is used, then in order to unlock the adjuster, the adjuster needs to rotate its cone relative to its shaft/spline so as to provide a releasing torque. If the shaft/spline on which an adjuster is mounted is the input shaft/spline, then the direction of rotation of its cone for a releasing torque is the direction opposite from the rotation of the input shaft/spline. And if the shaft/spline on which an adjuster is mounted is the output shaft/spline, than the direction of rotation of its cone for a releasing torque is the direction of rotation of the output shaft/spline.

And here if an adjuster that uses a brake is used, then in order to unlock the adjuster, its brake needs to be released; and if an adjuster that uses an indexing mechanism is used, then in order to unlock the adjuster, its indexing mechanism needs to be unlocked.

Once the tension in the transmission belt of "the CVT 4 for which the axial position of a cone is to be changed" has been sufficiently reduced, which can be based on "a set time duration required to achieve this" (preferred) or "a torque sensor", the adjuster used to reduce the tension in the transmission belt of "the CVT 4 for which the axial position of a cone is to be changed" should be stopped/braked/locked if it is not the adjuster of the rotated cone of the next step ("step c) First axial position changing of a cone"). But if the adjuster used to reduce the tension in the transmission belt of "the CVT 4 for which the axial position of a cone is to be changed" is the adjuster of the rotated cone of the next step, then it should be left unlocked.

If an indexing mechanism is used, then because of the incremental looking steps of the indexing mechanism, here it might not be possible to lock the adjuster (refer to the "Adjusters for a CVT 6" section for details) if needed (such as when it is not the adjuster of the rotated cone); if so, the adjuster should be locked "before" or "immediately after" axial position changing of a cone of the next step ("step c) First axial position changing of a cone") has been completed.

Regarding locking of the adjuster used to reduce the tension in the transmission belt of "the CVT 4 for which the axial position of a cone is to be changed", if an adjuster that uses an indexing mechanism is used, then in order to be able to lock the adjuster, its cone needs to rotate a sufficient amount relative to its shaft/spline so that the lock of the indexing mechanism can enter a circumferential cavity of its index wheel.

Here if it is desired to lock the adjuster used to reduce the tension in the transmission belt of "the CVT 4 for which the axial position of a cone is to be changed", before "the slack that can be provided and/or removed by the tensioning pulleys/support pulleys as needed" has been exhausted (such as during and slightly after axial position changing of a cone), then the "tension of the tensioning pulleys/support pulleys" and the "rotational frictional resistance of the worm gear-gear drive of the adjuster" should be selected such that an unlocked cone can rotate a sufficient amount relative to its shaft/spline when rotating forces are applied to that the cone even if "the slack that can be provided and/or removed by the tensioning pulleys/support pulleys as needed" has not been exhausted.

And if it is acceptable to lock the adjuster used to reduce the tension in the transmission belt of "the CVT 4 for which the axial position of a cone is to be changed" after "the slack that can be provided and/or removed by the tensioning pulleys/support pulleys as needed" has been exhausted (such as slightly after axial position changing of a cone), then the "tension of the tensioning pulleys/support pulleys" can be selected independently from the "rotational frictional resistance of the worm gear-gear drive of the adjuster". But here, unlike the set-up of the previous paragraph, the adjuster is locked while it is transmitting torque; as such, if the set-up of the previous paragraph can be easily achieved, it is recommended.

It is recommended that the index wheel of an adjuster is locked during axial position changing of a cone, otherwise it has to be locked after axial position changing of a cone has been completed.

As a ball park figure that can be refined through trial-and-error experimentation (and depending on the size of the lock and the size of the index wheel used), in order to be able to lock an adjuster during axial position changing of a cone, an unlocked index wheel of an adjuster should be able to get locked when its cone has rotated less than ¼ of a tooth width of said cone. For reliability purposes, it is desirable to be able to lock an unlocked index wheel at an even smaller rotation of its cone.

In order to reduce the amount of rotation required to lock an unlocked index wheel, a speed increasing gear train (such as a larger gear coupled to a smaller gear for example) can be used to couple the rotation of the worm to the index wheel. A speed increasing gear train will also reduce the torque at the index wheel, which is desirable.

Another approach to reduce the amount of rotation required to lock an unlocked index wheel is by using several index wheels that are constrained relative to each other for rotation (such as by stacking several index wheels to common shaft) and that are rotationally offset relative to each other; wherein each index wheel has its own lock, all locks are forced toward their index wheel at the same time, and only one index wheel is fully locked at any instance.

For reliability purposes, here in order to ensure that an adjuster is always locked, it is preferred that a "wait/pause duration to ensure the adjuster is locked after axial position changing of a cone has been completed" is used.

c) First Axial Position Changing of a Cone

It is recommended that this step is initiated immediately after "Step b) Reducing transmission belt tension", in order to avoid changes in the "contracting and extending movement ranges" of the "tensioning pulleys/support pulleys for which the tension in their transmission belt has been reduced" due to slight differences in the transmission diameters of the cones mounted on same shaft/spline or any other factors.

After the axial position changing of a cone of this step ("step c) First axial position changing of a cone") has been performed, there are two cones with different transmission diameters mounted on a same shaft/spline. Here in order to prevent an excessive increase in tension of a transmission belt, this has to be compensated by having at least one adjuster of a CVT 4 unlocked. The cone of the adjuster that is unlocked to "compensate for having cones with different transmission diameters mounted on a same shaft/spline" is referred to as the rotated cone.

If the "adjuster of the rotated cone" is the adjuster that is used to reduce the tension in the transmission belt of "the CVT 4 for which the axial position of a cone is to be changed", which was performed in the previous step ("step b) Reducing transmission belt tension"), then the adjuster does not have to be locked after it was used to reduce the tension in the transmission belt of "the CVT 4 for which the axial position of a cone is to be changed". Here the "adjuster of the rotated cone" is the adjuster of "the CVT 4 for which the axial position of a cone is to be changed".

And if the "adjuster of the rotated cone" is not the adjuster that is used to reduce the tension in the transmission belt of "the CVT 4 for which the axial position of a cone is to be changed"; then here "immediately after the axial position of a cone (referred to as the moved cone) has been changed", the "adjuster of the rotated cone" should be unlocked so that it can "compensate for having cones with different transmission diameters mounted on a same shaft/spline" after the axial position of the moved cone is changed"; unless motorized adjusters are used in which case the "adjuster of the rotated cone" can be unlocked before the axial position of a cone is changed (see below). Also here if the adjuster used to reduce the tension in the transmission belt of "the CVT 4 for which the axial position of a cone is to be changed" is not locked yet, it should be locked first before the "adjuster of the rotated cone" is unlocked, unless motorized adjusters are used (see below); since here this is one requirement to ensure that at least one CVT 4 is always used for torque transmission. And here the other requirement to ensure that at least one CVT 4 is always used for torque transmission is that the slack in the tense side tensioning pulley/support pulley of the CVT 4 for which the axial position of a cone 'is to be'/'was' changed" is exhausted before the "adjuster of the rotated cone" is unlocked (unless motorized adjusters are used). In order to ensure that this requirement is met, a "sensor that informs the controlling computer when the tense side tensioning pulley/support pulley of the CVT 4 for which the axial position of a cone is to be changed hits its maximum contraction stop" can be used to inform the controlling computer when to lock the "adjuster of the rotated cone"; but if the "duration for the slack in the tense side tensioning pulley/support pulley of the CVT 4 for which the axial position of a cone 'is to be'/'was' changed to exhaust" is insignificant, it might be more practical to ignore this requirement even if it is desired to have at least one CVT 4 always used for torque transmission. Another potential benefit of using a "sensor that informs the controlling computer when the tense side tensioning pulley/support pulley of the CVT 4 for which the axial position of a cone is to be changed hits its maximum contraction stop" for unlocking the "adjuster of the rotated cone" is that through its usage sudden increase in tension in the transmission belts can be minimized. Here simple experimentation can be used to see whether using a "sensor that informs the controlling computer when the tense side tensioning pulley/support pulley of the CVT 4 for which the axial position of a cone is to be changed hits its maximum contraction stop" in order to unlock the "adjuster of the rotated cone" (which is recommended from a performance perspective) provides substantial benefits over simply unlocking the "adjuster of the rotated cone" immediately after the axial position of a cone has been changed.

Although it is recommended that the "adjuster that was used to reduce the tension in the transmission belt of the CVT 4 for which the axial position of a cone is to be changed" is locked during axial position changing of a cone (so as to avoid shock loads due to locking under load), if this is not practical (such as because the friction in the adjusters is too large to be sufficiently rotated by the tension of the tensioning pulleys/support pulleys, the required rotation for locking the index wheel is too large, etc.), then the "adjuster that was used to reduce the tension in the transmission belt of the CVT 4 for which the axial position of a cone is to be changed" can only be locked after the slack in the tense side tensioning pulley/support pulley of the CVT 4 for which the axial position of a cone 'is to be'/'was' changed" is exhausted. In this situation, if the "adjuster of the rotated cone" is unlocked "immediately after the axial position of a cone has been changed", then there might instances where the adjusters of both CVT 4's are unlocked; this is undesirable since here the cones of the unlocked adjusters can rotate at high speeds relative to their shaft/spline, which can cause shock loads during relocking. In order to avoid this, it is recommended that in this situation a "sensor that informs the controlling computer when the tense side tensioning pulley/support pulley of the CVT 4 for which the axial position of a cone is to be changed hits its maximum contraction stop" or better yet a "sensor that informs the controlling computer when the adjuster that was used to reduce the tension in the transmission belt of the CVT 4 for which the axial position of a cone is to be changed is locked" is used to inform the controlling computer when to unlock the "adjuster of the rotated cone". Proximity sensors, contact sensors, etc. can be used for the "sensors that inform the controlling computer when the tense side tensioning pulley/support pulley of their CVT 4 hits its maximum contraction stop" and the "sensors that informs the controlling computer when their adjuster is locked and unlocked".

If it is desired to unlock the "adjuster of the rotated cone" after the "adjuster that was used to reduce the tension in the transmission belt of the CVT 4 for which the axial position of a cone is to be changed" is locked and the slack in its tense side tensioning pulley/support pulley has been exhausted (which is recommended from a performance perspective), then it takes time for the "adjuster of the rotated cone" to unlock. But once the "adjuster used to reduce the tension in the transmission belt of the CVT 4 for which the axial position of a cone is to be changed" is locked and the slack that can be provided and/or removed by the tensioning pulleys/support pulleys of its CVT 4 have been exhausted, then the "CVT 4 for which the axial position of a cone 'is to be'/'was' changed" will become the CVT 4 used for torque transmission, and the transmission belt tension in the CVT 4 of the rotated cone becomes reduced. Once the transmission belt tension in the CVT 4 of the rotated cone is reduced, "its tense side tensioning pulleys/support pulleys can remove slack and its slack side tensioning pulleys/support pulleys can provide slack" so as to "compensate for the brief duration where there are two cones with different transmission diameters mounted on a same shaft/spline without having an adjuster allowing for compensating rotation", this allows some time for the "adjuster of the rotated cone" to unlock.

If a motorized adjuster, which is an adjuster that uses an adjuster motor, is used, then in order to unlock the adjuster of the rotated cone, the adjuster motor should rotate the rotated cone in the direction "the rotated cone will need to rotate in order to "compensate for having cones with different transmission diameters mounted on a same shaft/spline" after the axial position of the moved cone is changed"; here the adjuster motor can simply stall or slip when its rotation is "not" or "not yet" needed.

Since a motorized adjuster only allows rotation in the direction its adjuster motor rotates (so that it does not allow rotation in the direction that reduces the tension in its transmission belt in situations where "the adjuster of the rotated cone is not the adjuster that is used to reduce the tension in the transmission belt of the CVT 4 for which the axial position of a cone is to be changed"), and can simply stall, slip, or stop when its rotation is "not" or "not yet" needed. It is recommended that in situations where "the adjuster of the rotated cone is not the adjuster that is used to reduce the tension in the transmission belt of the CVT 4 for which the axial position of a cone is to be changed", a motorized adjuster is unlocked before the axial position of a cone is changed.

If an adjuster that uses a brake or an indexing mechanism is used, then in order to unlock the adjuster of the rotated cone, the adjuster should be released/unlocked.

Here the rotated cone should be a cone which needs to be rotated in the direction that increases the tension in the tense side of its transmission belt in order to "compensate for having cones with different transmission diameters mounted on a same shaft/spline" after the axial position of the moved cone is changed; the selection of whether the rotated cone is a cone of the "CVT 4 of the moved cone", or a cone of the "CVT 4 which is not the CVT 4 of the moved cone" should depend only on this.

Regarding the rotated cone, the CVT 4 for which a cone (the rotated cone) has to be "unlocked for rotation" in the direction that increases the tension in the tense side of its transmission belt in order to "compensate for having cones with different transmission diameters mounted on a same shaft/spline" is a CVT 4 for which its cone on the input shaft/spline has the smaller transmission diameter relative to the other cone on the input shaft/spline after the axial position changing of a cone of "step c) First axial position changing of a cone" has been completed, or a CVT 4 for which its cone on the output shaft/spline has the larger transmission diameter relative to the other cone on output shaft/spline after the axial position changing of a cone of "step c) First axial position changing of a cone" has been completed.

For a rotated cone on the input shaft/spline, the cone's direction of rotation that increases the tension in the tense side of its transmission belt is in the direction of rotation of the input shaft/spline. And for a rotated cone on the output shaft/spline, the cone's direction of rotation that increases the tension in the tense side of its transmission belt is in the direction opposite from the rotation of the output shaft/spline.

After the rotated cone is set-up to be "unlocked" or "left unlocked", axial position changing of a cone of this step ("step c) First axial position changing of a cone") is performed. Axial position changing of a cone of this step is performed on a cone (referred to as the moved cone) of "the CVT 4 for which the transmission belt tension was reduced (due to a releasing torque)"; note: transmission belt tension was reduced in step b).

Here if the "CVT 4 of the moved cone" is also the "CVT 4 of the rotated cone", then the transmission diameter of the cone on the input shaft/spline can be decreased or the transmission diameter of the cone on the output shaft/spline can be increased.

And if the "CVT 4 of the moved cone" is not the "CVT 4 of the rotated cone", then the transmission diameter of the cone on the input shaft/spline can be increased or the transmission diameter of the cone on the output shaft/spline can be decreased.

The CVT 4 for which a cone has to be "unlocked for rotation" in the direction that increases the tension in the tense side of its transmission belt in order to "compensate for having cones with different transmission diameters mounted on a same shaft/spline" (which is the CVT 4 of the rotated cone) is the "CVT 4 for which the transmission belt tension is reduced (due to required tensioning compensating rotation)" after the axial position changing of a cone of this step ("step c) First axial position changing of a cone") has been completed; since for this CVT 4, a cone has to be "allowed to rotate"/"rotated" in the direction that increases the tension in the tense side of its transmission belt in order prevent an excessive increase in tension in the transmission belt of the other CVT 4, and since the torque capacity of an adjuster motor (if used) should be much smaller than the pulling torque of its CVT 6 under all operating conditions so that an adjuster motor will stall/slip before it can increase the tension in its transmission belt to above the pulling torque of its CVT 6.

d) Second Axial Position Changing of a Cone Option 1 of 2

After "step c) First axial position changing of a cone", if desired the axial position of a cone of the "CVT 4 for which the transmission belt tension is reduced (due to required tensioning compensating rotation)" can be changed; this axial position changing of a cone is referred to as "step d) Second axial position changing of a cone Option 1 of 2". Alternately, after "step c) First axial position changing of a cone, if desired "step e) Second axial position changing of a cone Option 2 of 2" (which is described below) can be performed instead of "step d) Second axial position changing of a cone Option 1 of 2".

The "CVT 4 for which the transmission belt tension is reduced (due to required tensioning compensating rotation)" is the CVT 4 of the rotated cone (see step c). The rotated cone is the cone that is unlocked so that it can rotate in the direction that increases the tension in the tense side of its transmission belt in order to "compensate for having cones with different transmission diameters mounted on a same shaft/spline" relative to its shaft/spline.

If the "CVT 4 for which the transmission belt tension is reduced (due to required tensioning compensating rotation)" is the CVT 4 for which the axial position of a cone was changed in "step c) First axial position changing of a cone", then the transmission belt tension in this CVT 4 is already reduced after "step c) First axial position changing of a cone".

If the "CVT 4 for which the transmission belt tension is reduced (due to required tensioning compensating rotation)" is not the CVT 4 for which the axial position of a cone was changed in "step c) First axial position changing of a cone", then the transmission belt tension in the "CVT 4 for which the transmission belt tension is reduced (due to required tensioning compensating rotation)" is reduced after "step c) First axial position changing of a cone" has been completed, and after the slack in the tense side tensioning pulley/support pulley of the CVT 4 for which the axial position of a cone was changed has been exhausted. Here in order to ensure that the tension in the transmission belt of the "CVT 4 for which the transmission belt tension is reduced (due to required tensioning compensating rotation)" has been reduced and that the tensioning pulleys/support pulleys of the "CVT 4 for which the transmission belt tension is reduced (due to required tensioning compensating rotation)" are in their required positions, a pause after "step c) First axial position changing of a cone" has been completed can be used before starting the axial position changing of a cone of this step ("step d) Second axial position changing of a cone Option 1 of 2").

Here once the tension in the transmission belt of the "CVT 4 for which the transmission belt tension is reduced (due to required tensioning compensating rotation)" has been reduced; when the adjuster, used to provide/allow compensating rotation (which is achieved by rotating or "allowing rotation of" a cone of said CVT 4 in the direction that increases the tension in the tense side of its transmission belt), is unlocked but the "speed its adjuster motor (when used) rotates its adjuster output shaft" is less than the "speed applied on its adjuster output shaft", then an increase in tension in the slack side of the transmission belt of the "CVT 4 for which the transmission belt tension is reduced (due to required tensioning compensating rotation)" can occur; since here the unlocked cone (the cone of the unlocked adjuster) is rotated relative to its shaft/spline due to the pulling tension in the slack side of its transmission belt. As such here the slack side of the transmission belt (which is the slack side of the transmission belt during regular torque transmission) becomes the tense side of the transmission belt, and the tense side of the transmission belt (which is the tense side of the transmission belt during regular torque transmission) becomes the slack side of the transmission belt. Here the tensioning forces and the movement ranges of the tensioning pulleys/support pulleys should be selected so that once the tense side tensioning pulley/support pulley and the slack side tensioning pulley/support pulley have reached their equilibrium positions, the tense side tensioning pulley/support pulley and the slack side tensioning pulley/support pulley each have a sufficient "contracting and extending movement range" to provide and remove slack as needed to allow for axial position changing of their cone during axial position changing of their cone.

Alternately, here once the tension in the transmission belt of the "CVT 4 for which the transmission belt tension is reduced (due to required tensioning compensating rotation)" has been reduced; and for the adjuster used to provide compensating rotation, the "speed its adjuster motor rotates its adjuster output shaft" is more or equal than the "speed applied on its adjuster output shaft", then the torque of the adjuster motor and the tensioning forces and movement ranges of the tense side tensioning pulley/support pulley and the slack side tensioning pulley/support pulley should also be selected so that once the tense side tensioning pulley/support pulley and the slack side tensioning pulley/support pulley have reached their equilibrium positions, the tense side tensioning pulley/support pulley and the slack side tensioning pulley/support pulley each have a sufficient "contracting and extending movement range" to provide and remove slack as needed to allow for axial position changing of their cone.

Here if it is difficult to balance the tensioning forces of the tense side tensioning pulley/support pulley and the slack side tensioning pulley/support pulley of the "CVT 4 for which the transmission belt tension is reduced (due to required tensioning compensating rotation)" so that they each have a sufficient "contracting and extending movement range", then a configuration where the slack side tensioning pulley/support pulley hits its maximum contraction stop can be used for said CVT, before axial position changing of a cone of said CVT is started.

A configuration where the slack side tensioning pulley/support pulley hits its maximum contraction stop can occur when the adjuster that is used to provide/allow compensating rotation is unlocked but the "speed its adjuster motor (when used) rotates its adjuster output shaft" is less than the "speed applied on its adjuster output shaft"; since here the unlocked cone is rotated relative to its shaft/spline due to the increased pulling tension in the slack side of its transmission belt, which when large enough can cause its slack side tensioning pulley/support pulley to hit its maximum contraction stop.

If the slack side tensioning pulley/support pulley hits its maximum contraction stop, then the tense side tensioning pulley/support pulley can only provide slack, and the slack side tensioning pulley/support pulley can only remove slack. But, this can also work here, since here the adjuster of the CVT 4 for which the axial position of a cone is changed, is "unlocked for rotation" in the direction that removes slack from the side of the tense side tensioning pulley/support pulley and provides slack to the side of the slack side tensioning pulley/support pulley.

But, the tension in the slack side of the transmission belt for a configuration where the slack side tensioning pulley/support pulley hits its maximum contraction stop will be larger than that of the configuration where the tense side tensioning pulley/support pulley and the slack side tensioning pulley/support pulley each have a sufficient "contracting and extending movement range". An increase in tension in a transmission belt (slack side and/or tense side) will increase the force required to axially move a cone that is engaged with said transmission belt.

Additionally, here if the unlocked cone is rotated relative to its shaft/spline due to the pulling tension in the slack side of its transmission belt, then the worm gear of its adjuster (and as such also the unlocked cone) accelerates from standstill until it has reached its steady state speed. Since the friction in the worm gear-gear drive decreases as the speed of the worm gear increases, the pulling tension in the slack side of its transmission belt decreases as the speed of the worm gear increases. As such, here using a "delay to let the unlocked cone speed-up" before changing the axial position of a cone of the CVT 4 of the unlocked cone, can reduce the force required to axially move a cone of the CVT 4 of the unlocked cone.

Once the tension in the transmission belt of the "CVT 4 for which the transmission belt tension is reduced (due to required tensioning compensating rotation)" has been reduced and its tensioning pulleys/support pulleys are in position (which can be ensured through a time delay that can be obtained through trial-and-error experimentation), the axial position of a cone of the "CVT 4 for which the transmission belt tension is reduced (due to required tensioning compensating rotation)", can be changed.

Here if the cone which axial position was changed under "step c) First axial position changing of a cone" was on the input shaft/spline; then for "step d) Second axial position changing of a cone Option 1 of 2", the transmission diameter of the "cone with the smaller transmission diameter" on the input shaft/spline needs to be increased so that its transmission diameter is equal to the transmission diameter of the other cone on the input shaft/spline". Note: here the "cone with smaller transmission diameter" on the input shaft/spline is a cone of the "CVT 4 for which the transmission belt tension is reduced (due to required tensioning compensating rotation)".

And if the cone which axial position was changed under "step c) First axial position changing of a cone" was on the output shaft/spline; then for "step d) Second axial position changing of a cone Option 1 of 2", the transmission diameter of the "cone with larger transmission diameter" on the output shaft/spline needs to be decreased so that its transmission diameter is equal to the transmission diameter of the other cone on the output shaft/spline". Note: here the "cone with larger transmission diameter" on the output shaft/spline is a cone of the "CVT 4 for which the transmission belt tension is reduced (due to required tensioning compensating rotation)".

After the axial position changing of a cone of "step d) Second axial position changing of a cone Option 1 of 2" has been completed, the adjuster that is used to "compensate for having cones with different transmission diameters mounted on a same shaft/spline" should be (but not necessarily) stopped/braked/locked when possible", since after the axial position changing of a cone of "step d) Second axial position changing of a cone Option 1 of 2" has been completed, the CVT 6 will be at "step a) Initial Setup/Regular Operation Setup", where the transmission diameters of all cones mounted on a same shaft/spline are equal.

e) Second Axial Position Changing of a Cone Option 2 of 2

Alternately, after "step c) First axial position changing of a cone", instead changing the axial position of a cone of the "CVT 4 for which the transmission belt tension is reduced (due to required tensioning compensating rotation)" under "step d) Second axial position changing of a cone Option 1 of 2", if desired the axial position of a cone of the "CVT 4 for which the transmission belt tension is not reduced" can be changed. This axial position changing of a cone is referred to as "step e) Second axial position changing of a cone Option 2 of 2".

Here first the transmission belt tension of the "CVT 4 for which the transmission belt tension is not reduced" needs to be reduced. This is accomplished by unlocking (unlocking for rotation) a cone of the "CVT 4 for which the transmission belt tension is not reduced" so that it can rotate in the direction that reduces the tension in its transmission belt. Here if an adjuster that uses an adjuster motor is used, then in order to unlock the adjuster, the adjuster needs to rotate its cone relative to its shaft/spline in the direction that reduces the tension in its transmission belt; and if an adjuster that uses a brake is used, then in order to unlock the adjuster, its brake needs to be released; and if an adjuster that uses an indexing mechanism is used, then in order to unlock the adjuster, its indexing mechanism needs to be unlocked.

In this situation, the "direction of rotation that reduces the tension in its transmission belt" a cone of the "CVT 4 for which the transmission belt tension is not reduced" is also the direction to "compensate for having cones with different transmission diameters mounted on a same shaft/spline"; this is because the direction of rotation of the "CVT 4 for which the transmission belt tension is reduced (due to required tensioning compensating rotation)" is in the direction that increases its transmission belt tension, and the direction of rotation to "compensate for having cones with different transmission diameters mounted on a same shaft/spline" of one CVT 4 should be opposite from that of the other CVT 4. As such here, a cone of the "CVT 4 for which the transmission belt tension is not reduced" needs to be "unlocked for rotation" in the direction that reduces the tension in its transmission belt (which is also the direction of rotation to "compensate for having cones with different transmission diameters mounted on a same shaft/spline") as long as there are cones with different transmission diameters mounted on the same shaft/spline.

And since here the rotation to reduce the transmission belt tension of the "CVT 4 for which the transmission belt tension is not reduced" also compensates for having cones with different transmission diameters mounted on the same shaft/spline, here the rotation of a cone to "compensate for having cones with different transmission diameters mounted on a same shaft/spline" of the "CVT 4 for which the transmission belt tension is reduced (due to required tensioning compensating rotation)" will slow-down so that it can be eventually stopped/braked/locked. Here, when available, some braking or slowing down forces can also be applied by the adjuster when the rotation of a cone of the "CVT 4 for which the transmission belt tension is reduced (due to required tensioning compensating rotation) is slowing down.

After rotation to reduce the transmission belt tension of the "CVT 4 for which the transmission belt tension is not reduced" is started, the transmission belt tension of the "CVT 4 for which the transmission belt tension is not reduced" will eventually become reduced, so that the "CVT 4 for which the transmission belt tension is reduced (due to required tensioning compensating rotation)" will eventually need to be used as the CVT 4 used for torque transmission.

Here if an adjuster that uses brake or an indexing mechanism is used for the "CVT 4 for which the transmission belt tension is reduced (due to required tensioning compensating rotation)", then the brake or indexing mechanism needs to be braked/locked after the adjuster of the "CVT 4 for which the transmission belt tension is not reduced" is unlocked, since at least one adjuster needs to "compensate for having cones with different transmission diameters mounted on a same shaft/spline".

Here if desired, an adjuster that uses a brake or an indexing mechanism can be braked/locked after the speed of the worm gear to be braked/locked has slowed down, so as to reduce the shock-loads during braking/locking. If this is desired, then a time delay from when the adjuster of the "CVT 4 for which the transmission belt tension is not reduced" is unlocked until braking/locking of the adjuster of the "CVT 4 for which the transmission belt tension is reduced (due to required tensioning compensating rotation)" occurs can be used. The time delay does not have to be accurate, but for better accuracy, the time delay can be based on the current rpm and transmission ratio of the CVT 6. For the time delay, it is recommended that braking/locking occurs before the worm gear reverses direction since by then the adjuster to be braked/locked is subjected to the torque being transmitted by the CVT 6 (instead of only the torque due to friction). Instead of a time delay, a sensor that measures the speed of the worm gear to be braked/locked can also be used to reduce the shock-loads during braking/locking.

Here if an adjuster that uses an adjuster motor is used, it is important that the adjuster of the "CVT 4 for which the transmission belt tension is reduced (due to required tensioning compensating rotation)", which is initially rotating in the direction that increases the tension in its transmission belt, will not "reverse direction and rotate in the direction that reduces the tension in its transmission belt" after the adjuster of the "CVT 4 for which the transmission belt tension is not reduced" is unlocked. Since if both adjusters rotate in the direction that reduces the tension in their transmission belts, then relocking the adjusters can require a large torque. If necessary, here the adjuster of the "CVT 4 for which the transmission belt tension is reduced (due to required tensioning compensating rotation)" applies a braking torque to ensure that said adjuster will not reverse direction, but instead slows-down and eventually stops and becomes locked due to the friction of its worm gear-gear drive; other means for braking the rotating cone of the "CVT 4 for which the transmission belt tension is reduced (due to required tensioning compensating rotation)" can also be used.

Here once the tension in the transmission belt of the "CVT 4 for which the transmission belt tension is not reduced", which from now on will be referred to as the "CVT 4 for which the transmission belt tension is reduced (due to releasing compensating rotation)", has been reduced; when the adjuster used to provide/allow compensating rotation (which is achieved by rotating or "allowing rotation of" a cone of the "CVT 4 for which the transmission belt tension is reduced (due to releasing compensating rotation)" in the direction that decreases the tension in the tense side of its transmission belt) is unlocked but the "speed its adjuster motor (when used) rotates its adjuster output shaft/spline" is less than the "speed applied on its adjuster output shaft/spline", then an increase in tension in the tense side of the transmission belt of the "CVT 4 for which the transmission belt tension is reduced (due to releasing compensating rotation)" can occur; since here the unlocked cone is rotated relative to its shaft/spline due to the pulling tension in the tense side of its transmission belt. Here the tense side tensioning pulley/support pulley and the slack side tensioning pulley/support pulley each should have a sufficient "contracting and extending movement range" to provide and remove slack as needed to allow for axial position changing of their cone during axial position changing of their cone.

Alternately, here once the tension in the transmission belt of the "CVT 4 for which the transmission belt tension is reduced (due to releasing compensating rotation)" has been reduced; and for the adjuster used to provide compensating rotation, the "speed its adjuster motor rotates its adjuster output shaft" is more or equal than the "speed applied on its adjuster output shaft", then the torque of the adjuster motor and the tensioning forces of the tense side tensioning pulley/support pulley and the slack side tensioning pulley/support pulley should be selected so that once the tense side tensioning pulley/support pulley and the slack side tensioning pulley/support pulley have reached their equilibrium positions, the tense side tensioning pulley/support pulley and the slack side tensioning pulley/support pulley each have a sufficient "contracting and extending movement range" to provide and remove slack as needed to allow for axial position changing of their cone.

Here if it is difficult to balance the tensioning forces of the tense side tensioning pulley/support pulley and the slack side tensioning pulley/support pulley so that they each have a sufficient "contracting and extending movement range", then a configuration where the tense side tensioning pulley/support pulley hits its maximum contraction stop can be used before axial position changing of a cone of the "CVT 4 for which the transmission belt tension is reduced (due to releasing compensating rotation)" is started.

A configuration where the tense side tensioning pulley/support pulley hits its maximum contraction stop can occur when the adjuster that is used to provide/allow compensating rotation is unlocked but the "speed its adjuster motor (when used) rotates its adjuster output shaft" is less than the "speed applied on its adjuster output shaft"; since here the unlocked cone is rotated relative to its shaft/spline due to the increased pulling tension in the tense side of its transmission belt, which when large enough can cause its tense side tensioning pulley/support pulley to hit its maximum contraction stop.

If the tense side tensioning pulley/support pulley hits its maximum contraction stop, then the tense side tensioning pulley/support pulley can only remove slack and the slack side tensioning pulley/support pulley can only provide slack. But, this can also work here, since here the adjuster of the CVT 4 for which the axial position of a cone is changed, is "unlocked for rotation" in the direction that provides slack to the side of the tense side tensioning pulley/support pulley and removes slack from the side of the slack side tensioning pulley/support pulley.

But, the tension in the tense side of the transmission belt for a configuration where the tense side tensioning pulley/support pulley hits its maximum contraction stop will be larger than that of the configuration where the tense side tensioning pulley/support pulley and the slack side tensioning pulley/support pulley each have a sufficient "contracting and extending movement range". An increase in tension in a transmission belt (slack side and/or tense side) will increase the force required to axially move a cone that is engaged with said transmission belt.

Additionally, here if the unlocked cone is rotated relative to its shaft/spline due to the pulling tension in the tense side of its transmission belt, then the worm gear of its adjuster (and as such also the unlocked cone) accelerates from standstill until it has reached its steady state speed. Since the friction in the worm gear-gear drive decreases as the speed of the worm gear increases, the pulling tension in the tense side of its transmission belt decreases as the speed of the worm gear increases. As such, here using a "delay to let the unlocked cone speed-up" before changing the axial position of a cone of the CVT 4 of the unlocked cone, can reduce the force required to axially move a cone of the CVT 4 of the unlocked cone.

Once the tension in the transmission belt of the "CVT 4 for which the transmission belt tension is reduced (due to releasing compensating rotation)" has been reduced and its tensioning pulleys/support pulleys are in position (which can be ensured through a time delay that can be obtained through trial-and-error experimentation), the axial position of a cone of the "CVT 4 for which the transmission belt tension is reduced (due to releasing compensating rotation)", can be changed.

Here if the cone which axial position was changed under "step c) First axial position changing of a cone" was on the input shaft/spline; then for "step e) Second axial position changing of a cone Option 2 of 2", the transmission diameter of the "cone with larger transmission diameter" on the input shaft/spline needs to be decreased so that its transmission diameter is equal to the transmission diameter of the other cone on the input shaft/spline". Note: here the "cone with larger transmission diameter" on the input shaft/spline is a cone of the "CVT 4 for which the transmission belt tension is reduced (due to releasing compensating rotation)".

And if the cone which axial position was changed under "step c) First axial position changing of a cone" was on the output shaft/spline; then for "step e) Second axial position changing of a cone Option 2 of 2", the transmission diameter of the "cone with smaller transmission diameter" on the output shaft/spline needs to be increased so that its transmission diameter is equal to the transmission diameter of the other cone on the output shaft/spline". Note: here the "cone with smaller transmission diameter" on the output shaft/spline is a cone of the "CVT 4 for which the transmission belt tension is reduced (due to releasing compensating rotation)".

After the axial position changing of a cone of "step e) Second axial position changing of a cone Option 2 of 2" has been completed, the adjuster that is used to "compensate for having cones with different transmission diameters mounted on a same shaft/spline" should be (but not necessarily) stopped/braked/locked when possible", since after the axial position changing of a cone of "step e) Second axial position changing of a cone Option 2 of 2" has been completed, the CVT 6 will be at "step a) Initial Setup/Regular Operation Setup", where the transmission diameters of all cones mounted on a same shaft/spline are equal.

Details Regarding "Transmission Ratio Change Rotation" in a CVT 6 ("Belt Curvature Change Rotation"

As described earlier, Point N is the contact point between a cone and its transmission belt that doesn't rotate due to changes in the transmission diameter of said cone; and Point M of a cone is the point were no rotational sliding between said cone and its torque transmitting member occur due to axial position change of said torque transmitting member relative to said cone (see FIG. 6 for an example).

As the transmission diameter of a cone is increased, the length of the portion of the transmission belt covering the cone has to be increased; and as the transmission diameter of a cone is decreased, the length of the portion of the transmission belt covering the cone has to be decreased. Increasing the length of the portion of the transmission belt covering the cone requires that the portion(s) of the transmission belt to the left and/or to the right of Point N are slid towards Point N so as to provide more slack; this cause relative rotational movement between the surface of the cone and its transmission belt except at Point N. And decreasing the length of the portion of the transmission belt covering the cone requires that the portion(s) of the transmission belt to the left and/or to the right of Point N are slid away from Point N so as to remove slack; this also cause relative rotational movement between the surface of the cone and its transmission belt except at Point N. "Transmission ratio change rotation" due to the relative rotational movement (sliding) between the surface of a cone and its transmission belt as described in this paragraph is referred to as "belt curvature change rotation".

The direction of "belt curvature change rotation" depends on the position of Point M relative to Point N, and whether the transmission diameter of the cone is increased or decreased. When Point M is positioned at Point N, "belt curvature change rotation" should be zero; and when Point M is positioned to the left of Point N, the direction of "belt curvature change rotation" should be in the opposite direction from when Point M is positioned to the right of Point N. The location of Point N and the directions of "belt curvature change rotation" can be obtained through experimentations using a Test CVT.

The amount of "belt curvature change rotation" of a cone depends on the distance of the Point M of said cone from Point N. If we ignore the rotations of said cone due to the rotations of its CVT 6 (for illustrative purposes let's assume that the CVT 6 of said cone is not rotating), then the length of the transmission belt segment from Point N to Point M remains constant as the axial position of said cone is changed. If this transmission belt segment is longer than more "belt curvature change rotation" will occur during transmission diameter change of said cone.

For example, for 0.2 tooth long transmission belt segment, "belt curvature change rotation" will be due to the change in curvature of that 0.2 tooth. And for a 6 tooth long transmission belt segment, "belt curvature change rotation" will be due to the change in curvature of those 6 teeth. Obviously "belt curvature change rotation" for 6 teeth is larger than that of 0.2 tooth.

As a cone is rotating due to rotations of its CVT 6, "belt curvature change rotation" for said cone should continuously decrease when its Point M rotates towards Point N, and should continuously increase when its Point M rotates away from Point N.

Details Regarding "Transmission Ratio Chance Rotation" in a CVT 6 ("Member Curvature Chance Rotation")

"Transmission ratio change rotation" of a cone can also be due to the change in curvature of the torque transmitting member of said cone. This type of "Transmission ratio change rotation" is referred to as "member curvature change rotation".

"Member curvature change rotation" occurs when there are portions of a torque transmitting member that are not covered by its transmission belt. The amount of "member curvature change rotation" depends on the distance from "Point M of the torque transmitting member, which must be not covered by its transmission belt, to "the point of engagement between said torque transmitting member and its transmission belt". "The point of engagement between said torque transmitting member and its transmission belt", will be referred to as Point E.

If we ignore the rotations of said cone due to the rotations of its CVT 6 (for illustrative purposes let's assume that the CVT 6 of said cone is not rotating), then the length of the torque transmitting member segment from Point M to Point E remains constant as the axial position of said cone is changed. If this torque transmitting member segment is longer than more "member curvature change rotation" will occur during transmission diameter change of said cone.

For example, for 0.2 tooth long torque transmitting member segment, "belt curvature change rotation" will be due to the change in curvature of that 0.2 tooth. And for a 6 tooth long torque transmitting member segment, "member curvature change rotation" will be due to the change in curvature of those 6 teeth. Obviously "member curvature change rotation" for 6 teeth is larger than that of 0.2 tooth.

The direction of "member curvature change rotation" depends on the position of Point M relative to Point E (note: Point M must not covered by its transmission belt), and whether the transmission diameter of the cone is increased or decreased. When Point M is positioned at Point E, "member curvature change rotation" should be zero; and when Point M is positioned to the left of Point E, the direction of "belt curvature change rotation" (if it is not zero) should be in the opposite direction from when Point M is positioned to the right of Point E. The directions of "member curvature change rotation" can be obtained through experimentations using a Test CVT.

Example of "Transmission Ratio Change Rotation" in a CVT 6

As an example, let's say we have a CVT 6 that uses two CVT 4's for which the tensioning pulleys are positioned on the slack side of the transmission belt. And said CVT 6 uses cones that each have the design of a "cone assembly with one torque transmitting member" described in the "Alternate CVT's" section of U.S. Pat. No. 7,722,490 B2.

And for said CVT 6, the cones on the input shaft/spline have the longitudinal slides mounted ends of their torque transmitting members at the leading end (which is the end of the torque transmitting member that engages first), and the cones on the output shaft/spline have the longitudinal slides mounted ends of their torque transmitting members at the trailing end (which is the end of the torque transmitting member that engages last).

The longitudinal slide mounted end of a torque transmitting member is Point M of the torque transmitting member, which is a point of the torque transmitting member which rotational position relative to its cone does not change as the axial position of the torque transmitting member relative to its cone is changed.

A CVT 4 of the CVT 6 (a CVT 6 has two functionally identical CVT 4's) of this section is shown as a front-view in FIG. 6. The following labeling are used for FIG. 6: Driving Cone 9, Torque Transmitting Member 9-M1, Driven Cone 10, Torque Transmitting Member 10-M1, Input Spline 11, Output Spline 12, Support Pulley 14, Tensioning Pulley 13. For Driving Cone 9 and Driven Cone 10, the rotational position of their Point M, which for each cone is located at the end of the torque transmitting member that is mounted to the longitudinal slide, are marked with M; and the rotational position of their Point N, are marked with N.

For this CVT 6 all cones are mounted on an adjuster. And in order to compensate/allow for "Transmission ratio change rotation" in a CVT 4, the adjuster 8 of the cone on the input spline and the adjuster 8 of the cone on the output spline of said CVT 4 are rotated in the same direction during the axial position change of a said cone.

First, let us look at the "12 to 9 o'clock interval" of Driving Cone 9, here when Point M is positioned near the 12 o'clock position, then Point M is positioned to the right of Point N. Here if the transmission diameter of Driving Cone 9 is increased, the "belt curvature change rotation" is counter-clockwise; and if the transmission diameter of Driving Cone 9 is decreased, then the "belt curvature change rotation" is clockwise.

If the axial position of Driving Cone 9 is changed such that its circumference increases or decreased by one tooth (as needed to allow for proper engagement), then for the configuration shown in FIG. 6, the maximum "belt curvature change rotation" for the portions of the transmission belts covering the surfaces of Driving Cone 9 to the left and to the right of Point N is "half a tooth".

For the "12 to 9 o'clock interval" of Driving Cone 9, the ball park rotational speed and angular acceleration of the adjusters 8 can be estimated by assuming that the maximum "belt curvature change rotation" for the portion of the transmission belt to the right of Point N of "half a tooth" has to be compensated/allowed as Point M is rotated from the 12 o'clock position to the 9 o'clock position. Here the distance that needs to be traveled is "half a tooth", and the time the distance needs to be traveled is the time it takes to rotate Point M from the 12 o'clock position to the 9 o'clock position.

The estimate of the previous paragraph is very conservative, since the axial position changing of Driving Cone 9 should be started when the not-Point M end of Torque Transmitting Member 9-M1 disengages with its transmission belt. As such, the speed of "belt curvature change rotation" due to the axial position change of Driving Cone 9 near the 12 o'clock position is very low since it starts at zero and then continually accelerates as it approaches the 9 o'clock position. And since the amount of "belt curvature change rotation" also depends on the distance of Point M from Point N; at the maximum distance between Point M from Point N, the amount of "belt curvature change rotation" is maximum (which here is "half a tooth"); and as Point M rotates towards Point N it continually decreases until it reaches zero. We roughly estimate that this will reduce the required rotational speed and angular acceleration by about a half to a quarter (with more time an accurate equation can be obtained).

Therefore, here instead of using a distance of "half a tooth", we can use a distance of "half a tooth" to an "eight of a tooth" in calculating the ball park rotational speed and angular acceleration for the "12 to 9 o'clock interval" of Driving Cone 9. This estimate is only due to "belt curvature change rotation", since for the "12 to 9 o'clock interval" of Driving Cone 9, "member curvature change rotation" for Driving Cone 9 is zero; this is because the distance from "Point M" to "Point E (which here is the point of engagement between said torque transmitting member and its transmission belt at the Point M end of said torque transmitting member)" is zero.

Next we look at the "9 to 3 o'clock interval" of Driving Cone 9. When Point M of Driving Cone 9 has rotated to Point N (which is at the 9 o'clock position), the direction of rotation of "Transmission ratio change rotation" (which here is only due to "belt curvature change rotation") will change. When Point M is at Point N "Transmission ratio change rotation" is zero. And as Point M rotates away from Point N, "belt curvature change rotation" will continue to increase.

And once Point M has rotated so that it is not engaged with its transmission belt anymore (which is close to the 4.5 o'clock position), "member curvature change rotation" will become non-zero and continue to increase; since the distance from "Point M" to "Point E (which here is the point of engagement between said torque transmitting member and its transmission belt at the not-Point M end of said torque transmitting member)" continuous to increase.

For the "9 to 3 o'clock interval" of Driving Cone 9, in order to determine the ball park rotational speed and angular acceleration of the adjusters 8, we use "half a tooth" (which is due to "belt curvature change rotation") plus "one tooth" (which is due to "member curvature change rotation") for the distance, and the time the distance needs to be traveled is the time it takes to rotate Point M from the 9 o'clock position to the 3 o'clock position.

As explained previously the movements of a tensioning pulley, such as Tensioning Pulley 13, can also be used to provide and remove slack as needed in order to allow for "Transmission ratio change rotation" due to movements in the slack side of the transmission belt. For Driving Cone 9, Tensioning Pulley 13 cannot allow for "Transmission ratio change rotation" when Point M is positioned to the right of Point N (since here it is due to movements in the tense side of the transmission belt), but it can allow for "Transmission ratio change rotation" when Point M is positioned to the left of Point N, as is the case for the "9 to 3 o'clock interval" of Driving Cone 9 (since here it is due to movements in the slack side of the transmission belt).

Since we use Tensioning Pulley 13 to allow for "Transmission ratio change rotation" due to movements in the slack side of the transmission belt, the distance due to "belt curvature change rotation" for the "9 to 3 o'clock interval" of Driving Cone 9 can be eliminated, so that said distance becomes "one tooth" (which is due to "member curvature change rotation"). This distance is a conservative estimate, since the distance of "one tooth" due to "member curvature change rotation" is covered during the entire duration that the axial position of Driving Cone 9 is changed and not only the "9 to 3 o'clock interval" of Driving Cone 9.

Next we look at the "9 to 3 o'clock interval" of Driven Cone 10. Here the distance that needs to be provided by the adjusters 8 in order to compensate for "Transmission ratio change rotation" as Point M of Driven Cone 10 is rotated from the 9 o'clock position to the 3 o'clock position can be estimated to be "half a tooth" (which is due to "belt curvature change rotation") plus "one tooth" (which is due to "member curvature change rotation").

But since "Transmission ratio change rotation" for the "9 to 3 o'clock interval" of Driven Cone 10 occurs on the slack side of the transmission belt, here we use Tensioning Pulley 13 to allow for "Transmission ratio change rotation" due to "belt curvature change rotation", so that said distance becomes "one tooth" (which is due to "member curvature change rotation"). This distance is a conservative estimate, since the distance of "one tooth" due to "member curvature change rotation" is covered during the entire duration that the axial position of Driven Cone 10 is changed and not only the "9 to 3 o'clock interval" of Driven Cone 10.

Next we look at the "3 to 12 o'clock interval" of Driven Cone 10. When Point M of Driven Cone 10 has rotated to Point N (which for Driven Cone 10 is at the 3 o'clock position), the direction of rotation of "Transmission ratio change rotation" (which here is only due to "belt curvature change rotation") will change. When Point M is at Point N "Transmission ratio change rotation" is zero. And as Point M rotates away from Point N, "belt curvature change rotation" will continue to increase. Here the distance that needs to be provided by the adjusters 8 in order to compensate/allow for "Transmission ratio change rotation" as Point M of Driven Cone 10 is rotated from the 3 o'clock position to the 12 o'clock position can be estimated to be "half a tooth" (which is due to "belt curvature change rotation") plus "zero" (which is due to "member curvature change rotation").

But, the CVT 6 of this example is designed so that the actual distance to compensate for "Transmission ratio change rotation" for the "3 to 12 o'clock interval" of Driven Cone 10 is less than "half a tooth". If we estimate that the axial position of Driven Cone 10 is changed during an interval from "9 to 12 o'clock", then the "3 to 12 o'clock interval" represents only ⅓ of the total arc length of the "9 to 12 o'clock" interval. In addition, it is desirable to complete the majority of the axial position changing movement of a cone early on so that the end portion of the axial position changing procedure can be used to reduce the speed of the cone so as to minimize shock loads. If the axial position changing movement of Driven Cone 10 is less than half of the total movement, then the distance to compensate/allow for "Transmission ratio change rotation" should also be less than "half a tooth", since the maximum amount of "Transmission ratio change rotation" of a cone (ignoring reduction due to the distance of Point N from Point M) is proportional to the amount of the axial movement of a cone. Note, the actual interval for changing the axial position of Driven Cone 10 might be different than the estimate given above; changing the axial position of Driven Cone 10 (and also Driving Cone 9) should be performed during an interval that starts after the trailing end of its torque transmitting member disengages, and ends before the leading end of its torque transmitting member re-engages.

After going through all the operating conditions of the adjusters 8, we conclude that the most demanding requirement for the adjusters 8 occur during the "3 to 12 o'clock interval" of Driven Cone 10, for which the distance that needs to be traveled is "half a tooth". If at the smallest transmission diameter of a cone the transmission circumference is 20 teeth, then the arc length of "half a tooth" is $0.5/20 \times 360$ degrees=9 degrees=0.157 radians. The "3 to 12 o'clock interval" covers 90 degrees, if the maximum operating rpm speed of a cone is 6000 rpm, then t (time)=90 degrees/(6000×360 degrees/60 seconds)=0.0025 seconds. The required rotational angular acceleration is $=2 \times 0.157$ radians/$(0.0025 \text{ seconds})^2$=50240 radians/seconds^2. The required rotational speed is $=12560 \times 0.005$ radians/seconds=1199 rpm.

From the angular acceleration, the torque requirement of the adjusters 8 can be calculated. Here we assume that each adjuster 8 comprises of an electric motor that drives a worm gear that drives a gear. The Torque (T)=I×angular acceleration. For I, we use the estimate for the inertia of the worm gear which is I=$0.5 \times m \times r^2$=$0.5 \times 0.3$ kg×$(0.008 \text{ m})^2$=$9.7 \times 10^{-6}$ kg m^2. Plugging everything in we get T=$9.7 \times 10^{-6} \times 12560$ Nm=0.49 Nm. This torque estimate does not include the torque required to overcome friction, this torque can be calculated/estimated separately and added to torque estimate above.

If the "input/output ratio" of the worm gear-gear drive is not 1:1, then appropriate adjustments need to be made to the calculations of the previous paragraphs in order to determine the ratings for the motors that drive the worm gears of the adjusters 8. It might also be desirable to use some gearings that increase the output speed of said motors, but reduce the output torque of said motors and add additional inertia that needs to be accelerated by said motors.

Through trial-and-error and experimentation, this ball park estimate can then be used to obtain the actual required speed and torque ratings of the adjuster(s) 8 that allow the axial positions of Driving Cone 9 and Driven Cone 10 to be changed without interruption due to "Transmission ratio change rotation" for the maximum operating speed of the CVT, by simply testing the at what minimum speed and minimum torque of the adjuster(s) 8 the axial positions of Driving Cone 9 and Driven Cone 10 can changed without interruption due to "Transmission ratio change rotation" at the maximum operating speed of the CVT.

As the speed of a worm gear-gear drive increases, its "locking friction" can drop to less than half its static "locking friction". And as such, at high speeds the "worm rotating force" of a worm gear-gear drive might be larger than the "worm locking force" and can be used to accelerate and rotate the worm gear as required to compensate/allow for "Transmission ratio change rotation". If this is so, then the speed requirements of the motors of the adjusters 8 can be limited to the speed at which the "locking friction" will drop significantly to allow the "worm rotating force" to accelerate and rotate the worm gear as required to compensate/allow for "Transmission ratio change rotation". It is recommended that the motors of the adjusters 8 are always ON when the adjusters 8 are needed to compensate/allow for "Transmission ratio change rotation", even when the adjusters 8 are driven by the "Transmission ratio change rotation"; this is to account for sudden decrease in speed and increase in "locking friction" of the worm gear-gear drive. Throughout this application, for an adjuster that has a worm gear-gear drive, the definition of an unlocked adjuster is an adjuster for which the "worm rotating force" of its worm gear-gear drive is larger than the "worm locking force" of its worm gear-gear drive.

If two adjusters 8 on a common shaft/spline are used to compensate/allow for "Transmission ratio change rotation", then the adjuster 8 on the shaft/spline that is transmitting torque and that is rotating in the opposite direction of a releasing torque, can become unlocked as to freewheel (not transmitting any torque). This can occur as the adjuster 8 reverses direction while rotating under non-static friction. If the adjuster 8 does not have sufficient torque to prevent freewheeling, freewheeling can be stopped by temporarily disengaging the CVT from its source of power and then using the motor of the adjuster 8 as needed to lock its adjuster 8. This method can be used to stop freewheeling for all situation.

Just getting a CVT 6 to work can be easily achieved by limiting the demand (torque & speed) of the CVT 6 and/or by selecting adjusters 8 with sufficient amount of torque and speed. The purpose of the additional description of the previous paragraphs is to provide additional design options that can be used to design a more cost-effective CVT 6.

Miscellaneous Details for a CVT 6

For the CVT 6 shown in FIG. 6, a cone that has the longitudinal slide mounted end of its torque transmitting member at the trailing end, can be the mirror image of a cone that has the longitudinal slide mounted end of its torque transmitting members at the leading end; except that if non-symmetrical teeth are used, then for both cones the teeth for their torque transmitting members should be oriented so that they can transfer maximum torque in the direction they are primarily used for torque transmission.

The designation "leading end" and "trailing end" for the ends of the torque transmitting member of the example of a "cone assembly with one torque transmitting member" described in the "Alternate CVT's" section of U.S. Pat. No. 7,722,490 B2 were arbitrarily selected. Obviously the part of a cone referred to as the "leading end" can be used as the leading end of a torque transmitting member (which is the end of a torque transmitting member that engages first) or the "trailing end" of a torque transmitting member (which is the end of a torque transmitting member that engages last), and likewise the "trailing end" part of a cone can also be used as the "leading end" or "trailing end" of a torque transmitting member.

The required relative rotation between the cones on a common shaft/spline to compensate for "Transmission ratio change rotation" can also be provided by adjuster(s) 8 of the CVT 4 other then the CVT 4 for which for a cone rotation to allow for "Transmission ratio change rotation" is required. The same direction of relative rotation between the cones, as described earlier, need to be provided by said adjuster(s) 8. However, here the torque required by the adjuster(s) might be larger.

The cones of a CVT 6 should be designed so that they can handle the maximum releasing torque and the maximum torque due to the "rotations to compensate for having cones with different transmission diameters mounted on a same shaft/spline". The pulling direction of a releasing torque is in the direction that increases the tension in the slack side of the transmission belt. And the pulling direction due to the "rotations to compensate for having cones with different transmission diameters mounted on a same shaft/spline" is in direction that increases the tension in the slack side of the transmission belt when a cone on the input shaft/spline is pulled in the direction its CVT is rotating by the cone to which it is coupled (which should happen occasionally for the preferred CVT 6), and when a cone on the output shaft/spline is pulled in the opposite direction its CVT is rotating by the cone to which it is coupled (which should also happen occasionally for the preferred CVT 6). The pulling direction in the direction that increases the tension in the slack side of the transmission belt is opposite from the main pulling direction of the cones, which is in the direction that increases the tension in the tense side of the transmission belt. As such the cones of a CVT 6 should be designed such that can transit torque in both directions as required; although the torque capacity in one direction can be larger than the other.

For a CVT 6, the force needed to change the transmission ratio can be reduced by reducing the tension in the transmission belt of the CVT 4 for which the transmission ratio is changed. The transmission ratio of said CVT 4 can be changed by changing the axial position(s) of the driven cone, driving cone, or both driven cone and driving cone of said CVT 4.

For a CVT 6, it's recommended that during non-transmission ratio changing operation, the transmission diameters of the cones mounted on a common shaft/spline are identical; if this is not the case then the adjuster(s) need to provide rotational adjustments as necessary to compensate for having cones with unequal transmission diameters on a common shaft/spline, which reduces efficiency. The required direction for this rotational adjustment can be obtained through experimentation; here if desired the Test CVT described earlier can be used. Also, it is recommended that here the adjuster(s) provide more adjustments than required or are unlocked so that they can always provide the amount of adjustment needed and only stall or slip when they provide too much adjustment.

Also for the cones of the CVT 6 that do not have an adjuster, it is not necessary to mount them on their spline through the use of a slider. Other means of mounting as described in U.S. patent application Ser. No. 11/978,456, U.S. patent application Ser. No. 13/629,613, and U.S. Pat. No. 7,722,490 B2 can also be used.

Figure 8:
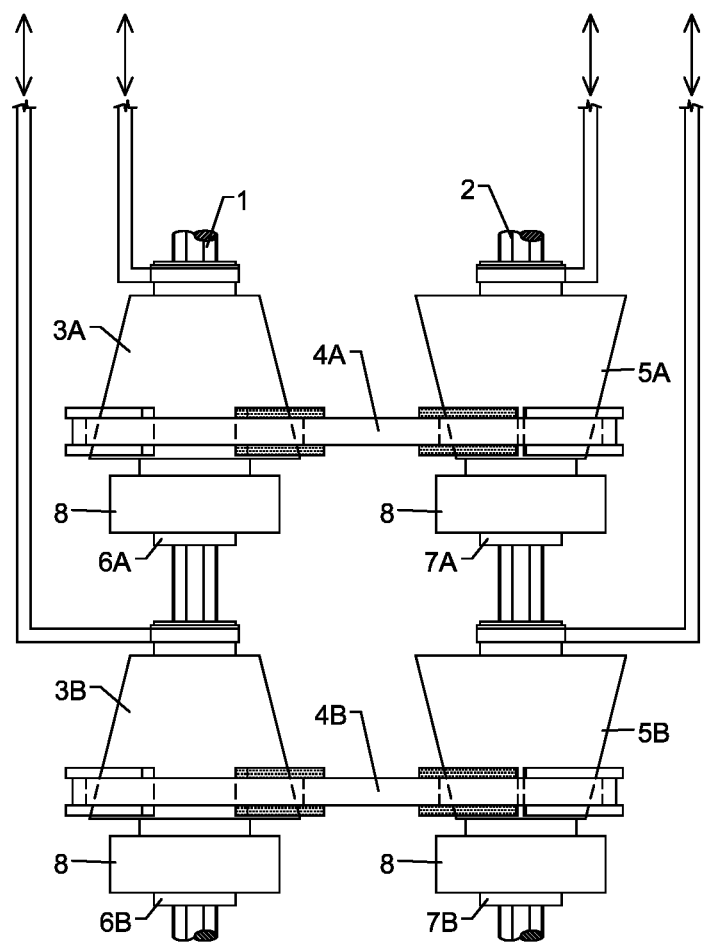
FIG. 8 shows a top-view of a CVT 6 that uses an adjuster 8 for each cone.

A CVT that is identical to the one shown in FIG. 5, except for using an adjuster for each cone, is shown in FIG. 8. The same labeling used for FIG. 5 is used for FIG. 8. For this CVT, the rotational position of one cone at a time of a CVT 4 (driving cone or driven cone) can be rotated by the adjusters into a moveable position during parking. In order to do this, for said CVT 4 the adjusters of the driving cone and driven cone are rotated in a common direction until the cone that was to be rotated into a moveable position is in that position. Here the required rotational speed of the adjusters might be different, this problem can be solved by simply letting the adjuster that rotates too fast stall, slip, and/or slowdown. Once a cone is in a moveable position, its axial position can be changed.

When parked, during the axial position changing procedure of a cone, the adjusters are not required to provide a releasing torque unless there is tension in the transmission belt that needs to be relieved. Here tension in transmission belt is unlikely, especially after the adjusters are used to change the rotational positions of the cones. However, if desired the tension in transmission belt can be relieved by rotating a cone of that transmission belt in both directions, since one direction will be the direction to relieve tension and the torque of the adjusters are limited so that they should not be able significantly increase the tension in a transmission belt in whichever direction they are rotating. The duration of each rotation of the rotations in both directions can be set by a "set time duration" (the earlier description regarding a "set time duration" is also applicable here). When parked, there is no need to "compensate for having cones with different transmission diameters mounted on a same shaft/spline".

When the adjusters 8 (adjusters) are only used to release tension, compensate/allow for "Transmission ratio change rotation", and "compensate for having cones with different transmission diameters mounted on a same shaft/spline", the only control required for the adjusters is ON/OFF and the direction of rotation; since here the adjusters can always be rotated up to their maximum capacity when ON. Under regular driving conditions having to change the transmission ratio of a CVT during parking, for which rotational position control of a cone is required, is not needed. But, if the cost of an adjuster that allows for rotational position control is not cost prohibitive, being able to change the transmission ratio of a CVT during parking allows the CVT to operate optimally even under extreme driving conditions.

A CVT 6 uses two CVT 4's in order to reduce the tension in the transmission belt of one of the CVT 4's. The concept of using two CVT's and mounting at least one means for conveying torque (such as a cone, transmission pulley, variator, etc.) of each CVT using an "adjuster that allows a said means for conveying torque to rotate relative to the shaft/spline on which it is mounted" can also be applied to other CVT's. For example, the same concept can be applied to a CVT that uses two CVT 1's or two CVT 3's of U.S. Pat. No. 7,722,490 instead of two CVT 4's. For the CVT 1's and CVT 3's it is recommended that the cones of these CVT's are cones with two opposite slideable teeth.

For the preferred CVT 6 shown in FIG. 5, the adjusters 8 are mounted on a common shaft/spline. A preferred CVT 6 uses two substantially identical CVT 4's, for which each CVT 4 uses an adjuster 8 to mount a cone. An adjuster 8, which comprises of an adjuster body 8-M1 and adjuster output shaft 8-M2, can be used to adjust the rotational position of the cone mounted to it relative to the shaft/spline on which it is mounted. It doesn't matter of which shaft/spline of their CVT 4 the adjusters are mounted. As such, the adjusters 8 of a CVT 6 can also be mounted on different shafts/splines. A preferred CVT 6 where the adjusters 8 are mounted on different splines is shown in FIG. 9.

CVT with Transmissions
CVT with Pre-Transmission

Figure 10:
FIG. 10 shows a schematic diagram for CVT that uses a pre-transmission.

Under most regular driving conditions, the engine of vehicle only revs-up to about half of its maximum rpm. However, under certain driving condition (i.e. driving uphill, towing), the maximum power of the engine is required so that the engine needs to rev-up to its maximum rpm. In order to limit the input speed into a CVT, a transmission, which is referred to as a pre-transmission, can be placed between the engine/motor and the CVT. The pre-transmission should have one gear ratio for regular driving, and at least one gear ratio for high torque driving. The gear ratio for high torque driving should be selected so as to reduce the input speed and increase the torque of the rotation that enters the CVT. If desired, the pre-transmission can also have neutral and/or reverse gearing. A configuration of a drive system using a Pre-transmission is shown in FIG. 10.

The purpose of the Pre-transmission is to limit the maximum rotational speed of a cone. Another method to accomplish this is by limiting the maximum rotational speed cone is allowed to rotate. Here the engine can still be allowed to rotate at its maximum rpm, but the transmission ratio of the CVT should be limited so that the maximum rotational speed of a cone is limited to a pre-set maximum rotational speed for a cone.

CVT with Post-Transmission

Figure 11:
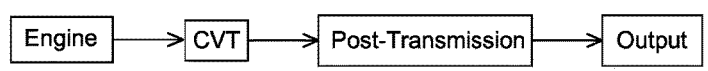
FIG. 11 shows a schematic diagram for CVT that uses a post-transmission.

Under most regular driving conditions, a vehicle only speeds-up to 80 mph. In order to accommodate for faster speed, a transmission, which is referred to as a post-transmission, can be placed after the output of the CVT. The post-transmission should have one gear ratio for regular driving, and at least one gear ratio for high torque driving. If desired, the post-transmission can also have neutral and/or reverse gearing. A configuration of a drive system using a Post-transmission is shown in FIG. 11.

CVT with Pre-Transmission and Post-Transmission

Figure 12:
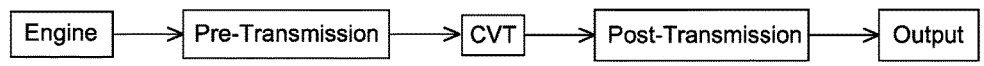
FIG. 12 shows a schematic diagram for CVT that uses a pre-transmission and post-transmission.

If desired drive system can also have a pre-transmission and post-transmission, both which are described earlier. A configuration of a drive system using a Pre-transmission and Post-transmission is shown in FIG. 12.

Example of a CVT with a Pre-Transmission and a Post-Transmission

Figure 13:
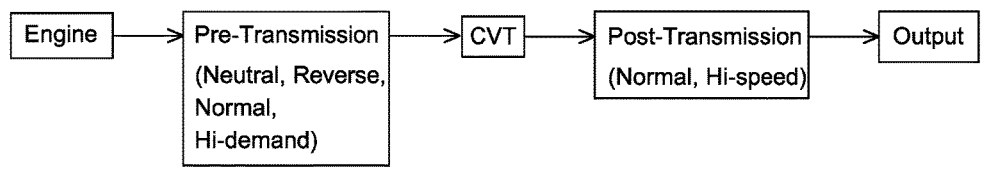
FIG. 13 shows a schematic diagram for Drive System 1.

An example drive system that has a pre-transmission, a CVT, and a post-transmission is described below and shown in FIG. 13; it is referred to as a Drive System 1. Obviously many other configurations and control schemes besides the one described in this example can be used for a drive system that has a CVT, and a pre-transmission and/or post-transmission.

The pre-transmission of Drive System 1 has the following gearing: Neutral, Reverse, Normal (for regular demand driving conditions), and Hi-demand (for high demand driving conditions). The Hi-demand gearing can consist of one or several gear ratios.

The post-transmission of Drive System 1 has the following gearing: Normal (for regular speed driving conditions), and Hi-speed (for high speed driving conditions). The Hi-speed gearing can consist of one or several gear ratios.

Let's say we have an engine with redline of 6000 rpm. Under normal driving conditions, running said engine up to 3000 rpm is sufficient. Hence, here we use the Normal gearing of the pre-transmission for engine speeds up to 3000 rpm. And for engine speeds greater than 3000 rpm we use the Hi-demand gearing(s).

Switching between Normal gearing and Hi-demand gearing can be performed automatically or manually. Automatic switching can be performed by a control mechanism that monitors the rpm speed of the engine. And manual switching can be performed by the user whenever he senses a Hi-demand condition, such as driving uphill or towing for example.

The output transmission ratio of Drive System 1 is the transmission ratio involving the pre-transmission, CVT, and post-transmission. A transmission control system, which has the required output transmission ratio for given output speed and demand driving condition programmed into it, is used to control the output transmission ratio of Drive System 1 based on: a) the output speed of Drive System 1; b) whether its pre-transmission is in Normal gearing or Hi-demand gearing (the demand driving condition).

The transmission control system is programmed so that the output transmission ratio for Hi-demand gearing is lower than that for Normal gearing (for a lower transmission ratio, the torque/speed ratio is higher than that of a higher transmission ratio). And programmed so that for each demand driving condition (Normal and Hi-demand), the lower the output speed, the lower the output transmission ratio.

Immediately after switching from Normal gearing to Hi-demand gearing and immediately after switching from Hi-demand gearing to Normal gearing, the output transmission ratio of Drive System 1 is adjusted by the transmission control system based on the output speed of Drive System 1 and the demand driving condition (Normal or Hi-demand). This is accomplished by making adjustments in the CVT and/or Post transmission to reach the required programmed output transmission ratio using the "transmission configuration of Drive System 1" for the demand driving condition.

Regarding the "transmission configuration of Drive System 1": a) for Hi-demand gearing, as the output transmission ratio is increased from the lowest transmission ratio to the highest transmission ratio, the post-transmission is used before the CVT is used, since for Hi-demand driving conditions the Hi-speed feature of the post-transmission will not be used, and the transmission ratio of the post-transmission can be changed faster than that of the CVT; b) for Normal gearing, as the transmission ratio is increased from the lowest transmission ratio to the highest transmission ratio, the CVT is used first until its highest transmission ratio is reached before the post-transmission is used.

Under most driving conditions Drive System 1 will provide CVT performance, while allowing its CVT to operate at a lower maximum rpm. Like the Hi-demand gearing of the pre-transmission, the Hi-speed gearing of the post-transmission is also only used occasionally. As a numerical example, for a car with 20 inch tires, an engine speed of 3000 rpm, and a 1:1 transmission ratio, the car's speed is =3000 rpm*3.14*20=188400 in/min=287 km/h. Under the same set-up, for an engine speed of 2000 rpm, the car's speed is 191 km/h. If the transmission ratio range of the CVT is from 4:1 (lowest trans. ratio) to 1:1 (highest trans. ratio), then it will be able to provide a car with a speed up to 191 km/h while running the engine up to 2000 rpm, which is in range of normal operating conditions of a car.

Maximum Axial Position Changing RPM Methods

For the "Maximum Axial Position Changing RPM Method", the CVT is operated under three operating modes which are: "Normal Driving Conditions" mode, "High Torque Driving Conditions" mode, and "High Speed Driving Conditions" mode. Here a controlling computer selects which operating mode to be used for the CVT, either automatically or due to the manual selection of the driver.

Also, the "High Torque Driving Conditions" mode is separated into two operating modes, which are the "Low Transmission Ratio-High Torque Driving Conditions" mode and the "High Transmission Ratio-High Torque Driving Conditions" mode.

For the "Maximum Axial Position Changing RPM Method", "the maximum speed of the input shaft at which the axial position of a cone mounted on it is changed" and "the maximum speed of the output shaft at which the axial position of a cone mounted on it is changed" are each limited to their "maximum axial position changing rpm value".

The "maximum axial position changing rpm value" of the input shaft and the "maximum axial position changing rpm value" of the output shaft can be identical or different. When different, the input shaft and the output shaft each have their own "maximum axial position changing rpm value".

The purpose of the "maximum axial position changing rpm value(s)" is to limit the rpm (speed) of the shafts at which axial position changing of "the cones mounted on them" is performed. As such, axial position changing of a cone is only performed when the speed of the shaft of said cone has not exceeded its "maximum axial position changing rpm value".

In order to allow for reliable axial position changing of a cone of a CVT, the "maximum axial position changing rpm value" of the shaft of said cone should be selected such that when said shaft is rotating at said "maximum axial position changing rpm value", then axial position changing of said cone can be performed for all operating conditions of its CVT, even when said shaft is suddenly fully accelerated.

And for a CVT 6, the "maximum axial position changing rpm value" of a shaft should also be selected such that a complete sequence of steps of the "preferred transmission ratio changing procedure for a CVT 6" can be performed for all operating condition of its CVT, even when said shaft is suddenly fully accelerated.

Experimentation can be used to determine a "maximum axial position changing rpm value". In addition, factors of safety, conservative estimates, etc. can be used to ensure the reliability of a "maximum axial position changing rpm value".

Although the maximum rpm of the input shaft and the maximum rpm of the output shaft at which the axial positions of their cones can be changed are limited to their "maximum axial position changing rpm value", the maximum rpm of the input shaft and the maximum rpm of the output shaft are not limited for the "High Torque Driving Conditions" mode and the "High Speed Driving Conditions" mode. Hence, the maximum power of an engine can be utilized for the "High Torque Driving Conditions" mode and "High Speed Driving Conditions" mode.

The CVT using the "Maximum Axial Position Changing RPM Method" is in the "Normal Driving Conditions" mode when it is not in the "Low Transmission Ratio-High Torque Driving Conditions" mode (see below), and the transmission ratio of the CVT is from the "lowest (intial) transmission ratio" to a "transmission ratio at which a predetermined cruising speed can be reached at a predetermined reasonable engine rpm". For this transmission ratio range of the "Normal Driving Conditions" mode, "the maximum rpm of the input shaft" and "the maximum rpm of the output shaft" are limited to their "maximum axial position changing rpm value" regardless of the input (gas pedal depression) of the driver.

And the CVT is also in the "Normal Driving Conditions" mode when the "Low Transmission Ratio-High Torque Driving Conditions" mode is currently not manually selected, and the transmission ratio of the CVT is from the "transmission ratio at which a predetermined cruising speed can be reached at a predetermined reasonable engine rpm" to the "highest (final) transmission ratio", as long as the "maximum axial position changing rpm value" for both the input shaft and the output shaft are not exceeded. Here if the driver depresses the gas pedal far enough such that the "maximum axial position changing rpm value" for either the input shaft or output shaft is exceeded, the CVT will automatically enter the "High Transmission Ratio-High Torque Driving Conditions" mode.

For the "Low Transmission Ratio-High Torque Driving Conditions" mode, the "maximum rpm of the input shaft" and the "maximum rpm of the output shaft" are not limited to their "maximum axial position changing rpm value". The CVT is in the "Low Transmission Ratio-High Torque Driving Conditions" mode when the transmission ratio of the CVT is from the "lowest (intial) transmission ratio" to a "transmission ratio at which a predetermined cruising speed can be reached at a predetermined reasonable engine rpm"

and the controlling computer of the CVT senses that its vehicle is in a "high torque required" situation, such as when the controlling computer senses that the depression of the gas pedal results in a lower than usual speed increase of the input shaft or when the gas pedal is suddenly/violently depressed for example.

The CVT can also be in the "Low Transmission Ratio-High Torque Driving Conditions" mode when the "Low Transmission Ratio-High Torque Driving Conditions" mode is manually selected by the driver. Examples of situations where manually selecting the "Low Transmission Ratio-High Torque Driving Conditions" mode can be useful are driving uphill and pulling.

When the CVT is in the "Low Transmission Ratio-High Torque Driving Conditions" mode, transmission ratio changing can still be performed as long as the speed of each shaft of "the cone(s) for which the axial position(s) is/are changed" does not exceeded its/their "maximum axial position changing rpm value".

The CVT is in the "High Transmission Ratio-High Torque Driving Conditions" mode when the transmission ratio of the CVT is in the high transmission ratio range, which is the transmission ratio range from the "transmission ratio at which a predetermined cruising speed can be reached at a predetermined reasonable engine rpm" to the "highest (final) transmission ratio", and the driver depresses the gas pedal deep enough so that the "maximum axial position changing rpm value" for at least one shaft is exceeded. This allows the driver to use the full power of the engine for this transmission ratio range when needed.

For the "transmission ratios below the high transmission ratio range", the CVT will remain in the "Normal Driving Conditions" mode when the "Low Transmission Ratio-High Torque Driving Conditions" mode is not selected (automatically or through manual selection by the driver) by the controlling computer regardless of the input (gas pedal depression) of the driver. The reason for this is because for the "transmission ratios below the high transmission ratio range", less power is needed for acceleration since the transmission ratios are lower, and because this allows a cruising speed to be reached at a reasonable engine rpm without having to slow down the vehicle to allow for transmission ratio changes in the CVT. Using a car with a 3 to 5 gear manual transmission as an example, a transmission/gear ratio where a cruising speed can be reached at a reasonable engine rpm is a 3rd gear, while a 1st gear is not.

The CVT is in the "High Speed Driving Conditions" mode when it is at its final (highest) transmission ratio. For the "High Speed Driving Conditions" mode the "maximum rpm of the input shaft" and the "maximum rpm of the output shaft" are not limited, so as not to limit the speed a vehicle to the "maximum axial position changing rpm value(s)". When a CVT is in the "High Speed Driving Conditions" mode, transmission ratio changing can still be performed as long as the speed of each shaft of "the cone(s) for which the axial position(s) is/are changed" does not exceeded its/their "maximum axial position changing rpm value".

If desired (but not necessary), in order to provide additional transmission ratios for the "High Speed Driving Conditions" mode, a Post Transmission can be placed after the output of the CVT. A Post Transmission can be a regular gear box that has a regular gearing and one or several high speed gearing(s). If desired, the Post Transmission can also have neutral and/or reverse gearing. A configuration of a drive system using a Post Transmission is shown in FIG. 11.

Alterations to the "Maximum Axial Position Changing RPM Method" of the previous paragraphs can be made, an example is described as the "Alternate Maximum Axial Position Changing RPM Method" below.

Like the "Maximum Axial Position Changing RPM Method", for the "Alternate Maximum Axial Position Changing RPM Method", "the maximum speed of the input shaft at which the axial position of a cone mounted on it is changed" and "the maximum speed of the output shaft at which the axial position of a cone mounted on it is changed" are each limited to their "maximum axial position changing rpm value".

And like the "Maximum Axial Position Changing RPM Method", for the "Alternate Maximum Axial Position Changing RPM Method", the purpose of the "maximum axial position changing rpm value(s)" is to limit the rpm (speed) of the shafts at which axial position changing of "the cones mounted on them" is performed. As such, axial position changing of a cone is only performed when the speed of the shaft of said cone has not exceeded its "maximum axial position changing rpm value".

And like the "Maximum Axial Position Changing RPM Method", in order to allow for reliable axial position changing of a cone of a CVT, the "maximum axial position changing rpm value" of the shaft of said cone should be selected such that when said shaft is rotating at said "maximum axial position changing rpm value", then axial position changing of said cone can be performed for all operating conditions of its CVT, even when said shaft is suddenly fully accelerated.

And like for the "Maximum Axial Position Changing RPM Method", for a CVT 6, the "maximum axial position changing rpm value" of a shaft should also be selected such that a complete sequence of steps of the "preferred transmission ratio changing procedure for a CVT 6" can be performed for all operating condition of its CVT, even when said shaft is suddenly fully accelerated.

Like the "Maximum Axial Position Changing RPM Method", for the "Alternate Maximum Axial Position Changing RPM Method", the CVT is also operated under three operating modes which are: "Normal Driving Conditions" mode, "High Torque Driving Conditions" mode, and "High Speed Driving Conditions" mode. But unlike the "Maximum Axial Position Changing RPM Method", for the "Alternate Maximum Axial Position Changing RPM Method", the "High Torque Driving Conditions" mode is not separated into the "Low Transmission Ratio-High Torque Driving Conditions" mode and the "High Transmission Ratio-High Torque Driving Conditions" mode.

For the "Alternate Maximum Axial Position Changing RPM Method" the CVT is in the "Normal Driving Conditions" mode when it is not in the "High Torque Driving Conditions" mode, and the transmission ratio of the CVT is from "its lowest (intial) transmission ratio" to the "transmission ratio immediately below its "highest (final) transmission ratio".

For the "Normal Driving Conditions" mode, "the maximum rpm of the input shaft" and "the maximum rpm of the output shaft" are limited to their "maximum axial position changing rpm value(s)" regardless of the input (gas pedal depression) of the driver. Under this setup, the "highest (final) transmission ratio" of the CVT can always be reached when the CVT is in the "Normal Driving Conditions" mode. The "Normal Driving Conditions" mode should be the mode that is active when the transmission ratio of the CVT is from "its lowest (intial) transmission ratio" to the "transmission ratio immediately below its highest (final) transmission ratio" during normal daily driving conditions.

For the "Alternate Maximum Axial Position Changing RPM Method" the CVT is in the "High Torque Driving Conditions" mode when the transmission ratio of the CVT is from "its lowest (intial) transmission ratio" to the "transmission ratio immediately below its "highest (final) transmission ratio" and the controlling computer of the CVT senses that its vehicle is in a "high torque required" situation, such as when the controlling computer senses that the depression of the gas pedal results in a lower than usual speed increase of the input shaft or when the gas pedal is suddenly/violently depressed. For the "High Torque Driving Conditions" mode, the "maximum rpm of the input shaft" and the "maximum rpm of the output shaft" are not limited to their "maximum axial position changing rpm value".

For the "Alternate Maximum Axial Position Changing RPM Method" the CVT also is in the "High Torque Driving Conditions" mode when the "High Torque Driving Conditions" mode is manually selected by the driver. Examples of situations where manually selecting the "High Torque Driving Conditions" mode can be useful are driving uphill and pulling.

When the CVT is in the "High Torque Driving Conditions" mode, transmission ratio changing can still be performed as long as the speed of each shaft of "the cone(s) for which the axial position(s) is/are changed" does not exceeded its/their "maximum axial position changing rpm value".

For the "Alternate Maximum Axial Position Changing RPM Method" the CVT is in the "High Speed Driving Conditions" mode once it has reached "its final (highest) transmission ratio". For the "High Speed Driving Conditions" mode the "maximum rpm of the input shaft" and the "maximum rpm of the output shaft" are not limited, so as not to limit the speed of a vehicle to the "maximum axial position changing rpm value(s)" of its CVT. When a CVT is in the "High Speed Driving Conditions" mode, transmission ratio changing can still be performed as long as the speed of each shaft of "the cone(s) for which the axial position(s) is/are changed" does not exceeded its/their "maximum axial position changing rpm value".

It is recommended that for the "Alternate Maximum Axial Position Changing RPM Method" the "maximum axial position changing rpm value(s)" are higher than that/those of the "Maximum Axial Position Changing RPM Method". For the "Maximum Axial Position Changing RPM Method" it is recommended that the "maximum axial position changing rpm value(s)" are selected so that it/they are never exceeded during "regular day to day driving conditions" when the transmission ratio of the CVT is from the "lowest (intial) transmission ratio" to a "transmission ratio at which a predetermined cruising speed can be reached at a predetermined reasonable engine rpm". While for the "Alternate Maximum Axial Position Changing RPM Method" it is recommended that the "maximum axial position changing rpm value(s)" are selected so that it/they are never exceeded during "regular day to day driving conditions" when the transmission ratio of the CVT is from its "lowest (intial) transmission ratio" to the "transmission ratio immediately below its highest (final) transmission ratio".

For the "Maximum Axial Position Changing RPM Method" and the "Alternate Maximum Axial Position Changing RPM Method" it is recommended that both (which is preferred) or either (which is not preferred) of the following are used: a) indication (such as alarm sound indication, message sound indication, visual signal indication, visual text indication, and/or haptic indication, etc.) that is provided to the driver when a "maximum axial position changing rpm value" is exceeded, and/or b) labeling of the rpm dial indicator to show the maximum engine rpm at which a "maximum axial position changing rpm value" will not be exceeded.

Item a) indication when a "maximum axial position changing rpm value" is exceeded, is used to inform the driver when "maximum axial position changing rpm value" is exceeded; the driver of a CVT should know (through manuals, instructional video, instructional text, instructional audio, etc.) that transmission ratio changing in the CVT cannot be performed when a "maximum axial position changing rpm value" is exceeded. As such, here when a "maximum axial position changing rpm value" is exceeded, the driver knows that he/she needs to reduce the engine rpm (preferably when save and convenient) to allow for transmission ratio changes in the CVT.

Indication when a "maximum axial position changing rpm value" is exceeded should be provided each time a "maximum axial position changing rpm value" is exceeded. And it is recommended that once triggered, this indication remains active until no "maximum axial position changing rpm value" is exceeded anymore.

For Item b) the rpm dial indicator is marked to show the maximum engine rpm at which a "maximum axial position changing rpm value" will not be exceeded, a mark that says "CVT Maximum Transmission Ratio Changing RPM" can be used for example. Here because of the rpm dial indicator labeling (and if desired additional instruction through manuals, instructional video, instructional text, instructional audio, etc.), the user of the CVT knows that transmission ratio changing cannot be continuously performed when a "maximum axial position changing rpm value" is exceeded; and knows how much he/she needs to reduce the engine rpm when a "maximum axial position changing rpm value" is exceeded in order to allow for continuous/uninterrupted transmission ratio changes in the CVT.

The controlling computer can calculate and determine the engine rpm at which a "maximum axial position changing rpm value" is exceeded based on: 1) the current transmission ratio, 2) the "maximum axial position changing rpm value" of the input shaft, 3) the "maximum axial position changing rpm value" of the output shaft, 4) the speed of the input shaft for a given engine rpm at said current transmission ratio, and 5) the speed of the output shaft for a given engine rpm at said current transmission ratio. Here a "maximum axial position changing rpm value" is exceeded for an engine rpm where 4) is greater than 2) and an engine rpm where 5) is greater than 3). The smaller engine rpm between the engine rpm where 4) is equal to 2) and the engine rpm where 5) is equal to 3) can be used as the engine rpm that is marked as the "CVT Maximum Transmission Ratio Changing RPM" on the rpm dial indicator.

The "CVT Maximum Transmission Ratio Changing RPM" changes with the transmission ratio of the CVT, if the CVT has transmission ratios where the output shaft rotates faster than the input shaft. If it is not desired to adjust the value indicated by the "CVT Maximum Transmission Ratio Changing RPM" mark with changes in the transmission ratio of the CVT, then the "CVT Maximum Axial Position Changing RPM" mark can simply be an estimation. Here preferably a conservative estimation, which ensures that no "maximum axial position changing rpm value" is exceeded for all transmission ratios of the CVT when the value indicated by the "CVT Maximum Transmission Ratio Changing RPM" mark is not exceeded, is used for the "CVT Maximum Transmission Ratio Changing RPM" mark.

Alternately, if desired the value indicated by the "CVT Maximum Transmission Ratio Changing RPM" mark can be made to change with changes in the transmission ratio of the CVT, so that the "CVT Maximum Transmission Ratio Changing RPM" mark can be made to always indicate the actual maximum engine rpm value at which no "maximum axial position changing rpm value" is exceeded. Here animated displays such as LED displays or LCD displays can be used for example.

If desired the "Maximum Axial Position Changing RPM Method" and the "Alternate Maximum Axial Position Changing RPM Method" can be implemented so that they can be turned ON and OFF as desired by the driver.

Another variation of the "Maximum Axial Position Changing RPM Method", which is referred to as the "Alternate Maximum Axial Position Changing RPM Method 2" is described below.

Like the "Maximum Axial Position Changing RPM Method", for the "Alternate Maximum Axial Position Changing RPM Method 2", "the maximum speed of the input shaft at which the axial position of a cone mounted on it is changed" and "the maximum speed of the output shaft at which the axial position of a cone mounted on it is changed" are each limited to their "maximum axial position changing rpm value".

And like the "Maximum Axial Position Changing RPM Method", for the "Alternate Maximum Axial Position Changing RPM Method 2", the purpose of the "maximum axial position changing rpm value(s)" is to limit the rpm (speed) of the shafts at which axial position changing of "the cones mounted on them" is performed. As such, axial position changing of a cone is only performed when the speed of the shaft of said cone has not exceeded its "maximum axial position changing rpm value".

And like the "Maximum Axial Position Changing RPM Method", for the "Alternate Maximum Axial Position Changing RPM Method 2", in order to allow for reliable axial position changing of a cone of a CVT, the "maximum axial position changing rpm value" of the shaft of said cone should be selected such that when said shaft is rotating at said "maximum axial position changing rpm value", then axial position changing of said cone can be performed for all operating conditions of its CVT, even when said shaft is suddenly fully accelerated.

And like for the "Maximum Axial Position Changing RPM Method", for the "Alternate Maximum Axial Position Changing RPM Method 2"; for a CVT 6, the "maximum axial position changing rpm value" of a shaft should also be selected such that a complete sequence of steps of the "preferred transmission ratio changing procedure for a CVT 6" can be performed for all operating condition of its CVT, even when said shaft is suddenly fully accelerated.

But unlike the "Maximum Axial Position Changing RPM Method" and the "Alternate Maximum Axial Position Changing RPM Method", for the "Alternate Maximum Axial Position Changing RPM Method 2" no engine rpm limiting or any other engine performance limiting is performed.

Figure 36:
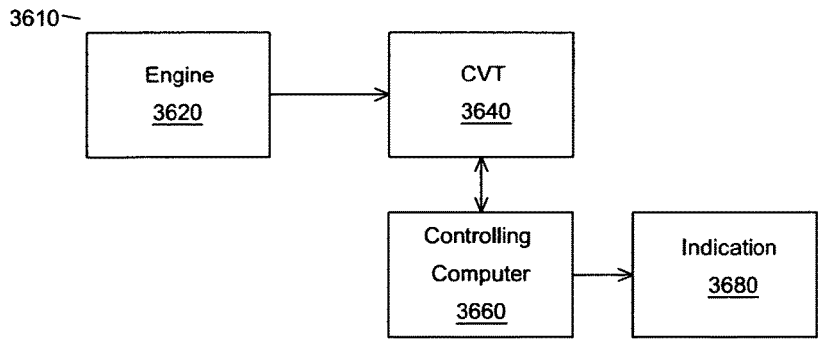
FIG. 36 shows a schematic diagram of a system 3610 that can be used for the "Alternate Maximum Axial Position Changing RPM Method 2" that uses indication (such as alarm sound indication, message sound indication, visual signal indication, visual text indication, and/or haptic indication, etc.) that is provided to the driver when a "maximum axial position changing rpm value is exceeded".
Figure 37:
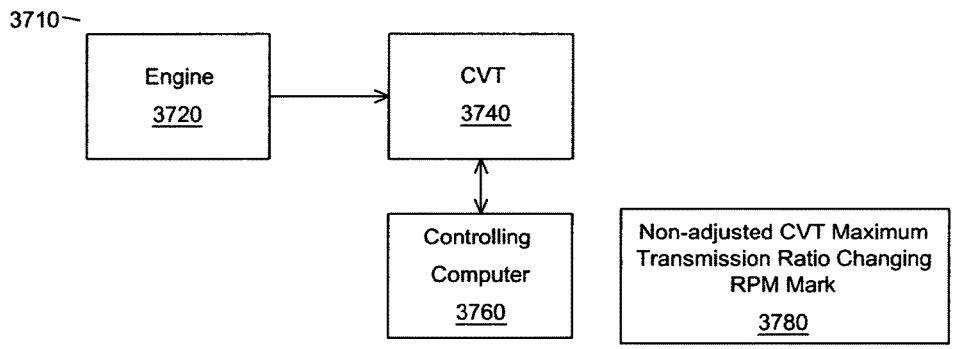
FIG. 37 shows a schematic diagram of a system 3710 that can be used for the "Alternate Maximum Axial Position Changing RPM Method 2" that uses Labeling of the RPM Dial Indicator to show the maximum engine rpm at which a "maximum axial position changing rpm value" will not be exceeded".
Figure 38:
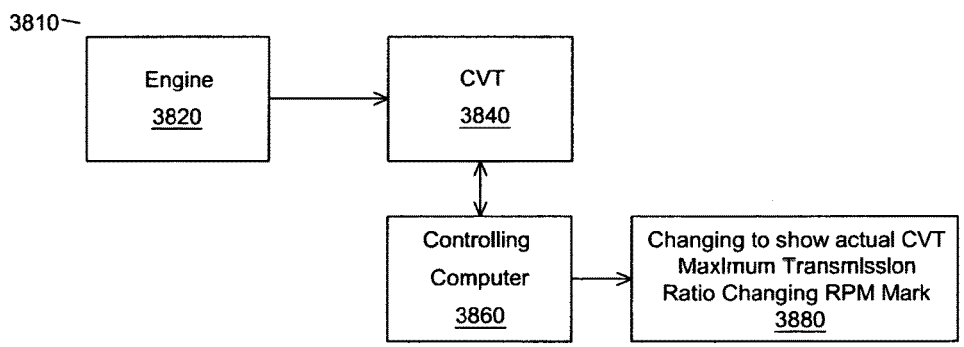
FIG. 38 shows another schematic diagram of a system 3810 that can be used for the "Alternate Maximum Axial Position Changing RPM Method 2" that uses Labeling of the RPM Dial Indicator to show the maximum engine rpm at which a "maximum axial position changing rpm value" will not be exceeded".

For the "Alternate Maximum Axial Position Changing RPM Method 2" both (which is preferred) or either (which is not preferred) of the following are used: a) indication (such as alarm sound indication, message sound indication, visual signal indication, visual text indication, and/or haptic indication, etc.) that is provided to the driver when a "maximum axial position changing rpm value" is exceeded, and/or b) labeling of the rpm dial indicator to show the maximum engine rpm at which a "maximum axial position changing rpm value" will not be exceeded. A control system 3610 that can be used for the "Alternate Maximum Axial Position Changing RPM Method 2" that uses indication (such as alarm sound indication, message sound indication, visual signal indication, visual text indication, and/or haptic indication, etc.) that is provided to the driver when a "maximum axial position changing rpm value" is exceeded is shown in FIG. 36; it comprises of an engine 3620, a CVT 3640 connected to the engine 3620, a controlling computer 3660, and an indication 3680. The controlling computer 3660 communicates with the CVT 3640 and provides an output to the indication 3680. A control system 3710 can be used for the "Alternate Maximum Axial Position Changing RPM Method 2" that uses Labeling of the RPM Dial Indicator to show the maximum engine rpm at which a "maximum axial position changing rpm value" will not be exceeded" is shown in FIG. 37; it comprises of an engine 3720, a CVT 3740 connected to the engine 3720, a controlling computer 3760, and a "Non-adjusted CVT Maximum Transmission Ratio Changing RPM Mark" 3780. The controlling computer 3760 communicates with the CVT 3740, but not with the "Non-adjusted CVT Maximum Transmission Ratio Changing RPM Mark" 3780, since it is a fixed labeling. Another control system 3810 that can be used for the "Alternate Maximum Axial Position Changing RPM Method 2" that uses Labeling of the RPM Dial Indicator to show the maximum engine rpm at which a "maximum axial position changing rpm value" will not be exceeded" is shown in FIG. 38; it comprises of an engine 3820, a CVT 3840 connected to the engine 3820, a controlling computer 3860, and a "Changing to show actual CVT Maximum Transmission Ratio Changing RPM Mark" 3880. The controlling computer 3860 communicates with the CVT 3840, and determines the value for the "Changing to show actual CVT Maximum Transmission Ratio Changing RPM Mark" 3880.

Item a) indication when a "maximum axial position changing rpm value" is exceeded, is used to inform the driver when "maximum axial position changing rpm value" is exceeded; the driver of a CVT should know (through manuals, instructional video, instructional text, instructional audio, etc.) that transmission ratio changing in the CVT cannot be performed when a "maximum axial position changing rpm value" is exceeded. As such, here when a "maximum axial position changing rpm value" is exceeded, the driver knows that he/she needs to reduce the engine rpm (preferably when save and convenient) to allow for transmission ratio changes in the CVT.

Indication when a "maximum axial position changing rpm value" is exceeded should be provided each time a "maximum axial position changing rpm value" is exceeded. And it is recommended that once triggered, this indication remains active until no "maximum axial position changing rpm value" is exceeded anymore.

For Item b) the rpm dial indicator is marked to show the maximum engine rpm at which a "maximum axial position changing rpm value" will not be exceeded, a mark that says "CVT Maximum Transmission Ratio Changing RPM" can be used for example. Here because of the rpm dial indicator labeling (and if desired additional instruction through manuals, instructional video, instructional text, instructional audio, etc.), the user of the CVT knows that transmission ratio changing cannot be continuously performed when a "maximum axial position changing rpm value" is exceeded; and knows how much he/she needs to reduce the engine rpm when a "maximum axial position changing rpm value" is exceeded in order to allow for continuous/uninterrupted transmission ratio changes in the CVT.

The controlling computer can calculate and determine the engine rpm at which a "maximum axial position changing rpm value" is exceeded based on: 1) the current transmission ratio, 2) the "maximum axial position changing rpm value" of the input shaft, 3) the "maximum axial position changing rpm value" of the output shaft, 4) the speed of the input shaft for a given engine rpm at said current transmission ratio, and 5) the speed of the output shaft for a given engine rpm at said current transmission ratio. Here a "maximum axial position changing rpm value" is exceeded for an engine rpm where 4) is greater than 2) and an engine rpm where 5) is greater than 3). The smaller engine rpm between the engine rpm where 4) is equal to 2) and the engine rpm where 5) is equal to 3) can be used as the engine rpm that is marked as the "CVT Maximum Transmission Ratio Changing RPM" on the rpm dial indicator.

The "CVT Maximum Transmission Ratio Changing RPM" can change with the transmission ratio of the CVT if the CVT has transmission ratios where the output shaft rotates faster than the input shaft. If it is not desired to adjust the value indicated by the "CVT Maximum Transmission Ratio Changing RPM" mark with changes in the transmission ratio of the CVT, then the "CVT Maximum Axial Position Changing RPM" mark can simply be an estimation. Here preferably a conservative estimation, which ensures that no "maximum axial position changing rpm value" is exceeded for all transmission ratios of the CVT when the value indicated by the "CVT Maximum Transmission Ratio Changing RPM" mark is not exceeded, is used for the "CVT Maximum Transmission Ratio Changing RPM" mark.

Alternately, if desired the value indicated by the "CVT Maximum Transmission Ratio Changing RPM" mark can be made to change with changes in the transmission ratio of the CVT, so that the "CVT Maximum Transmission Ratio Changing RPM" mark can be made to always indicate the actual maximum engine rpm value at which no "maximum axial position changing rpm value" is exceeded. Here animated displays such as LED displays or LCD displays can be used for example.

For the "Alternate Maximum Axial Position Changing RPM Method 2" it is recommended that the "maximum axial position changing rpm value(s)" are selected so that it or they (if different values are used for the input shaft and the output shaft) are never exceeded during "regular day to day driving conditions" when the transmission ratio of the CVT is from the "lowest (intial) transmission ratio" to the "highest (final) transmission ratio".

For the "Alternate Maximum Axial Position Changing RPM Method 2" the full power of the engine is always available when needed, such as during high torque situations (which include: emergency situations where sudden acceleration is needed, driving uphill, pulling, etc.) and high speed situations (speeds after the highest transmission ratio of the CVT has been reached). Once a high torque situation or high speed situation where at least one "maximum axial position changing rpm value" is exceeded is over, the driver can simply reduce the engine rpm so that no "maximum axial position changing rpm value" is exceeded anymore so as to allow for transmission ratio changes in the CVT.

The value(s) for the "maximum axial position changing rpm value(s)" can be obtained through experimentation. A ball park figure for the "maximum axial position changing rpm value(s)" is between 3000 rpm to 4000 rpm.

The force needed for axial position changing of a cone and the shock loads for several "maximum axial position changing rpm values" as calculated in the "Sample Calculations for Axial Position Changing" section are shown below: "maximum axial position changing rpm value"=3000 rpm: F_initial=40 lbs, h_dropping=0.38 cm; "maximum axial position changing rpm value"=4000 rpm: F_initial=72 lbs, h_dropping=0.67 cm; and "maximum axial position changing rpm value"=6000 rpm: F_initial=162 lbs, h_dropping=1.5 cm.

As can be seen from the previous paragraph the forces needed for axial position changing of a cone and more importantly the shock loads are reduced significantly as the "maximum axial position changing rpm value" is reduced.

Calculations for the power consumption of a CVT due to transmission ratio changing is estimated below. Assuming that the width of a cone is 6 inches, and during a 60 minute trip each cone is moved from its smallest transmission diameter to its largest transmission diameter 100 times, then the total distance moved for all 4 cones is: 100*4 cones*6 inches*2=4800 inches=18.9 m. Assuming that the force needed to change the axial position of a cone is 40 lbs (180 N) then the Work required for transmission ratio changing of the CVT, Wcvt, is: Wcvt=180 N*18.9 m=3402 Joules.

The power consumption of a car is estimated below. Assuming that for a 60 minute (3600 seconds) trip, the car uses an average of 40 hp, then the Power consumed by the car, P, is: P=40 hp*735 Watts*3600 seconds=105,840,000 Joules.

The % power consumption of the CVT as based on the earlier paragraphs is, % Pcvt, is: Pcvt=3402 J/105,840,000 J*100%=0.0032%. This is most likely less than the operating losses of a manual transmission due to momentum losses, and the operating losses of an automatic transmission due to hydraulic clamping losses. In addition, when replacing a manual or automatic transmission can increase the efficiency of a car by 30% because of the increased transmission ratios.

In order to determine the speeds of the shafts for the "Maximum Axial Position Changing RPM Method", the "Alternate Maximum Axial Position Changing RPM Method", and the "Alternate Maximum Axial Position Changing RPM Method 2", speed sensors can be used.

Furthermore, the "Maximum Axial Position Changing RPM Method", the "Alternate Maximum Axial Position Changing RPM Method", and the "Alternate Maximum Axial Position Changing RPM Method 2" can be used for CVT's not described in this disclosure. All CVT's for which "lowering the maximum rpm at which transmission ratio changing has to be performed" is beneficial, can benefit from the "Maximum Axial Position Changing RPM Method", the "Alternate Maximum Axial Position Changing RPM Method", and the "Alternate Maximum Axial Position Changing RPM Method 2"; this includes CVT's for which the axial position of pulley halves instead of cones have to be changed in order to change the transmission ratio for example.

The overall transmission ratio for a vehicle "that uses a CVT" or "that uses a CVT and a Post Transmission" is controlled by a transmission ratio controller based on the speed of said vehicle by following a pre-programmed ideal (but probably not always actual) "speed vs transmission ratio curve/equation(s)".

For simplicity it is preferred that one "speed vs transmission ratio curve" is used for all operating modes of a CVT and for all operating conditions of a CVT; but if desired different "speed vs transmission ratio curves" for different "operation modes (Normal, High Torque, High Speed)" and/or "different operating conditions" can also be used.

For example, a CVT can have a "High Torque-Speed vs Transmission Ratio Curve" and a "Low Torque-Speed vs Transmission Ratio Curve"; where the "High Torque-Speed vs Transmission Ratio Curve" is actuated when the controlling computer senses that the driver wants to accelerate the vehicle (as can be sensed by the controlling computer when the driver maintains or increases the depressing of the gas pedal during acceleration), and the "Low Torque-Speed vs Transmission Ratio Curve" is actuated when the controlling computer senses that the driver does not want to accelerate the vehicle (as can be sensed by a controlling computer when the driver maintains the depression of the gas pedal during cruising, or when the driver reduces the depression of the gas pedal).

If desired instead of only one "High Torque-Speed vs Transmission Ratio Curve", multiple "High Torque Speed vs Transmission Ratio Curves", which shapes can be based on the depression of the gas pedal can also be used.

For the "Maximum Axial Position Changing RPM Method" the transmission ratio of a vehicle is changed using the following "transmission ratio configuration according to speed setup". For the "Normal Driving Conditions" mode, the transmission ratio of the CVT is increased throughout its transmission ratio range as the speed of the vehicle is increased according to "its"/"its current" speed vs transmission ratio curve. If the speed of the vehicle is increased further and a Post Transmission is used, the Post Transmission switches to high speed gearing(s) when its pre-set switching speed(s) have been reached.

Here in instances where at least one "maximum axial position changing rpm value" is exceeded during the CVT transmission ratio range, an increase in the speed of the vehicle will not be accompanied by a corresponding increase in the transmission ratio of the CVT. It is recommended but optional that here the Post Transmission, if used, switches gears to provide a gear ratio that better fits the current "speed vs transmission ratio curve" when relevant. And once no "maximum axial position changing rpm value" is exceeded anymore, the Post Transmission returns to its "Normal Driving Conditions" mode gear ratio if required, and the transmission ratio controller will adjust the transmission ratio of the CVT according to the selected "speed vs transmission ratio curve".

If a "High Torque-Speed vs Transmission Ratio Curve" and a "Low Torque-Speed vs Transmission Ratio Curve" are used, then it is recommended that the "High Torque-Speed vs Transmission Ratio Curve" is used when a CVT returns to "the state where no maximum axial position changing rpm value is exceeded" from "a state where at least one maximum axial position changing rpm value is exceeded"; so that a larger torque for acceleration is readily available when needed so as to increase the responsiveness of the vehicle.

Using different "speed vs transmission ratio curves" for different driving situations, like the examples given above, can also be used for any other transmission.

An example of a CVT for a vehicle that uses the "Maximum Axial Position Changing RPM Method" is describe below. For said CVT, the "maximum axial position changing rpm value" for both the input shaft and the output shaft are set to 3000 rpm; although the maximum speed that the input shaft and the output shaft can rotate can be higher, such as 6000 rpm for example. Here for both the input shaft and the output shaft, axial position changing of a cone is only performed when they are rotating at speeds of 0 to 3000 rpm regardless of the current operating modes.

For said CVT, the transmission ratio (output speed/input speed transmission ratio) is from 1:4 to 1:1; 1:4 is the initial (lowest) transmission ratio and 1:1 is the final (highest) transmission ratio. When a vehicle starts-up from standstill, the CVT should always be at its initial (lowest) transmission ratio. Here if desired a "1:2 output speed/input speed gear reducer" can be used to modify the transmission ratio of the CVT, so that for the CVT itself a transmission ratio of 1:2 to 2:1 can be used. If a "1:2 output speed/input speed gear reducer" is used, then it is recommended that it is positioned after the CVT, so that the input torque and input speed of the engine to the CVT is not modified by it. If a post transmission is used, then the "1:2 output speed/input speed gear reducer" can be part of the post transmission.

For said CVT, for the "Normal Driving Conditions" mode, for transmission ratios of 1:4 to 1:2, the maximum speeds of the input shaft and the output shaft are limited up to their "maximum axial position changing rpm value" of 3000 rpm regardless of the gas pedal depression (the transmission ratio of 1:2 is the "transmission ratio at which a predetermined cruising speed can be reached at a predetermined reasonable engine rpm"). This allows the transmission ratio to be changed up to a transmission ratio of 1:2 even when the user of said vehicle floors the gas pedal.

When a "large torque required situation" occurs for transmission ratios of 1:4 to 1:2; then the CVT enters the "Low Transmission Ratio-High Torque Driving Conditions" mode and the maximum speeds of the input shaft and the output shaft will not be limited up to their "maximum axial position changing rpm value" of 3000 rpm, so that the full power of the engine is available. When the CVT is in the "Low Transmission Ratio-High Torque Driving Conditions" mode, transmission ratio changing can still be performed as long as both the input shaft and the output shaft do not exceeded their "maximum axial position changing rpm value".

For transmission ratios of 1:2 to 1:1 of the "Normal Driving Conditions" mode, the maximum speeds of the input shaft and the output shaft are not limited. But here when the input shaft or the output shaft exceed their "maximum axial position changing rpm value" of 3000 rpm, the CVT will switch to the "High Transmission Ratio-High Torque Driving Conditions" mode.

The CVT is in the "High Speed Driving Conditions" mode when it is at its final (highest) transmission ratio of 1:1. For the "High Speed Driving Conditions" mode the maximum rpm of the input shaft and the maximum rpm of the output shaft are not limited, so as not to limit the speed a vehicle to the "maximum axial position changing rpm value".

At a transmission ratio of 1:2, a cruising speed of about 70 mph can be reached at an input shaft speed, which is also the engine rpm, of about 2000 rpm. If the maximum speeds of the input shaft and the output shaft are not limited to the "maximum axial position changing rpm value" of 3000 rpm until a "transmission ratio at which a predetermined cruising speed can be reached at a predetermined reasonable engine rpm" has been reached; then it is possible that the transmission ratio cannot be changed when the user of the vehicle floors the gas pedal to above 3000 rpm during start-up so that the transmission ratio remains at 1:4; if so, a cruising speed of about 70 mph is reached at an input speed of about 4000 rpm. Cruising while the engine runs near redline can damage the engine, and can be dangerous since almost no additional increase in speed is available when suddenly required.

In order to extend the transmission ratio for the vehicle to above a transmission ratio of 1:1, a Post Transmission can be used. The Post Transmission can be a regular gear box that has a regular gearing and one or several high speed gearing(s); and its transmission ratio changing ability is not limited by the "maximum axial position changing rpm value".

The primary purpose of the Post Transmission is to provide additional transmission ratios for high speed situations of the vehicle. But if used, it is recommended that a Post Transmission is also used to change the transmission ratio for the vehicle during low speed situations of the vehicle in instances when the "maximum axial position changing rpm value" is exceeded but a transmission ratio that that better fits the current "speed vs transmission ratio curve" can be provided by the Post Transmission. For a vehicle for which the diameters of the wheels are 25 inches, an output shaft speed of 3000 rpm corresponds to vehicle speed of about 223 mph, as such a Post Transmission with high speed gearing(s) might not be necessary for most vehicles. But if desired, a Post Transmission can be used so that the transmission ratio range of the CVT can be reduced, such as from "1:4 to 1:1" to "1:4 to 1:2" for example; this will reduce the size of the CVT.

The preferred method among the "Maximum Axial Position Changing RPM Method", the "Alternate Maximum Axial Position Changing RPM Method", and the "Alternate Maximum Axial Position Changing RPM Method 2", is the "Alternate Maximum Axial Position Changing RPM Method 2" because of its simplicity, but the other methods have merits as well.

Sample Calculations for Axial Position Changing

A rough sample calculation for a "Lever Indexing Mechanism 2" (described in U.S. patent application Ser. No. 14/557,454) that is used to move a "cone with one torque transmitting member" axially is described below. Let's say for the cone with one torque transmitting member (also referred to as "cone" or "the cone" in this section), the smallest transmission diameter, Dsmall, is 3 inches and the largest transmission diameter, Dlarge, is 6 inches. In addition, the length of the cone from Dsmall to Dlarge is 6 inches, and the pitch length of a tooth of the torque transmitting member is 0.25 inches. For this setup, the number of teeth at Dsmall are approximately 75, and the number of teeth at Dlarge are approximately 150. As such the difference in the amount of teeth from Dsmall to Dlarge is 75 teeth. Since a difference of 75 teeth is achieved over a length of 6 inches. The length (axial distance), S, that the cone has to be moved for a transmission diameter increase or decrease of 1 tooth is: S=6 inches/75 teeth=0.08 inches.

And let's say the maximum rotating speed at which axial position changing of the cone is performed, rpm_max, is 3000 rpm, and axial position changing of the cone has to be performed during a duration of ¾ of a revolution of the cone. Then the maximum time, t, at which the axial position of the cone can be changed is: t=(¾)/(3000 rpm)=0.00025 minutes=0.015 seconds.

In order to calculate the acceleration, a, needed to move the cone we use: S=0.5*a*t^2, from which we get: a=2*S/t^2. Using our earlier results we get: a=2*0.08/0.015^2=711 inches/seconds^2=18 meters/seconds^2.

Assuming that the mass of the cone and its mechanisms to be moved axially, m, is 5 kg; then the Force, F, needed to move the cone is: F=m*a=5*18=90 Newtons=20 lbs.

For a "Lever Indexing Mechanism 2", the force to move a cone is provided by a pre-tensioned tension spring, and the force of the pre-tensioned tension spring decreases as its actuator lever rotates towards its neutral position. The 20 lbs force required, as calculated above, assumes that a constant 20 lbs force is applied on the cone. In order to compensate for this, the pre-tensioned tension spring needs to provide an initial force, F_initial, of: 2*F=2*20 lbs=40 lbs. Here if the final force provided by the pre-tensioned tension spring is 0, then the average acceleration provided by the pre-tensioned tension spring is equal to the average acceleration provided by a constant 20 lbs force. The calculation described here is only a ballpark estimation; the actual initial force needed can be easily obtained and refined through experimentation.

The impact velocity of the cone as it hits its stopping/final position is: v_impact=a*t=18*0.015=0.27 meters/second. The dropping height, h_dropping, for the impact velocity can be determined from the following: t=v_impact/gravity=0.27/9.81=0.028 seconds, and h_dropping=0.5*gravity*t^2=0.5*9.81*0.028^2=0.0038 meters=0.38 cm.

Using the same equations above except for different rpm values, we get the following values for rpm_max=4000 rpm: F_initial=72 lbs, h_dropping=0.67 cm; and the following values for rpm_max=6000 rpm: F_initial=162 lbs, h_dropping=1.5 cm.

Detailed Design for Tensioning Pulleys Tensioning System

A detailed design for a "Tensioning Pulley Tensioning System" for a preferred CVT 6 (which here uses a Driving Cone 3C, a Driven Cone 5C, and a Transmission Belt 4C for one of its CVT4's) is shown as front-view in FIG. 14 and as a partial top-view in FIG. 15. It has two vertical slider beams 16 which slide on slider rounds 17. In order to reduce the friction between the vertical slider beams 16 and the slider rounds 17, each vertical slider beam 16 has two sleeve bearings 18.

On each vertical slider beam 16 a tensioning pulley is mounted; to the upper vertical slider beam 16 a tensioning pulley 14A is mounted, and to the lower vertical slider beam 16 a tensioning pulley 13A is mounted (see FIG. 14).

In order to attach a tensioning pulley to a vertical slider beam 16, two connector plates 19 and two slider mounting plates 20 are used; see FIG. 14 and FIG. 16 (which shows a partial sectional-view). Each connector plate 19 is used to connect a slider mounting plate 20 to a vertical slider beam 16. Each slider mounting plate 20 is used to slide-ably mount a slider 21; and each slider 21 is used to attach the ends of a pulley shaft 22 using a locking ring 23. A slider mounting plate 20 is shown by itself as a front-view in FIG. 17 and as a side-view in FIG. 18. A slider 21, which preferably has low friction surfaces, is shown by itself as a front-view in FIG. 19 and as a side-view in FIG. 20.

The tensioning forces for the tensioning pulleys are provided by compression springs 24, which push the lower vertical slider beam 16 upwards and which push the upper vertical slider beam 16 downwards.

The compression springs 24 for the lower vertical slider beam 16 are inserted into slider rounds 17 and positioned between a fixed bottom end and the lower vertical slider beam 16. The fixed bottom end can be the base of the slider rounds 17, or fasteners (locking rings, nuts, etc.) positioned/fixed below the lower vertical slider beam 16.

The compression springs 24 for the upper vertical slider beam 16 are inserted into slider rounds 17 and positioned between a fixed top end and the upper vertical slider beam 16. The fixed top end can be the top of the slider rounds 17, or fasteners (locking rings, nuts, etc.) positioned/fixed above the upper vertical slider beam 16. For the design shown in FIG. 14, locking rings 25 are used as the fixed top end.

In order to limit the movements of the tensioning pulleys to a range that allows for proper operation of the CVT, two maximum contraction stops 15A are used. One maximum contraction stop 15A is used to limit the downward movement of the lower vertical slider beam 16. And the other maximum contraction stop 15A is used to limit the upward movement of the upper vertical slider beam 16.

Marked Disk for Determining Rotational Position

Figure 22:
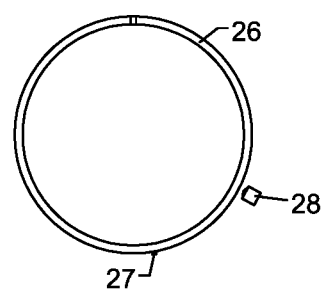
FIG. 22 shows a front-view of a marked disk 26, marker 27, and a sensor 28.

In order for the controlling computer of the CVT to know when to change the axial position of a cone, a marked disk 26 can be used. A marked disk 26 is a disk that has a marker 27, and a sensor 28 that is connected to the controlling computer of the CVT and that can determine rotational position of the marker 27 (see FIG. 22). Examples for markers 27 and sensors 28 are: a dimple and a mechanical switch, a light source/light reflector and a light sensor, a magnet and a magnetic sensor, etc.

Figure 21:
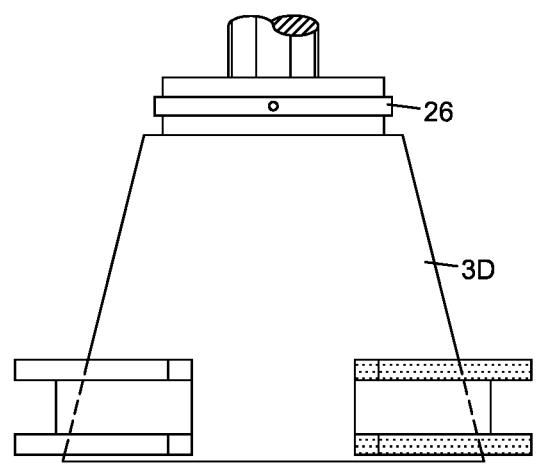
FIG. 21 shows a top-view of a cone 3D on which a marked disk 26 is attached.

A marked disk 26 should be mounted so that it is fixed for rotation relative to its cone, in FIG. 21 a set-screw is used to fix a marked disk 26 to a cone 3D. The marker 27 of a marked disk 26 should be positioned at the trailing end of the torque transmitting member of its cone, when said torque transmitting member is positioned at the smallest transmission diameter of its cone; and the sensor 28 should be positioned at the rotational position where the trailing end of the torque transmitting member (when positioned at the smallest transmission diameter of its cone) disengages with its transmission belt. This is because axial position changing of a cone should be start when or after the trailing end of its torque transmitting member has disengaged with its transmission belt; and because for a smaller transmission diameter, the trailing end of the torque transmitting member can disengage "later" or "at the same time" compared to a larger transmission diameter (depending on the orientation of a cone).

Although the mounting of a marked disk 26 of the previous paragraph will reduce the axial position changing duration for larger transmission diameters of a cone, this should not be a problem, since the axial position changing duration for a larger transmission diameter is longer than that for a smaller transmission diameter. This is because the angular coverage of a torque transmitting member on the surface its cone decreases as the transmission diameter of its cone increases.

CVT 6 with Clutches

Figure 23:
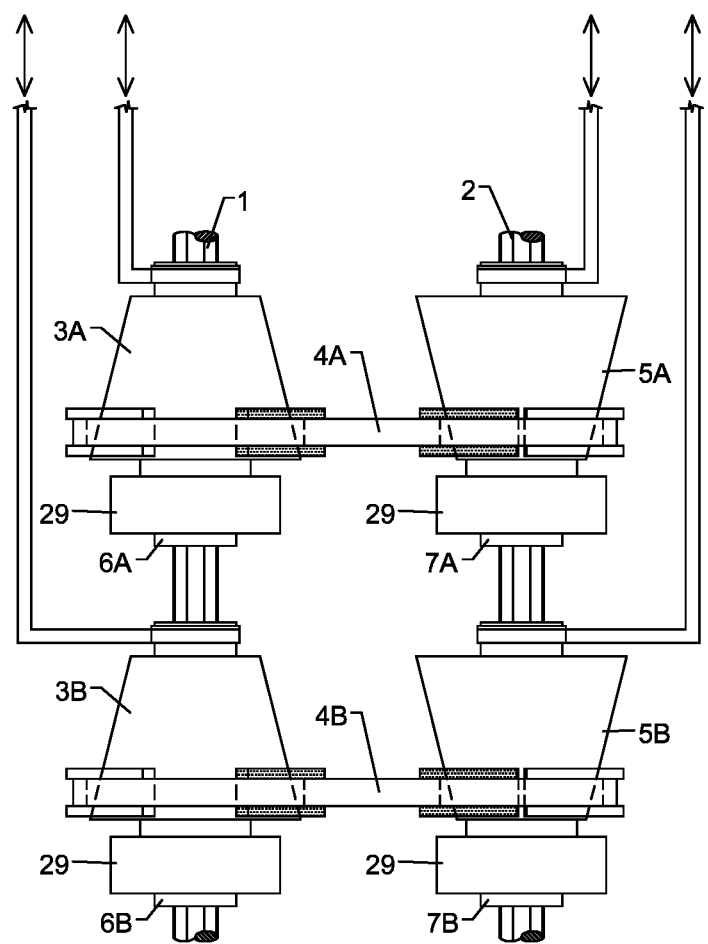
FIG. 23 shows a top-view of a CVT 6 that uses a clutch 29 for each cone.

An alternate method for reducing the tension in the transmission belt of a CVT 6 is to use a design where no adjusters 8 are used, but each cone of the CVT 6 is mounted on its shaft/spline using a clutch 29 (see FIG. 23, the labeling of all other parts are identical to the labeling used in FIG. 8). Here each clutch 29 can be used to controllably "lock its cone for rotation relative to its shaft/spline" or "unlock its cone so as to allow it to rotate relative to its shaft/spline".

In order to change the axial position of a cone, the clutch 29 of said cone is unlocked. Unlocking the clutch 29 of a cone reduces the transmission belt tension of the CVT 4 of said cone; and allows the cone to freely rotate relative to its shaft/spline, so that tensioning/maintaining pulleys are not needed for compensating for the rotations that occur during the axial position changing of said cone. Also here when there are two cones with different transmission diameters mounted on the same shaft/spline, at least one of said two cones needs to be unlocked by its clutch.

Adjusters for a CVT 6

Besides an adjuster motor, an indexing mechanism can also be used to controllably lock and unlock an adjuster of a CVT 6. If said indexing mechanism is used to lock and unlock the worm gear of the worm gear-gear drive of said adjuster; then the worm gear-gear drive can be selected in a manner such that the difference between and "the unlocking (rotating) force of the worm gear-gear drive when the worm gear is stationary" and the "locking (frictional) force of the worm gear-gear drive when the worm gear is stationary" are small, so that the force required to lock and unlock the indexing mechanism is small. This results in a relatively cheap and very reliable adjuster.

An indexing mechanism, which can only lock in incremental steps, can be used to controllably lock and unlock an adjuster because: a) when the transmission diameters of all cones mounted on a same shaft/spline are equal, an unlocked adjuster does not have to be locked. Here the cone of said unlocked adjuster, which will be referred to as the unlocked cone, is simply a cone of the "CVT 4 for which transmission belt tension has been reduced", which is also the CVT 4 for which the axial position of a cone is changed when axial position changing of a cone is initiated. Refer to the "Preferred transmission ratio changing procedure for a CVT 6" section for details on the operation of an adjuster.

And indexing mechanism, which can only lock in incremental steps, can be used controllably lock and unlock an adjuster because: b) when an adjuster needs to be locked during "step e) Second axial position changing of a cone Option 2 of 2" of the "Preferred transmission ratio changing procedure for a CVT 6", rotations of the index wheel of the adjuster relative to its lock exist; this rotation, which is slowing down, should allow the lock to enter a cavity of its index wheel. Here the index wheel and its lock should be designed so that the said rotation is sufficient for a lock to enter a cavity of its index wheel; if necessary a speed increasing gear train (such as a larger gear coupled to a smaller gear for example) can be used to couple the rotation of the worm gear to the index wheel.

Regarding the previous paragraph, during "step e) Second axial position changing of a cone Option 2 of 2", when the transmission diameters of the cones mounted on a same shaft/spline are different and the adjuster of the "cone that is rotated in the direction that increases the tension in the tense side of its transmission belt" needs to be locked; then in order to compensate for having cones with different transmission diameters mounted on a same shaft/spline, first the "cone that is not rotated in the direction that increases the tension in the tense side of its transmission belt", which is currently locked and as such used for torque transmission, needs to be unlocked so that it can rotate in the direction that reduces the tension in its transmission belt. Once the "cone that needs to be rotated in the direction that reduces the tension in its transmission belt" is unlocked in that direction, the "cone that is rotated in the direction that reduces the tension in its transmission belt" still carries all or most of the torque transmitted until it has reached the speed that compensates for having cones with different transmission diameters mounted on a same shaft/spline; note, here while the "cone that is rotated in the direction that reduces the tension in its transmission belt" speeds up, the "cone that is rotated in the direction that increases the tension in the tense side of its transmission belt" slows down. Here the friction of the worm gear-gear drive gives a time window until "the tension due torque transmission" is fully developed in the "adjuster to be locked".

Here if desired, the "adjuster to be locked" can be locked after the speed of its worm gear has slowed down, so as to reduce the shock-loads during locking. If this is desired, then a time delay from when the adjuster of the "cone that is rotated in the direction that reduces the tension in its transmission belt" is unlocked until when locking of the "adjuster to be locked" occurs can be used. The time delay does not have to be accurate, but for better accuracy, the time delay can be based on the current rpm and transmission ratio of its CVT 6. If used, it is recommended the time delay is selected so that for all operating conditions, locking of the adjuster occurs before the worm gear of the "adjuster to be locked" reverses direction, since by then the adjuster to be locked is subjected to the torque that is being transmitted by its CVT 6 (instead of only the torque due to friction).

Figure 25:
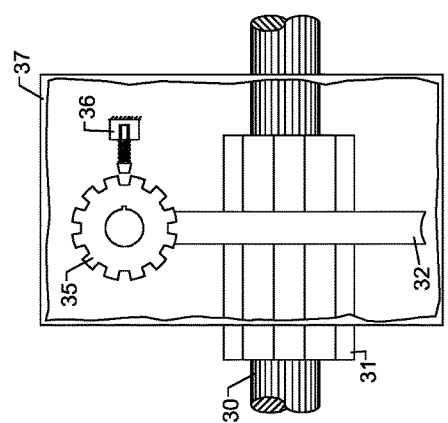
FIG. 25 shows a partial side-view of an adjuster that uses an indexing mechanism.
Figure 26:
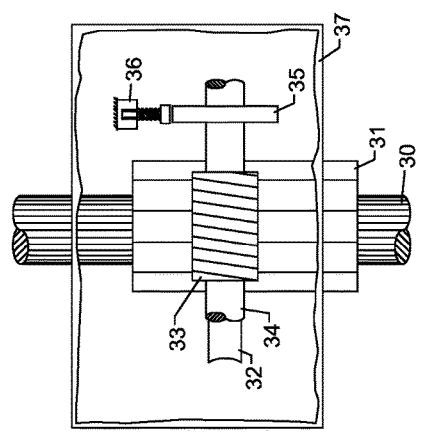
FIG. 26 shows a partial top-view of an adjuster that uses an indexing mechanism.
Figure 24:
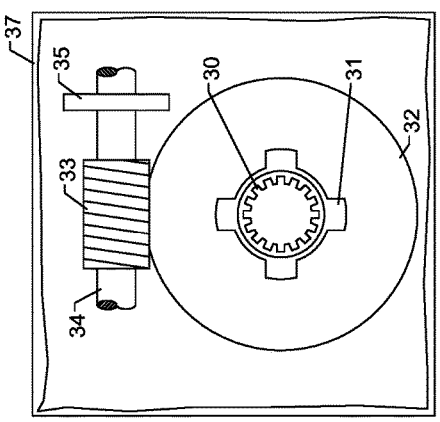
FIG. 24 shows a partial front-view of an adjuster that uses an indexing mechanism.

An adjuster that uses an indexing mechanism for controllably locking and unlocking its output shaft/spline is shown as a partial front-view in FIG. 24, as a partial side-view in FIG. 25, and as a partial top-view in FIG. 26. The adjuster is mounted on a spline 30, and is used to adjust the rotational position of a cone positioned on a spline 30. In FIGS. 24-26, the walls of housing 37 are cut open to show the inside of the adjuster.

The housing of the adjuster, which is labeled as housing 37, is fixed for rotation relative to spline 30 but can slide axially relative to spline 30 (only relative axial movements between spline 30 and housing 37 are allowed). The details for housing 37, such as the bearings, the spline cut-out profile to allow axial but not rotational movement relative to spline 30, the counter-balance weight(s) to reduce vibration, etc., are not shown. But somebody skilled in the art should be able to construct housing 37 from the details provided here.

The adjuster of FIGS. 24-26 has a gear 32 that is fixed to an output spline 31, so that gear 32 can be used to rotate output spline 31. Output spline 31 is shaped like hollow spline and is slid-on to spline 30 and supported by parts of housing 37 (bearings, etc., which are not shown) in manner so as to be able to freely rotate and freely move axially relative to spline 30. Furthermore, output spline 31 is supported by parts of housing 37 in a manner so that output spline 31 is concentric with spline 30.

In order to fix the axial position of gear 32 relative to output spline 31, one or multiple set-screws (which are not shown) can be used. In FIGS. 24-26 the teeth of gear 32 are not shown, but obviously gear 32 should have teeth.

Output spline 31 is mounted on housing 37 through bearings (which are not shown) that allow output spline 31 to rotate relative to housing 37, but any other significant relative movements between output spline 31 and housing 37 are not allowed. The front end of output spline 31 is used to attach a cone in a manner so that said cone is fixed for rotation and axial movements relative to output spline 31; for such purpose, the front end of output spline 31 can also have one or multiple set-screws (not shown).

Gear 32 is coupled to a worm gear 33. Gear 32 and worm gear 33 should be selected so that the worm gear-gear drive is not self-locking (which means that gear 32 can drive worm gear 33). Worm gear 33 is fixed to a shaft 34 in a manner so that worm gear 33 can be used to rotate shaft 34. Shaft 34 is mounted to housing 37 so that it can rotate about its axis of rotation relative to housing 37, but any other significant relative movements between shaft 34 and housing 37 are not allowed.

Also fixed for axial and rotational movements to shaft 34 is an index wheel 35. Since index wheel 35 is fixed for rotation relative to shaft 34, index wheel 35 can be used to lock and unlock the rotational movements of shaft 34. In order to fulfill its purpose, index wheel 35 has circumferential cavities (the cavities are shown in FIG. 25 but not in FIGS. 24 and 26).

And fixed to housing 37 is a locking mechanism 36 that can be used to lock and unlock index wheel 35. Locking mechanism 36 comprises of a lock that can be inserted into a cavity of index wheel 35, a spring, and a solenoid. The lock is pushed towards the index wheel cavities so that it can enter the index wheel cavities (one cavity at a time) by the spring, and the lock can be controllably pulled out of an index wheel cavity by the solenoid.

When the lock is in a cavity of index wheel 35, index wheel 35, and as such also the adjuster is locked; and when the lock is not in a cavity of index wheel 35, index wheel 35 and as such also the adjuster, is unlocked.

Instead of using a spring and a solenoid to lock and unlock an index wheel, a pneumatic/hydraulic actuator with or without a spring, or other devices that can lock and unlock an index wheel can also be used.

Figure 28:
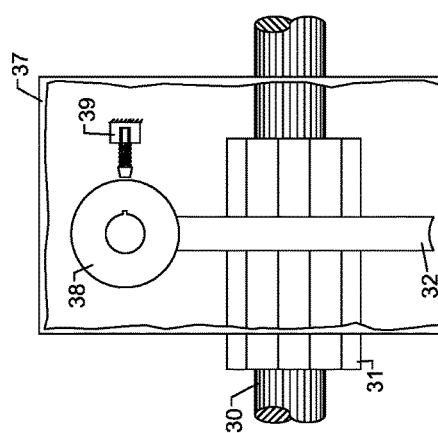
FIG. 28 shows a partial side-view of an adjuster that uses a brake.
Figure 29:
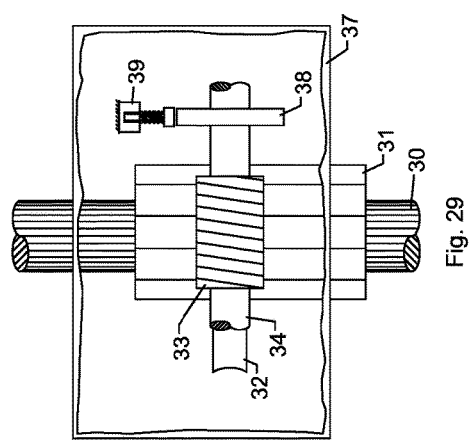
FIG. 29 shows a partial top-view of an adjuster that uses a brake.
Figure 27:
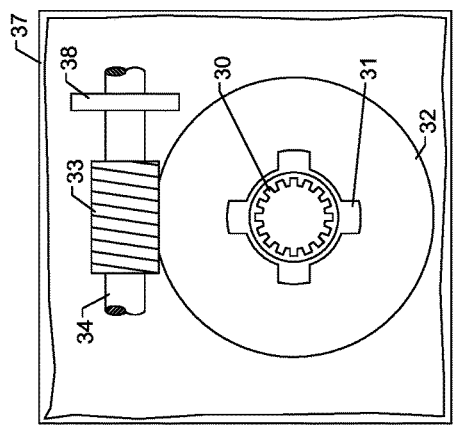
FIG. 27 shows a partial front-view of an adjuster that uses a brake.
Figure 31:
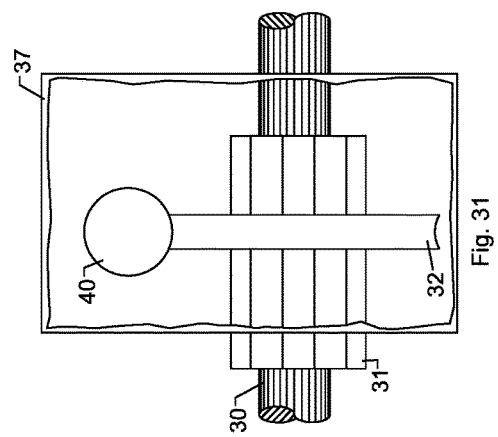
FIG. 31 shows a partial side-view of an adjuster that uses an electric motor.
Figure 32:
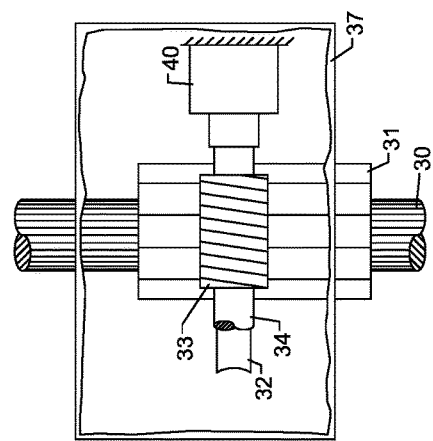
FIG. 32 shows a partial top-view of an adjuster that uses an electric motor.
Figure 30:
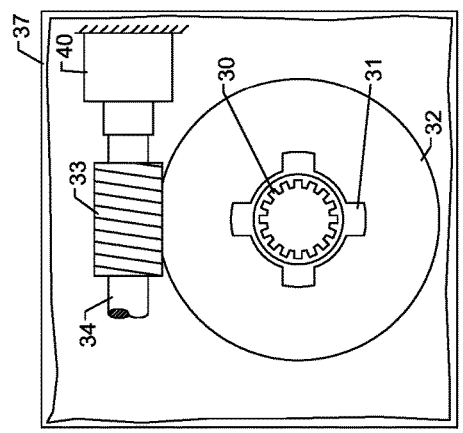
FIG. 30 shows a partial front-view of an adjuster that uses an electric motor.

Instead of using an indexing mechanism, an adjuster can also use a brake or an electric motor. An adjuster using a brake is shown in FIGS. 27-29, where a brake disk 38 and braking shoe mechanism 39 are used in-place of index wheel 35 and locking mechanism 36. And an adjuster using an adjuster motor, which is preferably an electric motor, is shown in FIGS. 30-32, where an electric motor 40 is used to rotate shaft 34. All parts of the "adjuster shown in FIGS. 27-29" and the "adjuster shown in FIGS. 30-32" that are not mentioned in this paragraph are identical to the "adjuster shown in FIGS. 24-26" and use the same numbering and labeling.

Figure 34:
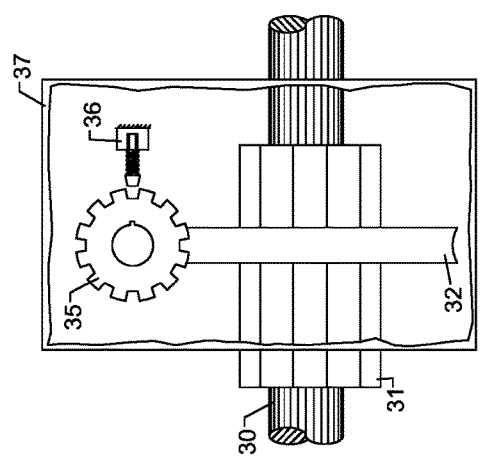
FIG. 34 shows a partial side-view of an adjuster that uses an indexing mechanism which uses a gear train 41 (gear train 41 is not shown).
Figure 35:
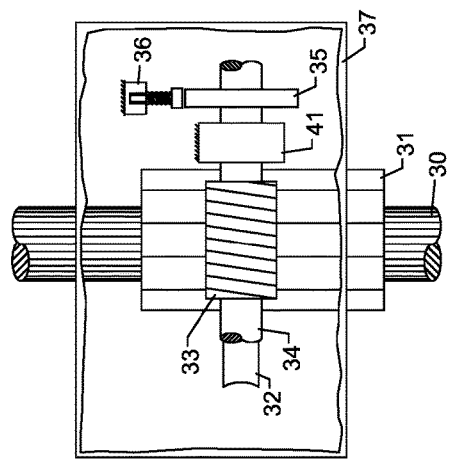
FIG. 35 shows a partial top-view of an adjuster that uses an indexing mechanism which uses a gear train 41.
Figure 33:
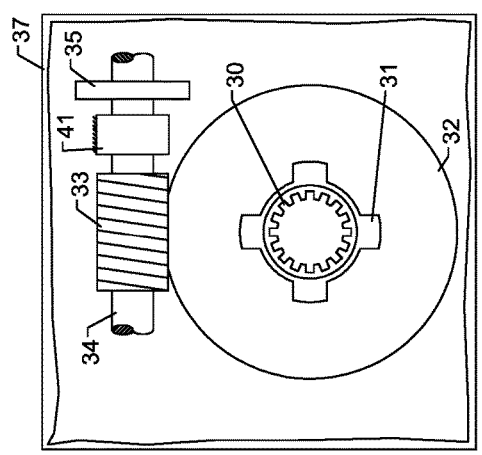
FIG. 33 shows a partial front-view of an adjuster that uses an indexing mechanism which uses a gear train 41.

An adjuster that uses an indexing mechanism for which a speed increasing gear train (such as a larger gear coupled to a smaller gear for example) is used to couple the rotation of the worm gear to the index wheel is shown in FIGS. 33-35. In FIGS. 33 and 35, the speed increasing gear train is labeled as gear train 41 and it is fixed to housing 37 (FIG. 34 does not show gear train 41 since it is behind index wheel 35). All parts of the "adjuster shown in FIGS. 33-35" except for gear train 41 are identical to the "adjuster shown in FIGS. 24-26" and use the same numbering and labeling.

The adjusters of this application are basically used as a clutch, as such they can also be used clutches for other applications. For other applications, when desired, the housing of the adjuster can be construct so that it is fixed for all relative movements to its shaft or spline; unlike the example described in the paragraphs above, where the housing of the adjuster can slide axially relative to its spline.

PREFERRED EMBODIMENT OF THE INVENTION

Best Mode

The preferred method among the "Maximum Axial Position Changing RPM Method", the "Alternate Maximum Axial Position Changing RPM Method", and the "Alternate Maximum Axial Position Changing RPM Method 2", is the "Alternate Maximum Axial Position Changing RPM Method 2" because of its simplicity, but the other methods have merits as well.

CONCLUSION, RAMIFICATIONS, AND SCOPE

Disclosed in this disclosure are methods that can be used to "limit the maximum shaft rpm (speed) at which axial position changing of a variator mounted on it is performed to a "maximum axial position changing rpm value" for all variator mounted shafts of a CVT, while still allowing a safe driving experience and also allowing the driver to use the full power of the engine when needed. The methods of this disclosure are: the "Maximum Axial Position Changing RPM Method", the "Alternate Maximum Axial Position Changing RPM Method", and the "Alternate Maximum Axial Position Changing RPM Method 2".

The methods of this disclosure can also be applied to CVT's that use other variators besides cone assemblies, such as push belt pulleys for example. Push belt pulleys are variators that consist of two pulley halves for which either one pulley half or both pulley halves are moved axially in order to change the pulley's transmission diameter. For these CVT's a "maximum axial position changing rpm value" of a push belt pulley refers to the maximum rpm at which the axial position of one or both pulley halves of the push belt pulley is/are changed.

Although the description of the "Maximum Axial Position Changing RPM Methods" Section is a for a CVT that uses one or several variators on both the input shaft and the output shaft (such as a CVT 4, CVT 6, or any other CVT where one or several variators on the input shaft is/are coupled to one or several variators on the output shaft); the methods of this disclosure can also be applied to CVT's for which "a variator" or "several variator(s)" are only mounted on either the input shaft or the output shaft (such a CVT 3, a CVT where a variator is coupled to a transmission pulley, or any other CVT that uses only one shaft on which variator(s) is/are mounted). Since only the shafts on which variator(s) are mounted have a "maximum axial position changing rpm value", for these CVT's only one shaft has a "maximum axial position changing rpm value".

Furthermore, the description of the "Maximum Axial Position Changing RPM Methods" Section also applies to CVT's that use splines instead of shafts. For the methods of this disclosure the terms spline, shaft, or any other means for rotatably mounting a variator, can be used interchangeably; since for said methods, they serve the same function, and said methods can be applied to a CVT in the same manner regardless whether said CVT uses splines, shafts, or any other means for rotatably mounting a variator.

The "Maximum Axial Position Changing RPM Methods" Section contains the following sentence: For the "Maximum Axial Position Changing RPM Method", "the maximum speed of the input shaft at which the axial position of a cone mounted on it is changed" and "the maximum speed of the output shaft at which the axial position of a cone mounted on it is changed" are each limited to their "maximum axial position changing rpm value". This sentence can be rewritten as: For the "Maximum Axial Position Changing RPM Method", the maximum shaft/spline rpm (speed) at which axial position changing of a variator mounted on it is performed is limited to "maximum axial position changing rpm value" for all variator mounted shafts/splines of a CVT. The rewritten sentence applies to CVT's with two variator mounted shafts/splines, such as a CVT 6, and CVT's with only one variator mounted shaft/spline. The same sentence can also be rewritten in the same manner for the "Alternate Maximum Axial Position Changing RPM Method" and the "Alternate Maximum Axial Position Changing RPM Method 2"

The "Maximum Axial Position Changing RPM Methods" Section contains the following sentence: For this transmission ratio range of the "Normal Driving Conditions" mode, "the maximum rpm of the input shaft" and "the maximum rpm of the output shaft" are limited to their "maximum axial position changing rpm value" regardless of the input (gas pedal depression) of the driver. This sentence can be rewritten as: For this transmission ratio range of the "Normal Driving Conditions" mode, the maximum rpm of all variator mounted shafts/splines is/are limited to their "maximum axial position changing rpm value" regardless of the input (gas pedal depression) of the driver. The rewritten sentence applies to CVT's with two variator mounted shafts/splines, such as a CVT 6, and CVT's with only one variator mounted shaft/spline. All corresponding sentences of the "Maximum Axial Position Changing RPM Methods" Section can also be rewritten in the same manner.

The preferred embodiment of the invention is the "Alternate Maximum Axial Position Changing RPM Method 2" described in the "Maximum Axial Position Changing RPM Methods" Section. As a claim, this invention can be described as: A method that can be used to "limit the maximum shaft/spline rpm (speed) at which axial position changing of a variator mounted on it is performed to a "maximum axial position changing rpm value" for all variator mounted shafts/splines of a CVT, while still allowing a safe driving experience and also allowing the driver to use the full power of the engine when needed, by: a) assigning a said "maximum axial position changing rpm value" to each variator mounted shaft/spline; b) only changing the axial position of a variator when the "maximum axial position changing rpm value" of the shaft/spline of said variator is not exceeded; and c) providing indication when a said "maximum axial position changing rpm value" is exceeded, so that the driver of said CVT knows that he/she needs to reduce the rpm of the engine in order to allow for continuous/uninterrupted transmission ratio changes in said CVT.

Another claim for the "Alternate Maximum Axial Position Changing RPM Method 2" is as follows: A method that can be used to "limit the maximum shaft/spline rpm (speed) at which axial position changing of a variator mounted on it is performed to a "maximum axial position changing rpm value" for all variator mounted shafts/splines of a CVT, while still allowing a safe driving experience and also allowing the driver to use the full power of the engine when needed, by: a) assigning a said "maximum axial position changing rpm value" to each variator mounted shaft/spline; b) only changing the axial position of a variator when the "maximum axial position changing rpm value" of the shaft/spline of said variator is not exceeded; and c) labeling the rpm dial indicator to show the maximum engine rpm at which a "maximum axial position changing rpm value" will not be exceeded, so that the user of said CVT knows when transmission ratio changing cannot be continuously performed because at least one said "maximum axial position changing rpm value" is exceeded; and knows how much he/she needs to reduce the engine rpm when at least one said "maximum axial position changing rpm value" is exceeded in order to allow for continuous/uninterrupted transmission ratio changes in said CVT.

While my above description contains many specificities, these should not be construed as limitations on the scope, but rather as an exemplification of one or several embodiment(s) thereof. Many other variations are possible.

Accordingly, the scope should be determined not by the embodiment(s) illustrated, but by the appended claims and their legal equivalents.

I claim:

1. A method that can be used to limit a maximum shaft/spline rpm at which axial position changing of a variator mounted on said shaft/spline is performed to a maximum axial position changing rpm value for an input shaft/spline and an output shaft/spline of a CVT, while still allowing a safe driving experience and also allowing a driver to use a full power of an engine when needed, by:

a) assigning a maximum axial position changing rpm value to said input shaft/spline and assigning a maximum axial position changing rpm value to said output shaft/spline;
b) only changing an axial position of a variator mounted on said input shaft/spline when said maximum axial position changing rpm value assigned to said input shaft/spline is not exceeded; and only changing an axial position of a variator mounted on said output shaft/spline when said maximum axial position changing rpm value assigned to said output shaft/spline is not exceeded;
c) providing indication when at least one of said maximum axial position value assigned to said input shaft/spline and said maximum axial position changing rpm value assigned to said output shaft/spline is exceeded, so that the driver of said CVT knows that he/she needs to reduce an rpm of the engine in order to allow for continuous/uninterrupted changing of the axial positions of said variators.

2. The method of claim 1, wherein said indication is an alarm sound indication.

3. The method of claim 1, wherein said indication is a message sound indication.

4. The method of claim 1, wherein said indication is a visual signal indication.

5. The method of claim 1, wherein said indication is a visual text indication.

6. The method of claim 1, wherein said indication is a haptic indication.

7. A method that can be used to limit a maximum shaft/spline rpm at which axial position changing of a variator mounted on said shaft/spline is performed to a maximum axial position changing rpm value for an input shaft/spline and an output shaft/spline of a CVT, while still allowing a safe driving experience and also allowing a driver to use a full power of an engine when needed, by:
a) assigning a maximum axial position changing rpm value to said input shaft/spline and assigning a maximum axial position changing rpm value to said output shaft/spline;
b) only changing an axial position of a variator mounted on said input shaft/spline when said maximum axial position changing rpm value assigned to said input shaft/spline is not exceeded; and only changing an axial position of a variator mounted on said output shaft/spline when said maximum axial position changing rpm value assigned to said output shaft/spline is not exceeded;
c) labeling of an rpm dial indicator to show a maximum engine rpm at which no said maximum axial position changing rpm value will be exceeded, so that the driver knows how much he/she needs to reduce an engine rpm when at least one of said maximum axial position value assigned to said input shaft/spline and said maximum axial position changing rpm value assigned to said output shaft/spline is exceeded in order to allow for continuous/uninterrupted changing of the axial positions of said variators.

8. The method of claim 7, wherein said labeling of the rpm dial indicator is a Non-adjusted CVT Maximum Transmission Ratio Changing RPM Mark.

9. The method of claim 7, wherein said labeling of the rpm dial indicator is a Changing to show actual CVT Maximum Transmission Ratio Changing RPM Mark, which indicates an actual maximum engine rpm at which no said maximum axial position changing rpm value is exceeded.

10. The method of claim 9, wherein a controlling computer can determine said Changing to show actual CVT Maximum Transmission Ratio Changing RPM Mark by calculating and selecting from a smaller engine rpm between:
a) an engine rpm where a speed of said input shaft/spline is equal to said maximum axial position changing rpm value assigned to said input shaft/spline at a current transmission ratio; and
b) an engine rpm where a speed of said output shaft/spline is equal to said maximum axial position changing rpm value assigned to said output shaft/spline at said current transmission ratio.

* * * * *